(12) United States Patent
Kitsutaka

(10) Patent No.: US 7,046,242 B2
(45) Date of Patent: May 16, 2006

(54) GAME SYSTEM, PROGRAM AND IMAGE GENERATING METHOD

(75) Inventor: Shigeru Kitsutaka, Kawasaki (JP)

(73) Assignee: Namco Ltd., Tokyo (JP)

( * ) Notice: Subject to any disclaimer, the term of this patent is extended or adjusted under 35 U.S.C. 154(b) by 227 days.

(21) Appl. No.: 10/048,537

(22) PCT Filed: Jun. 4, 2001

(86) PCT No.: PCT/JP01/04698

§ 371 (c)(1),
(2), (4) Date: Feb. 19, 2002

(65) Prior Publication Data

US 2002/0177481 A1    Nov. 28, 2002

(30) Foreign Application Priority Data

Jun. 5, 2000    (JP) .............................. 2000-167945

(51) Int. Cl.
G06T 15/00    (2006.01)

(52) U.S. Cl. ...................... 345/419; 345/420; 345/421; 345/426; 345/427; 463/30

(58) Field of Classification Search ................ 345/419, 345/422, 421, 426, 427, 420; 463/30
See application file for complete search history.

(56) References Cited

U.S. PATENT DOCUMENTS 6,151,026 A    11/2000    Iwade et al.

FOREIGN PATENT DOCUMENTS

| | | | |
|---|---|---|---|
| JP | A 6-110442 | 4/1994 | |
| JP | 8-279057 A | 10/1996 | |
| JP | 9-311954 A | 12/1997 | |
| JP | 2000-149062 A | 5/2000 | |
| JP | A 2000-251094 | 9/2000 | |
| JP | 2001-101441 A | 4/2001 | |

OTHER PUBLICATIONS

R. Raskar et al., "Image Precision Silhouette Edges," Proceedings of the 1999 Symposium on Interactive 3D Graphics, ACM Siggraph, pp. 135-140, Apr. 29, 1999.

Primary Examiner—Kimbinh T. Nguyen
(74) Attorney, Agent, or Firm—Oliff & Berridge, PLC.

(57) ABSTRACT

An object is to provide a game system, program and image generating method which can effectively generate an image having an edge line of higher quality. The image of an edge line EDL of an object OB is changed depending on a distance between the object and the viewpoint or the size of the perspectively transformed object OB. As the distance between the object and the viewpoint increases or as the size of the perspectively transformed object decreases, the color of the edge line of the object gradually becomes the second color. The color of the edge line begins to become the second color at a threshold value VTN. The color of the edge line is set to the second color at another threshold value VTF. As the distance between the object and the viewpoint increase or as the size of the perspectively transformed object decreases, the image of the edge line of the object is made more transparent. When the distance between the object and the viewpoint (or the size of the object) is substantially equal to a distance in the viewpoint follow mode, the color or translucency of the edge line is maintained substantially constant. When the distance between the object and the viewpoint is at the threshold value VTF, the image of the edge line substantially disappears. The image of the edge line is drawn in the outside or inside area of the object.

54 Claims, 43 Drawing Sheets

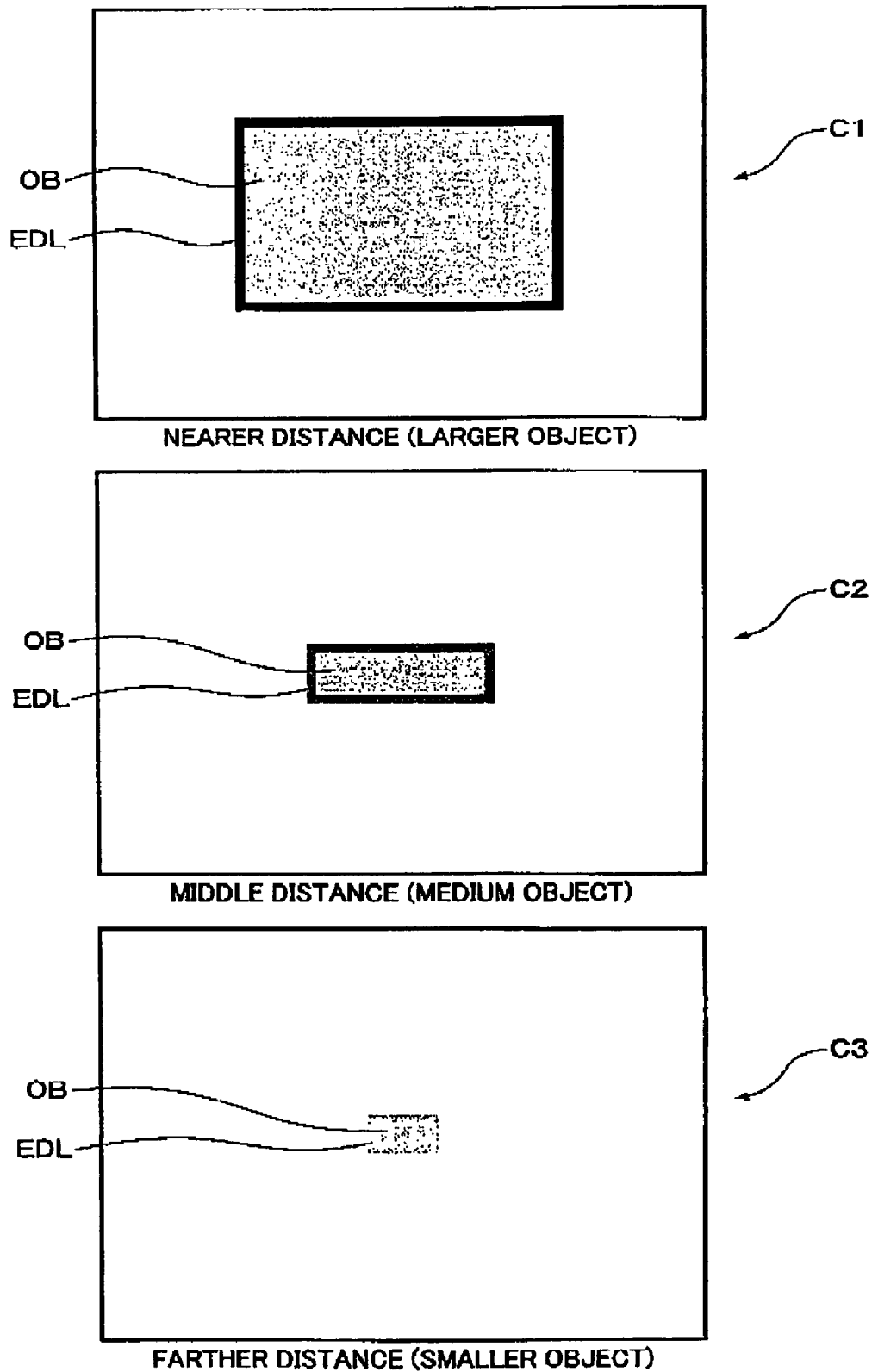

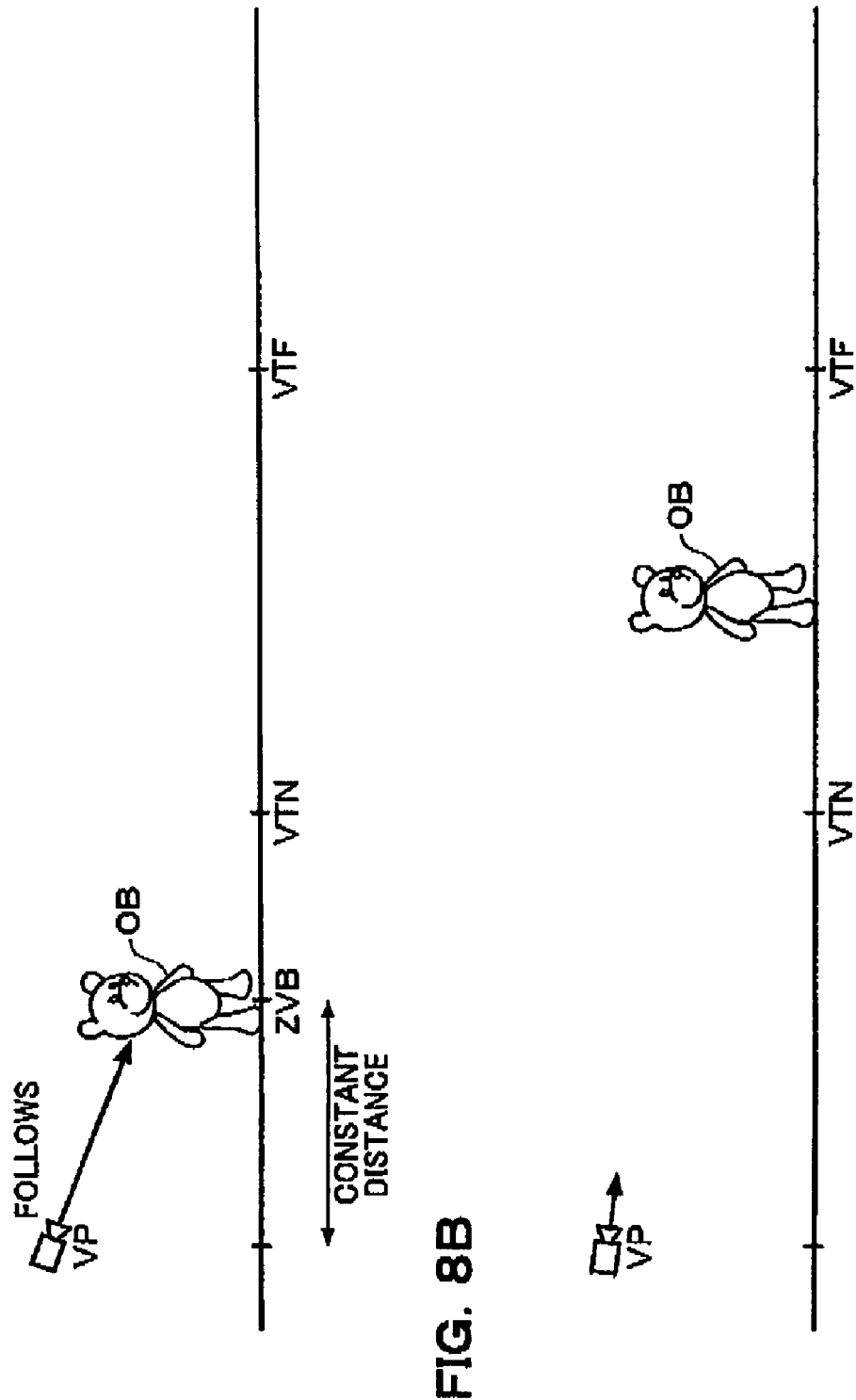

FIG. 13A  MAPPING IMAGE
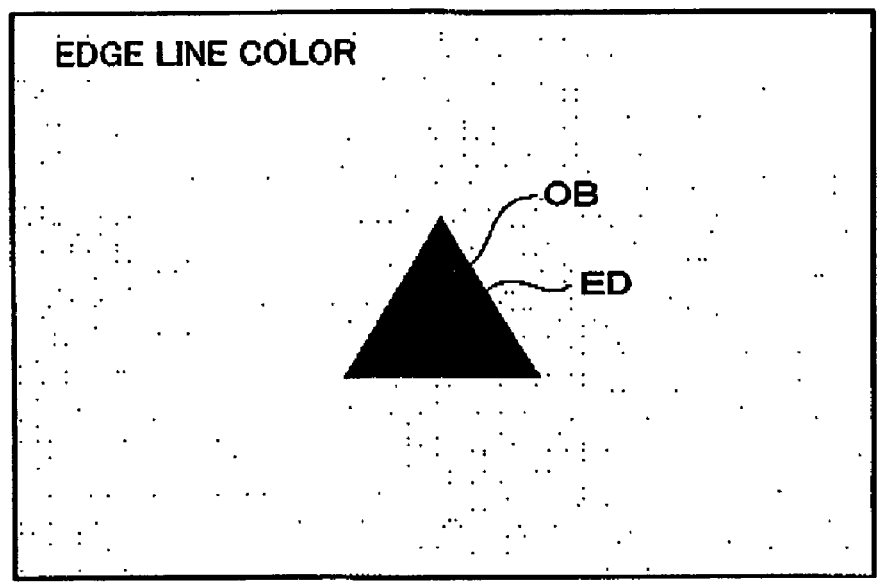
FIG. 13B
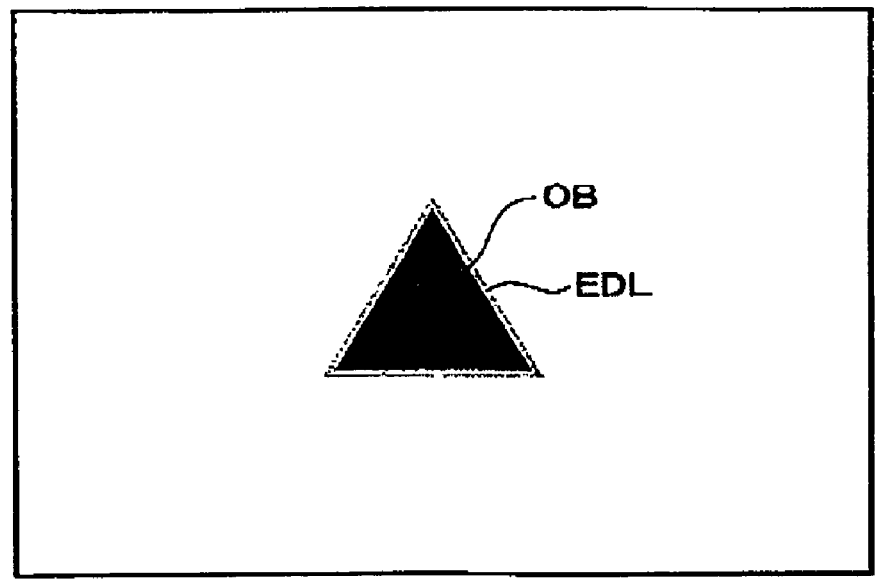

FIG. 16A DISTANCE FROM VIEWPOINT IS NEARER
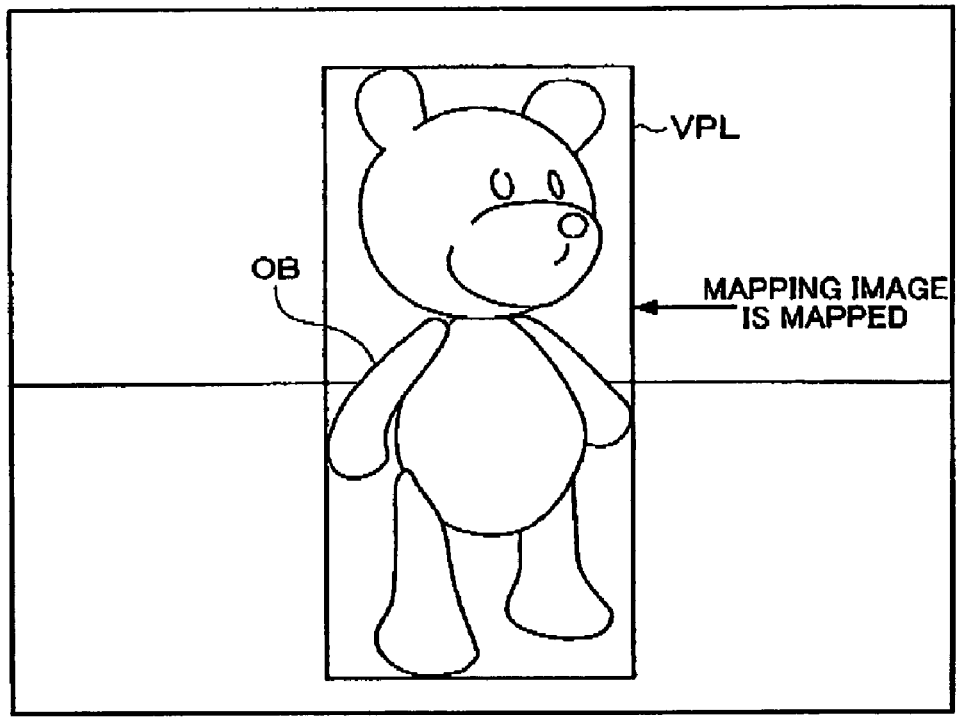
FIG. 16B DISTANCE FROM VIEWPOINT IS FARTHER
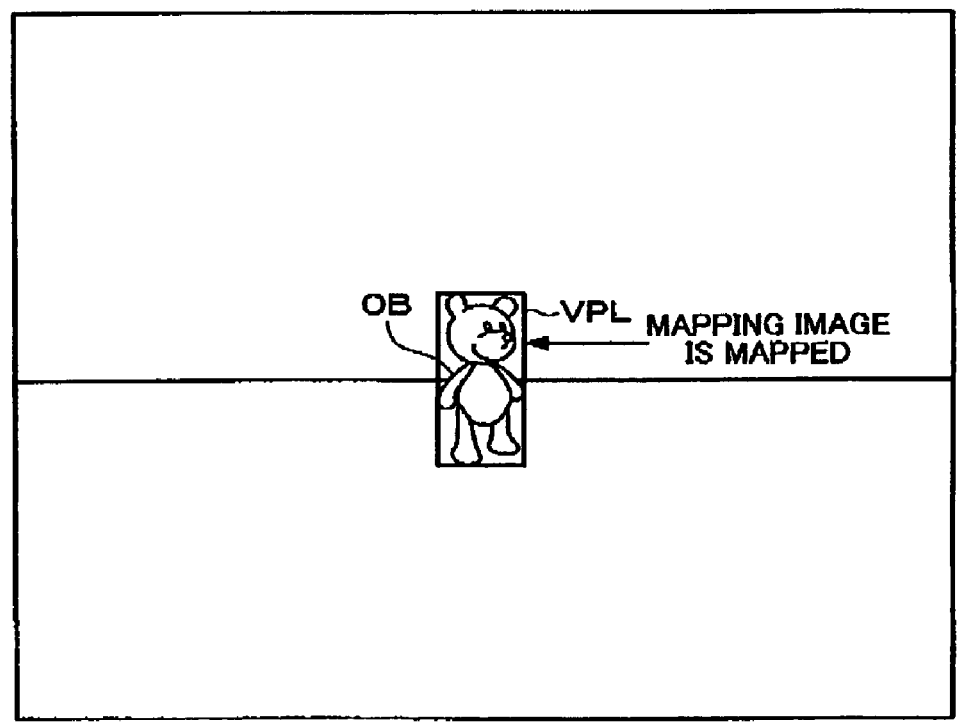

FIG. 17A DISTANCE FROM VIEWPOINT IS NEARER
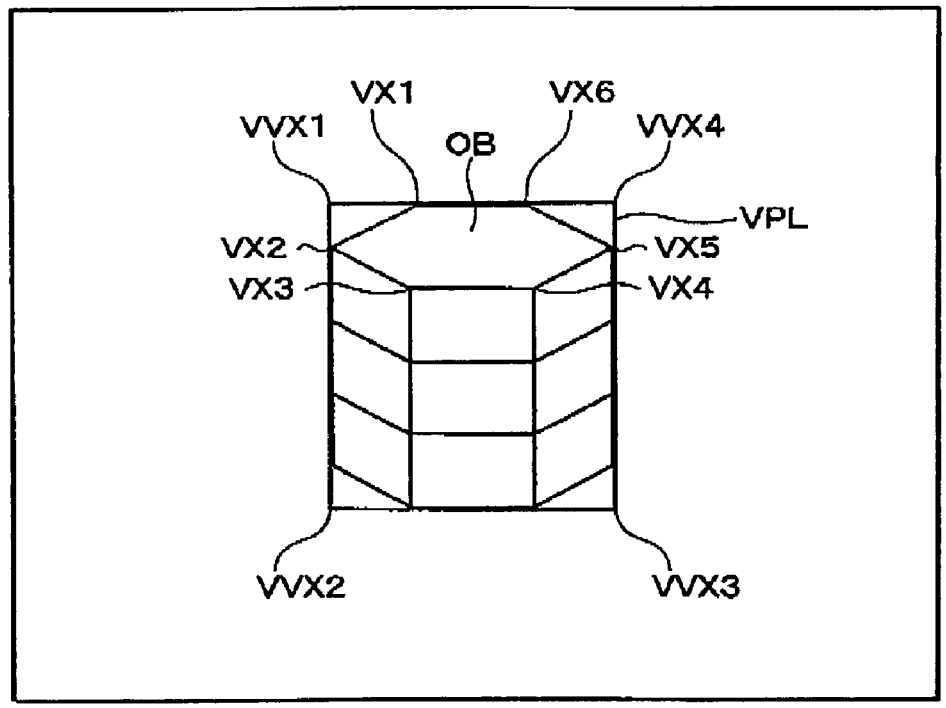
FIG. 17B DISTANCE FROM VIEWPOINT IS FARTHER
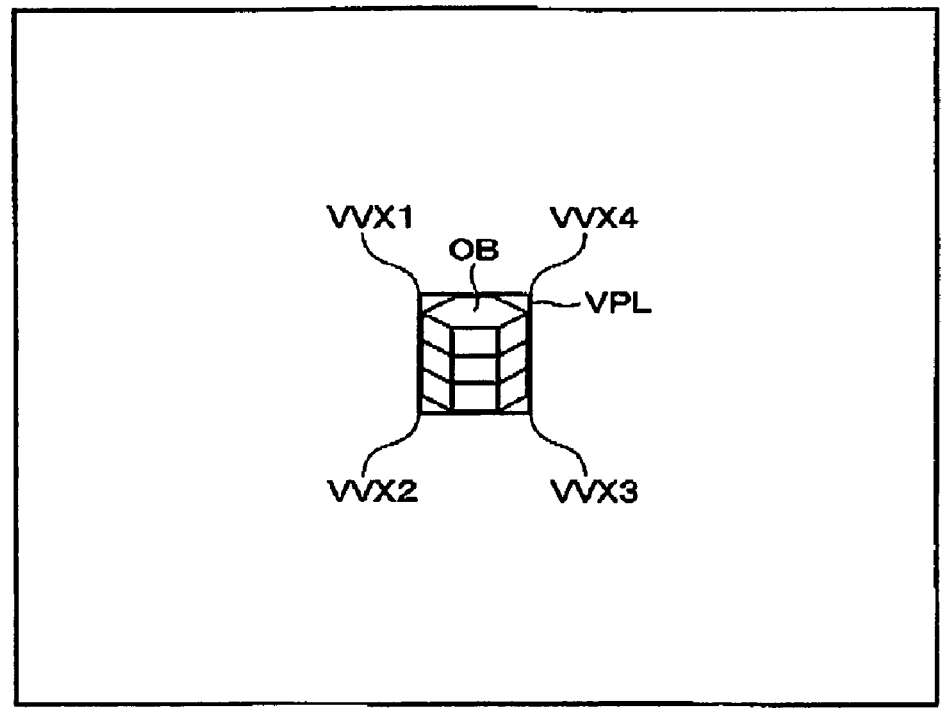

FIG. 24
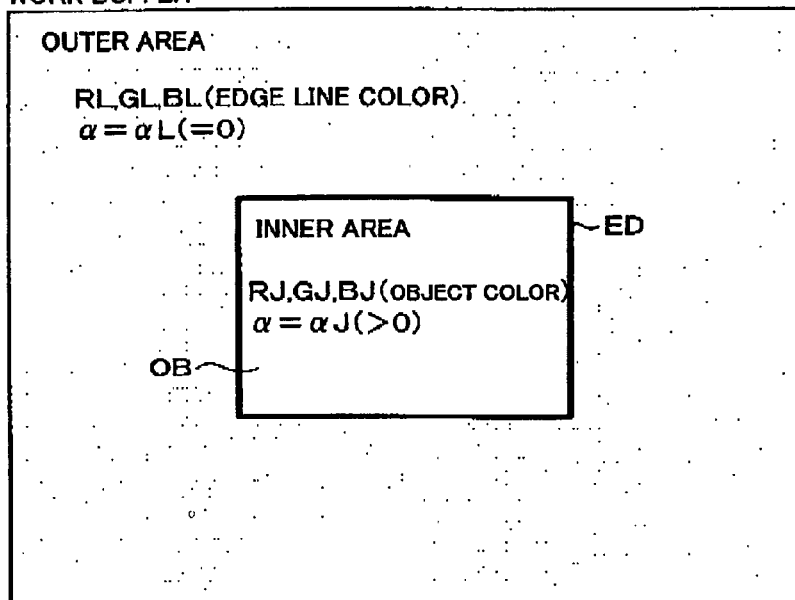
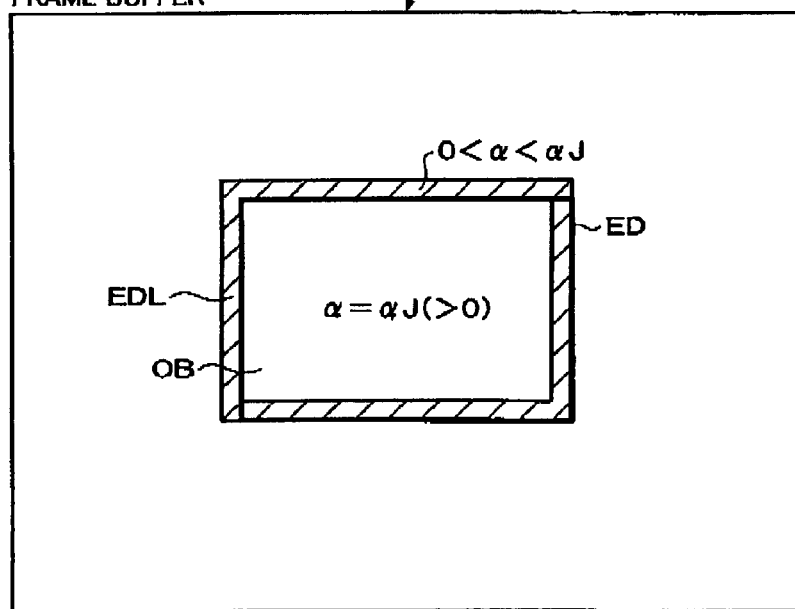

FIG. 27

WORK BUFFER (MAPPING IMAGE)

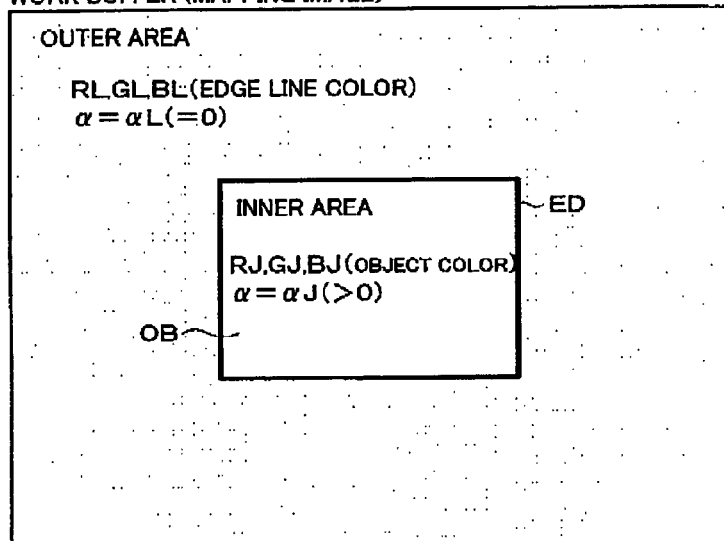

OUTER AREA
RL,GL,BL:(EDGE LINE COLOR)
$\alpha = \alpha L (=0)$

INNER AREA — ED
RJ,GJ,BJ (OBJECT COLOR)
$\alpha = \alpha J (>0)$

OB

TEXTURE MAPPING
- BI-LINEAR FILTERING (TEXEL INTERPOLATION) METHOD
- SHIFT TEXTURE COORDINATES BY +0.5 PIXELS (TEXELS)
- SOURCE ALPHA TEST PASSES ONLY PIXEL OF $\alpha < \alpha J$
- DESTINATION ALPHA TEST PASSES ONLY PIXEL OF $\alpha = \alpha J$

FRAME BUFFER

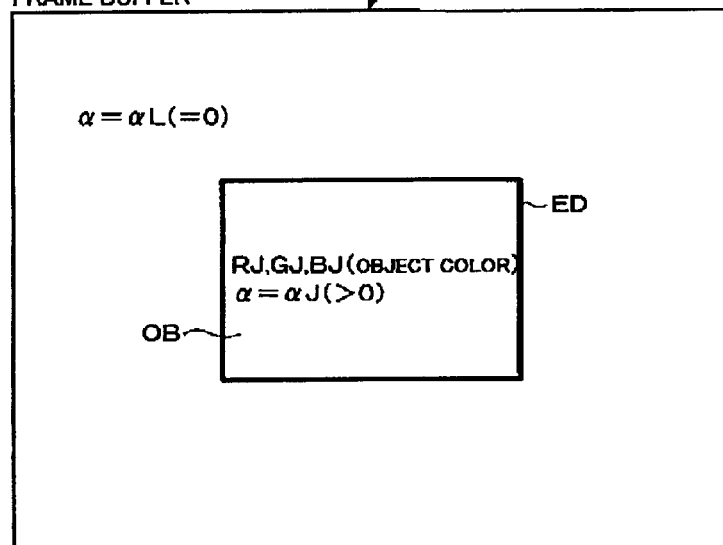

$\alpha = \alpha L (=0)$

ED
RJ,GJ,BJ (OBJECT COLOR)
$\alpha = \alpha J (>0)$

OB

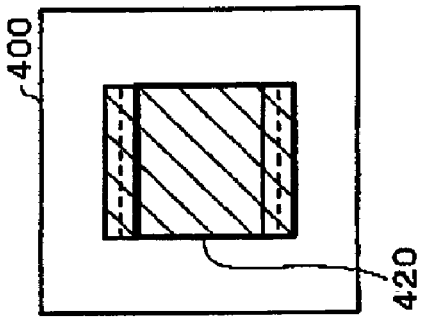
FIG. 42C
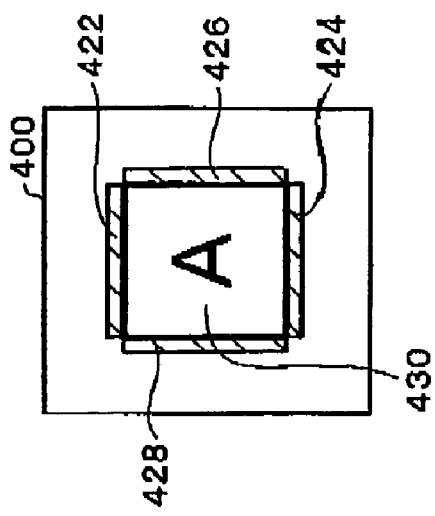
FIG. 42F
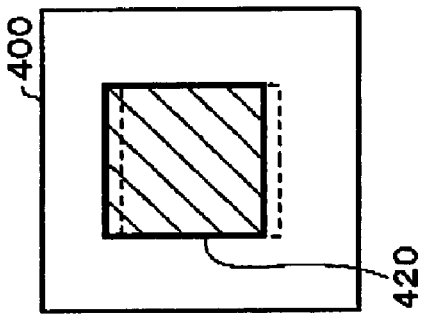
FIG. 42B
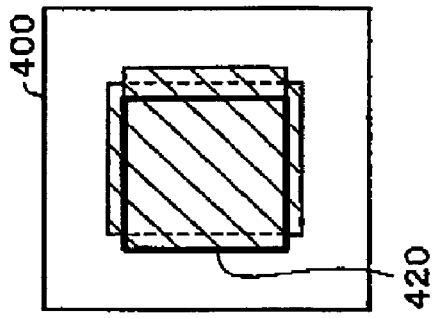
FIG. 42E
FIG. 42A
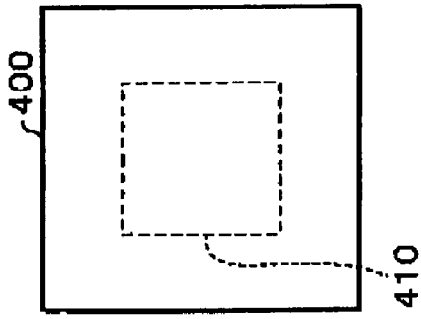
FIG. 42D

GAME SYSTEM, PROGRAM AND IMAGE GENERATING METHOD

TECHNICAL FIELD

The present invention relates to a game system, program and image generating method.

BACKGROUND OF ART

There is known a game system which can generate an image as viewed from a given viewpoint within an object space that is a virtual three-dimensional space. Such a game system is highly popular from the fact that it can provide a so-called virtual reality. If the game system is for a roll-playing game (RPG), a player can enjoy the game by controlling a character (or object) allocated to the player to move it on a map within the object space so that the player will fight against an enemy character, dialogue with any other character or visit various cities and towns.

In such a game system, an object representing a character is configured by a plurality of polygons or free-form surfaces (which are primitive surfaces in a broad sense). The image as viewed from the given viewpoint within the object space will be generated by arranging the object (model) configured by these polygons within the object space and then performing the geometry-processing (or three-dimensional computation) with respect to the object. Thus, the image can be generated in a more realistic form as if it exists in the real world scene.

On the other hand, the field of animated cartoon makes an appeal to players by using an image similar to a cellular picture specific to the animation, rather than a realistic image actually photographed.

The game picture generated by the conventional game system can make an appeal to a person that likes the reality, but would not make an appeal to a person that likes the animation.

To overcome such a problem, the inventors have developed a game system which can generate a cellular image in real-time. The generation of the cellular image requires a process of drawing the edge line of an object including a character or the like (or a process of emphasizing the edge line).

However, it has bee found that such a process contains the following problem.

It is now assumed that an edge line having its thickness equal to one pixel is to be drawn around the outer periphery of an object. In such a case, a problem is not substantially raised if the distance between the viewpoint and the object becomes nearer (or if the object is large relative to pixels on the screen) However, if the distance between the viewpoint and the object is farther (or if the object is small relative to pixels on the screen), an unnatural image will be generated since the thickness of the edge line will unnecessarily be increased relative to the size of the object.

DISCLOSURE OF INVENTION

The present invention provides a game system which performs image generation, comprising: means which draws an image of an edge line of an object; means which changes the image of the edge line of the object depending on a distance from a viewpoint; and means which generates an image as viewed from a given viewpoint within an object space.

The present invention further provides a game system which performs image generation, comprising: means which draws an image of an edge line of an object; means which changes the image of the edge line of the object depending on a size of the object that has been perspectively transformed; and means which generates an image as viewed from a given viewpoint within an object space.

BRIEF DESCRIPTION OF DRAWINGS

FIG. 5A shows the characteristic of a function between the distance between the object and the viewpoint and the color of the edge line while

FIG. 6 illustrates a technique of changing the translucency of the edge line depending on the distance between the object and the viewpoint or the size of the perspectively transformed object.

FIG. 7A shows the characteristic of a function between the distance between the object and the viewpoint and the translucency of the edge line while

FIGS. 8A and 8B illustrate a technique of setting a threshold value VTN.

FIG. 13A shows a mapping image while FIG. 13B shows an image obtained by mapping the mapping image on a virtual polygon.

FIGS. 16A and 16B illustrate a technique of generating a virtual polygon.

FIGS. 17A and 17B illustrate a technique of generating a virtual polygon based on the coordinates of vertexes in a perspectively transformed object.

FIG. 24 illustrates a technique of preventing the whole object from being drawn into a defocused image.

FIG. 27 illustrates a technique of drawing a mapping image on the frame buffer by mapping it on a virtual polygon through the bi-linear filtering process while shifting the texture coordinates by +0.5 pixels.

FIGS. 42A to 42F illustrate various other techniques of drawing the edge line.

BEST FORMS FOR CARRYING OUT THE INVENTION

Figure 1:
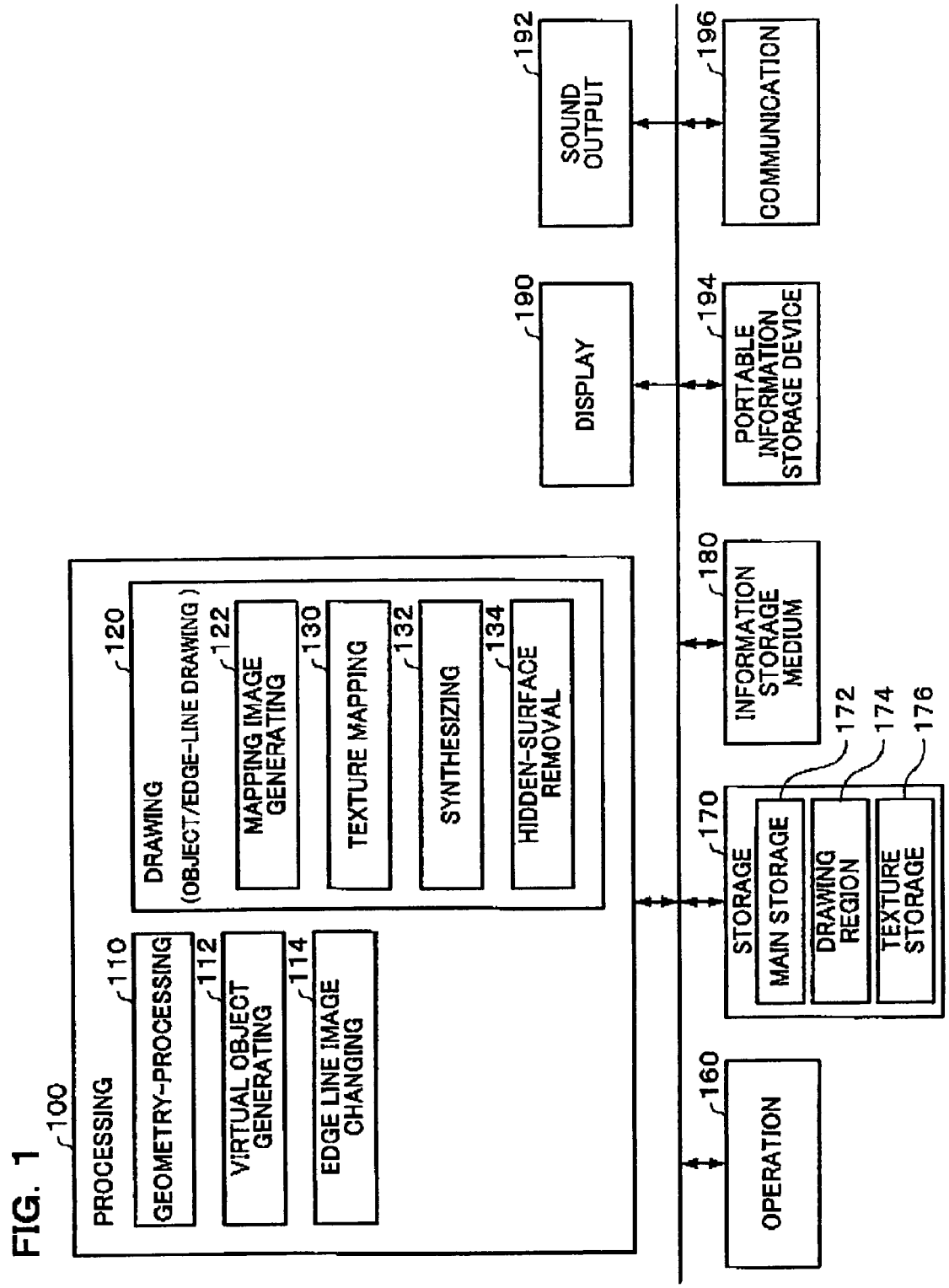
FIG. 1 is a functional block diagram of a game system according to this embodiment of the present invention.

In view of the aforementioned problems, one embodiment of the present invention provides a game system, program and image generating method which can effectively generate the image of an edge line with higher quality.

Embodiments of the present invention will now be described.

The embodiments are not intended to limit the contents of the present invention as defined in the appending claims. Moreover, all the components described in connection with the embodiments are not necessarily essential for carrying out the present invention.

An embodiment of the present invention provides a game system which performs image generation, comprising: means which draws an image of an edge line of an object; means which changes the image of the edge line of the object depending on a distance from a viewpoint; and means which generates an image as viewed from a given viewpoint within an object space. A computer-usable program embodied on an information storage medium or in a carrier wave according to this embodiment of the present invention comprises a processing routine for executing the above-described means.

According to this embodiment, the image of the edge line changes in respect to any of various parameters thereof such as color, translucency (density), brightness, tint, lightness or chroma, depending on the distance from the viewpoint. Thus, the image of the edge line can be formed into a high-quality image optimally matching the distance from the viewpoint.

The distance from the viewpoint may be any of various parameters such as depth distance, linear distance between the viewpoint and the object and other equivalent distances.

The object, the edge line of which is to be drawn, may be the entire model object or an object part (or sub-object) that is one of parts objects configuring a model object.

The technique of drawing the edge line of the object is desirably one that shifts the texture coordinates through the texel interpolation, but not limited to such a technique.

In the game system, program and image generating method according to this embodiment, as the distance from the viewpoint increases, a color of the edge line of the object may gradually become a given second color Thus, the color of the edge line of the object may become the second or inconspicuous color when the distance between the object and the viewpoint increases.

In the game system, program and image generating method according to this embodiment, when the distance from the viewpoint is substantially equal to a distance when the viewpoint follows the object while maintaining a substantially constant distance from the object, the color of the edge line of the object may be maintained substantially constant. Thus, in a mode in which the viewpoint follows the object while maintaining the distance between the object and the viewpoint substantially constant, the color of the edge line of the object hardly changes, thereby generating a more natural image.

In the game system, program and image generating method according to this embodiment, the color of the edge line of the object may be set to the second color when the distance from the viewpoint becomes larger than a given threshold value. Thus, the aforementioned problem that the relative thickness of the edge line will be more conspicuous can surely be prevented by setting the color of the edge line to the second color when the distance between the object and the viewpoint becomes larger than the given threshold value.

In the game system, program and image generating method according to this embodiment, as the distance from the viewpoint increases, the image of the edge line of the object may gradually become more transparent. Thus, the image of the edge line can be made more inconspicuous by decreasing the density in the image of the edge line as the distance between the object and the viewpoint increases.

In the game system, program and image generating method according to this embodiment, when the distance from the viewpoint is substantially equal to a distance when the viewpoint follows the object while maintaining a substantially constant distance from the object, a translucency of the edge line of the object may be maintained substantially constant Thus, in a mode in which the viewpoint follows the object while maintaining the distance between the object and the viewpoint substantially constant, the translucency (density) of the edge line of the object hardly changes, thereby generating a more natural image.

In the game system, program and image generating method according to this embodiment, the image of the edge line of the object may substantially disappear when the distance from the viewpoint becomes larger than a given threshold value. Thus, the aforementioned problem that the relative thickness of the edge line will be more conspicuous can surely be prevented by making the image of the edge line completely transparent when the distance between the object and the viewpoint becomes larger than the given threshold value.

An embodiment of the present invention further provides a game system which performs image generation, comprising: means which draws an image of an edge line of an object; means which changes the image of the edge line of the object depending on a size of the object that has been perspectively transformed; and means which generates an image as viewed from a given viewpoint within an object space. A computer-usable program embodied on an information storage medium or in a carrier wave according to this embodiment of the present invention comprises a processing routine for executing the above-described means.

According to this embodiment, the image of the edge line changes in respect to any of various parameters thereof such as color, translucency (density), brightness, tint, lightness or chroma, depending on the size of the perspectively transformed object (size relative to the pixel). Thus, the image of the edge line can be formed into a high-quality image optimally matching the size of the object.

The size of the object may be any of various parameters such as the total number of pixels in the object (or the number of longitudinal pixels×the number of transverse pixels), the number of longitudinal pixels, the number of transverse pixels and so on.

Alternatively, the size of the object may be that of a virtual object which encloses the image of the perspectively transformed object and the size of which changes depending on the size of the perspectively transformed object.

In the game system, program and image generating method according to this embodiment, as the size of the perspectively transformed object decreases, color of the edge line of the object may gradually become a given second color. Thus, the color of the edge line of the object may become the second or inconspicuous color when the size of the object on the screen becomes smaller.

In the game system, program and image generating method according to this embodiment, when the size of the perspectively transformed object is substantially equal to a size of the object when the viewpoint follows the object while maintaining a substantially constant distance from the object, the color of the edge line of the object may be maintained substantially constant. Thus, in a mode in which the viewpoint follows the object while maintaining the distance between the object and the viewpoint substantially constant, the color of the edge line of the object hardly changes, thereby generating a more natural image.

In the game system, program and image generating method according to this embodiment, the color of the edge line of the object may be set to the second color when the size of the perspectively transformed object becomes smaller than a given threshold value. Thus, the aforementioned problem that the relative thickness of the edge line becomes more conspicuous can surely be prevented by setting the color of the edge line to the second color when the size of the perspectively transformed object becomes smaller than a given threshold value.

In the game system, program and image generating method according to this embodiment, as the size of the perspectively transformed object decreases, the image of the edge line of the object may gradually become more transparent. Thus, when the size of the object on the screen is smaller, the image of the edge line can be made more inconspicuous by decreasing the density of the image of the edge line of the object.

In the game system, program and image generating method according to this embodiment, when the size of the perspectively transformed object is substantially equal to a size of the object when the viewpoint follows the object while maintaining a substantially constant distance from the object, a translucency of the edge line of the object may be maintained substantially constant. Thus, in a mode in which the viewpoint follows the object while maintaining the distance between the object and the viewpoint substantially constant, the translucency (density) of the edge line of the object hardly changes, thereby generating a more natural image.

In the game system, program and image generating method according to this embodiment, the image of the edge line of the object may substantially disappear when the size of the perspectively transformed object becomes smaller than a given threshold value. Thus, the aforementioned problem that the relative thickness of the edge line will be more conspicuous can surely be prevented by making the image of the edge line completely transparent when the size of the object becomes smaller than the given threshold value.

In the game system, program and image generating method according to this embodiment, the image of the edge line of the object may be drawn in an outside area of edge of the object. In this case, it is desirable to use a technique of changing the color of the edge line depending on the distance from the viewpoint or the size of the perspectively transformed object when the edge line is drawn in the outside area of the edge of the object.

If the edge line is to be drawn in the outside area of the edge of the object, at least part of the edge line may be drawn in the outside area of the edge while the other edge line part may he drawn in the inside area of the edge.

In the game system, program and image generating method according to this embodiment, the image of the edge line of the object may be drawn in an inside area of edge of the object. In this case, it is desirable to take a technique of changing the translucency (density) of the edge line depending on the distance from the viewpoint or the size of the perspectively transformed object when the edge line is drawn in the inside area of the edge of the object.

The preferred embodiment of the present invention will be described in more detail with reference to the drawings.

1. Configuration

FIG. 1 shows a block diagram of a game system (image generating system) according to this embodiment. In this figure, this embodiment may comprise at least a processing section 100 (or a processing section 100 with a storage section 170). Each of the other blocks may take any suitable form.

A control section 160 is used to input operational data from the player and the function thereof may be realized through any suitable hardware means such as a lever, a button, a housing or the like.

The storage section 170 provides a working area for the processing section 100, communication section 196 and others. The function thereof may be realized by any suitable hardware means such as RAM or the like.

An information storage medium (which may be a computer-usable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (or programs and data) for executing the means of the present invention (or this embodiment) which are particularly represented by the blocks included in the processing section 100.

Part or the whole of the information stored in the information storage medium 180 will be transferred to the storage section 170 when the system is initially powered on. The information stored in the information storage medium 180 may contain at least one of program code set for processing the present invention, image data, sound data, shape data of objects to be displayed, table data, list data, information for instructing the processings in the present invention, information for performing the processings according to these instructions and so on.

A display section 190 is to output an image generated according to this embodiment and the function thereof can be realized by any suitable hardware means such as CRT, LCD or HMD (Head-Mount Display).

A sound output section 192 is to output a sound generated according to this embodiment and the function thereof can be realized by any suitable hardware means such as speaker.

A portable information storage device 194 is to store the player's personal data and save data and may be take any suitable is form such as memory card, portable game machine and so on.

A communication section 196 is designed to perform various controls for communication between the game system and any external device (e.g., host device or other image generating system). The function thereof may be realized through any suitable hardware means such as various types of processors or communication ASIS or according to any suitable program.

The program or data for executing the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section (processor) 100 is to perform various processings such as game processing, image generating or sound generating, based on the control data or program from the control section 160. The function of the processing section 100 may be realized by any suitable processor (CPU, DSP or the like), any suitable hardware means such as ASIC (gate array or the like) or a given program (game program).

The processing section 100 may be designed to perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space, hit checking, computation of the game results (or scores), processing for causing a plurality of players to play in a common game space and various other game processings including game-over.

The processing section 100 generates an image as viewed from a given viewpoint (or virtual camera) within the object space, based on the aforementioned game processing results and then outputs it toward the display section 190.

The processing section 100 further performs various sound processings to generate BGMs, sound effects or voices, based on the aforementioned game processing results and then outputs the sounds toward the sound output section 190.

All the functions of the image and sound processing sections 140, 150 may be realized by any suitable hardware means or according to the program. Alternatively, these functions may be realized by both the hardware means and program.

The processing section 100 comprises a geometry-processing section 110, a virtual object generating section 112, an edge-line image changing section 114 and a drawing section 120.

The geometry-processing section 110 is to perform various geometry-processings (or three-dimensional computation) such as coordinate transformation, clipping, perspective transformation or light-source computation with reference to the object. The resulting drawing data (such as vertex coordinates, texture coordinates, color (brightness) data, normal vector or alpha value) is stored and saved in a main storage section 172 of the storage section 170.

The virtual object generating section 112 is to generate a virtual object onto which a mapping image is to be mapped. This mapping image is generated by a mapping image generating section 122 included in the drawing section 120 as will be described later.

In this embodiment, this virtual object (which is, in a narrow sense, a virtual polygon) is one that encloses the whole or part of the image of an object after perspectively transformed or transformed into the screen coordinate system and that changes its size depending on the size of the perspectively transformed object. In other words, the size of the virtual object changes depending on the screen area occupied by the object. The mapping image generated by the mapping image generating section 122 will be mapped onto such a virtual object. Therefore, the texture mapping and virtual object drawing processes can more effectively be performed.

The edge-line image changing section 114 is to change the image of an edge line to be applied to the object depending on the distance between the object and the viewpoint or the size of the perspectively transformed object (size relative to the pixel).

More particularly, the edge-line image changing section 114 is to perform a process of making the color of the edge line a given second color (which includes a process of setting first and second colors, a process of determining an interpolation coefficient used to interpolate between the first and second colors and other processes), depending on the distance between the object and the viewpoint or the size of the perspectively transformed object (or the size of the object on the screen).

Alternatively, the edge-line image changing section 114 may transparentize the image of the edge line of the object, depending on the distance between the object and the viewpoint or the size of the object. In other words, the edge-line image changing section 114 may perform a process of synthesizing the images of the object and its edge line together to form a translucent synthesized image having its translucency which is determined depending on the distance between the object and the viewpoint or the size of the perspectively transformed object. including a process of determining the translucency, a process of determining the order of drawing and so on.

The drawing section (or object/edge-line drawing section) 120 is to draw a geometry-processed object (model) or the edge line of the object in a drawing region 174 which can store the image information by pixel, such as frame buffer or work buffer.

More particularly, the drawing section 120 performs the drawing process so that the image of the edge line generated by the image of the object (e.g. the image of the perspectively transformed object or the image of the object on the drawing region) will be drawn in the outside or inside area of the edge of the object.

The drawing section 120 comprises a mapping image generating section 122, a texture mapping section 130, a synthesizing section 132 and a hidden-surface removal section 134.

The mapping image generating section 122 is to generate a mapping image which includes object color information set relative to the inside area of the edge of the object and edge color information set relative to the outside area of the edge of the object.

The texture mapping section 130 is to map a texture stored in a texture storage section 176 onto the object.

More particularly, the texture mapping section 130 performs a process of mapping the mapping image generated by the mapping image generating section 122 onto a virtual object generated by the virtual object generating section 112. At this time, the texture mapping section 130 maps the generated mapping image onto the virtual object through the texel interpolation (which is, in a narrow sense, a bi-linear filter) while shifting the texture coordinates, for example, by a value smaller than one texel (or pixel). For example, the texture coordinates may be shifted from such texture coordinates as obtained based on the position in which the mapping image is drawn. Thus, the edge line of the object can be drawn with reduced processing load.

The synthesizing section 132 is to perform a mask process or a translucence processing using an alpha ($\alpha$) value. The alpha value (A-value) is information stored relating to each of the pixels. For example, the alpha value may be additional information other than color information. The alpha value can be used as mask information, translucency (which is equivalent to transparency or opacity), bump information and so on.

The hidden-surface removal section 134 is to use z-buffer (or z-plane) storing Z-value (or depth value) for performing the hidden-surface removal according to the algorism of Z-buffer process.

For example, in the case that the edge line is to be drawn in the outside area of the edge of the object, it is desirable that a Z-value obtained based on the object information (vertex coordinates or the like) is first set relative to a virtual object and that the virtual object is then subjected to the hidden-surface removal based on the set Z-value. Thus, the optimum Z-value enabling the proper hidden-surface removal can be set relative to the edge line through a simplified procedure in which the z-value (or depth value) obtained from the object information is simply set relative to the virtual object.

On the other hand, in the case that the edge line is to be drawn in the inside area of the edge of the object, it is desirable that the Z-value of the object in the position in which the edge line is to be drawn is set as that of the edge line for performing the hidden-surface removal for the edge line. Thus, the optimum Z-value can be set relative to the edge line to realize the proper hidden-surface removal between that object and another object.

The hidden-surface removal may be performed through the. depth sorting process (or Z sorting process) in which primitive surfaces are sorted depending on the distance between the object and the viewpoint, thereby drawing the primitive surfaces sequentially starting from the farthest primitive surfaces relative to the viewpoint.

The game system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

Figure 2:
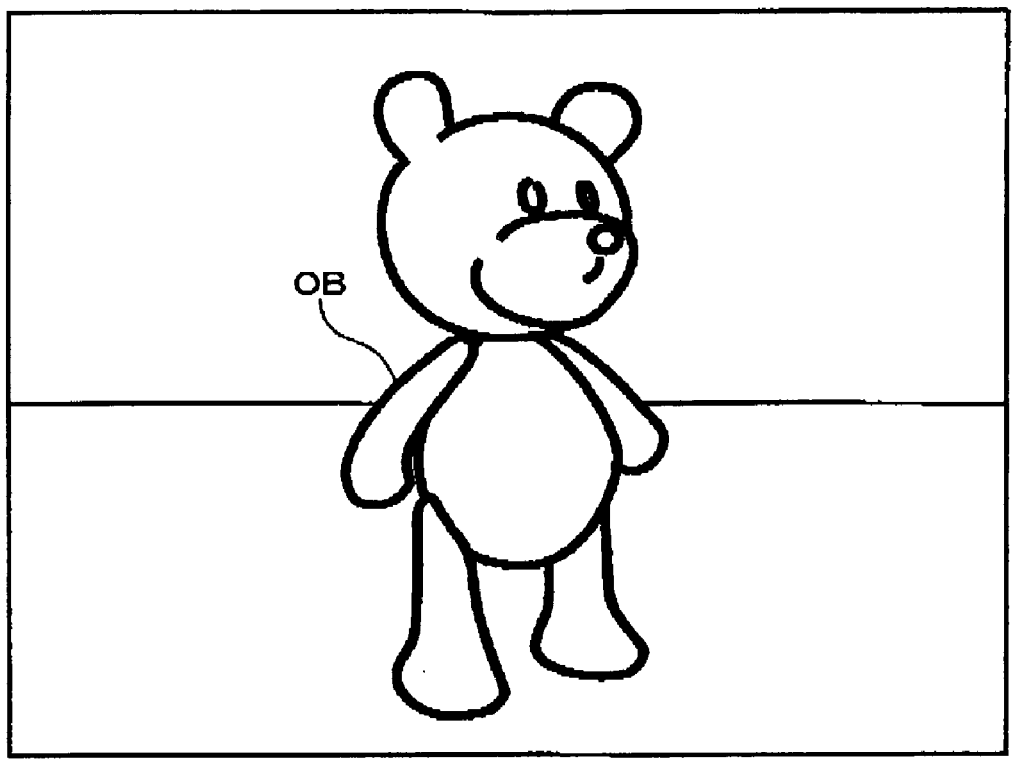
FIG. 2 is an image generated according to this embodiment.

2. Features of This Embodiment 2.1 Process of Changing the Image of the Edge Line FIG. 2 shows a game image generated by the game system according to this embodiment. As shown in FIG. 2, this embodiment successfully generates a cellular picture-like image familiar to many people through the animated cartoon by drawing a thick edge line along the edge of an object OB configured by polygons.

However, it has been found that such an edge-line drawing process raised a problem in that if the distance between the object and the viewpoint is farther (or the size of the perspectively transformed object is smaller), the relative thickness of the edge line unnecessarily becomes conspicuous (or is unnecessarily emphasized).

In a three-dimensional game, the viewpoint of a player (or virtual camera) is moved to an arbitrary position depending on the operational input from the player. Thus, an object representing a character is correspondingly moved to an arbitrary position. This means that the distance between the player's viewpoint and the object is also variable to change the size of the perspectively transformed object (or the relative size of the object relative to the pixel on the screen).

If an edge line having its constant thickness (e.g., one pixel) is to be drawn relative to an object having its variable size, the following problem will be raised.

Figure 3:
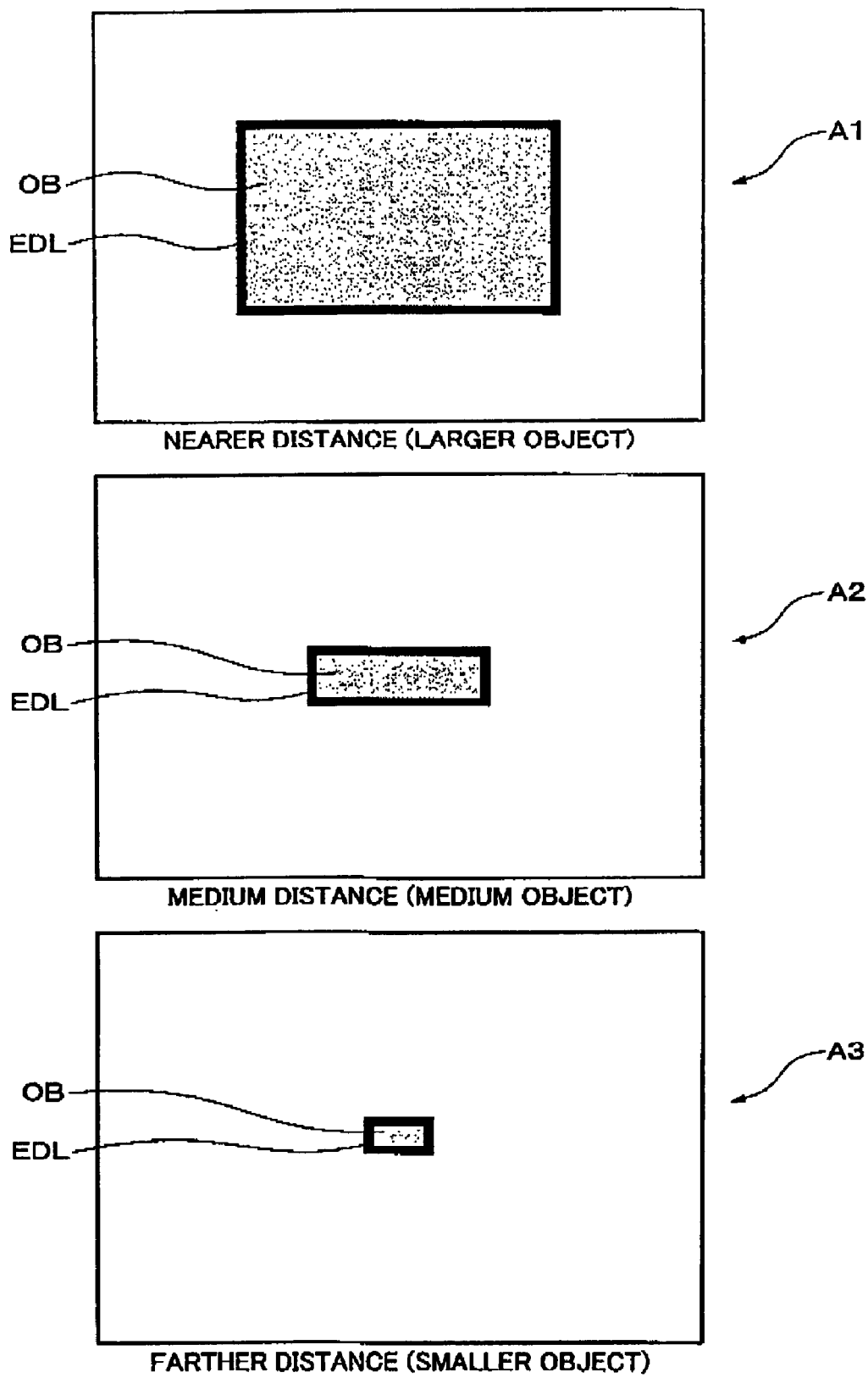
FIG. 3 illustrates a problem raised from the fact that if the distance between an object and the viewpoint increases (or if the size of a perspectively transformed object decreases), the edge line of the object will unnecessarily be conspicuous.

If the distance between the viewpoint and the object OB is nearer (e.g., the screen area occupied by the object being larger) as shown by A1 in FIG. 3, the edge line EDL of the object is not very conspicuous, thereby providing a natural image.

However, if the distance between the viewpoint and the object OB is farther (e.g., the screen area occupied by the object being smaller) as shown by A2 and A3 in FIG. 3, the edge line EDL of the object is unnecessarily conspicuous, thereby providing an unnatural image.

Particularly, if the total number of pixels in the object OB (the number of longitudinal pixels×the number of transverse pixels) becomes equal to 1 to 10 pixels as shown by A3, the object OB will be looked as if it is filled with the color of the edge line EDL. If the color of the object OB is red while the color of the edge line EDL is black, the image of the object OB, which should inherently be looked to be red, will be looked as if it is a black-colored spot.

To overcome this problem, this embodiment changes the image of the edge line of the object, depending on the distance between the object and the viewpoint or the size of the perspectively transformed object. In this case, the technique of changing the image of the edge line may be either of a technique of changing the color of the edge line or a technique of changing the translucency (density) of the edge line.

2.2 Process of Changing the Color of the Edge Line

When the color of the edge line is to be changed, it may gradually become a given second color as the distance between the object and the viewpoint increases or as the size of the perspectively transformed object (or the size of the object relative to the pixel) decreases.

Figure 4:
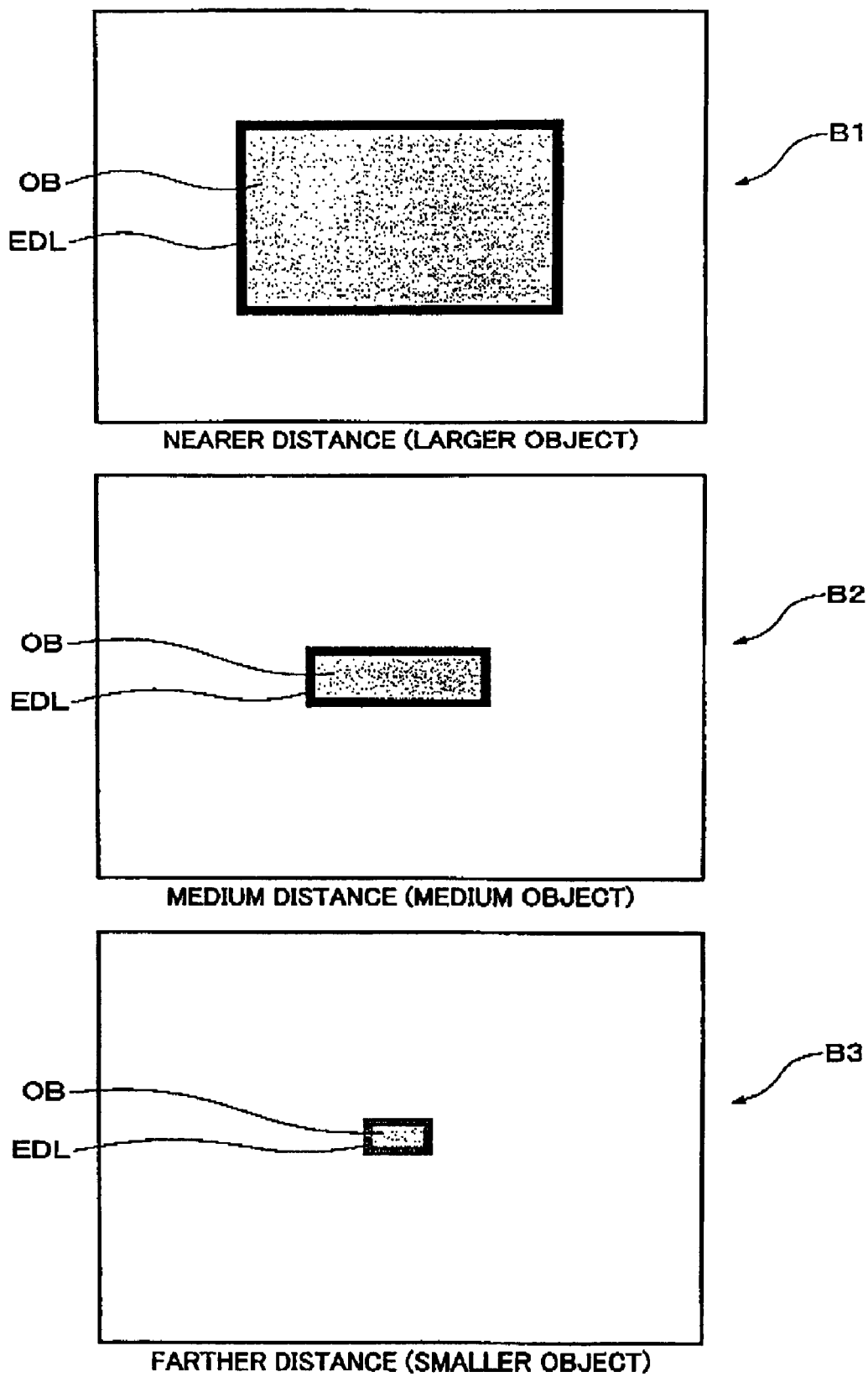
FIG. 4 illustrates a technique of changing the color of the edge line depending on the distance between the object and the viewpoint or the size of the perspectively transformed object.

More particularly, as shown by B1 and B2 in FIG. 4, the color of the edge line EDL is determined through the interpolation between first and second colors so that the color of the edge line EDL on the object OB gradually changes from the first or deeper color to the second or thinner color, as the distance between the object and the viewpoint increases (or the size of the perspectively transformed object decreases) As the distance between the object and the viewpoint is sufficiently farther (or the size of the perspectively transformed object is sufficiently smaller), the color of the edge line EDL will be very thin second color, as shown by B3.

As will be apparent from the comparison between A2 of FIGS. 3 and B3 of FIG. 4, this can overcome such a problem that the thickness of the edge line EDL is unnecessarily conspicuous. As will also be apparent from the comparison between A3 of FIG. 3 and B3 of FIG. 4, such a problem that the object OB is looked as if it is filled with the color of the edge line EDL can also be overcome. If it is assumed, for example, that the color of the object OB is red while the color of the edge line EDL is black, the color of the object OB will not be filled with the black color, thereby providing a more natural image, even though the distance between the object and the viewpoint sufficiently increases.

The technique of controlling the color of the edge line depending on the distance between the object and the viewpoint or the size of the object may be any of various techniques.

Figure 5A:
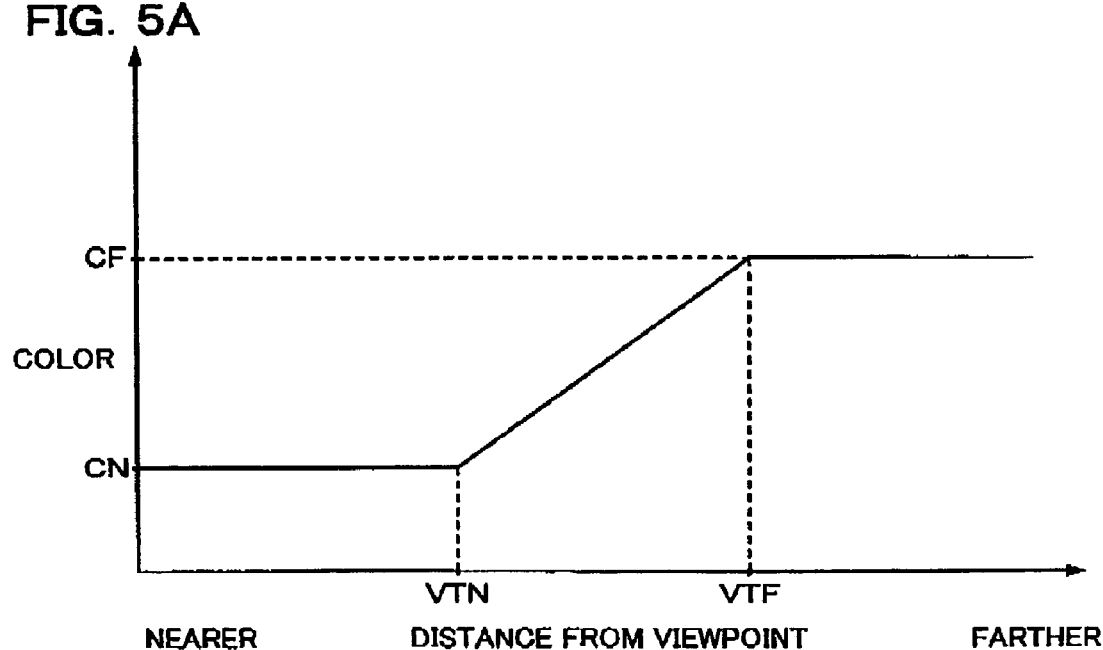

If it is assumed, for example, that the distance between the object and the viewpoint becomes larger than a threshold value VTN as shown in FIG. 5A, the nearer-range or first color CN of the edge line begins to change gradually becomes the farther-range or second color CF. Thus, the edge line will gradually be inconspicuous.

When the distance between the object and the viewpoint is larger than another threshold value VTF, the color of the edge line is set to the farther-range color CF The color of the edge line of the object is very thinned as shown by B3 in FIG. 4. Thus, such a problem that the object will be looked as if it is filled with the color of the edge line can be overcome.

Figure 5B:
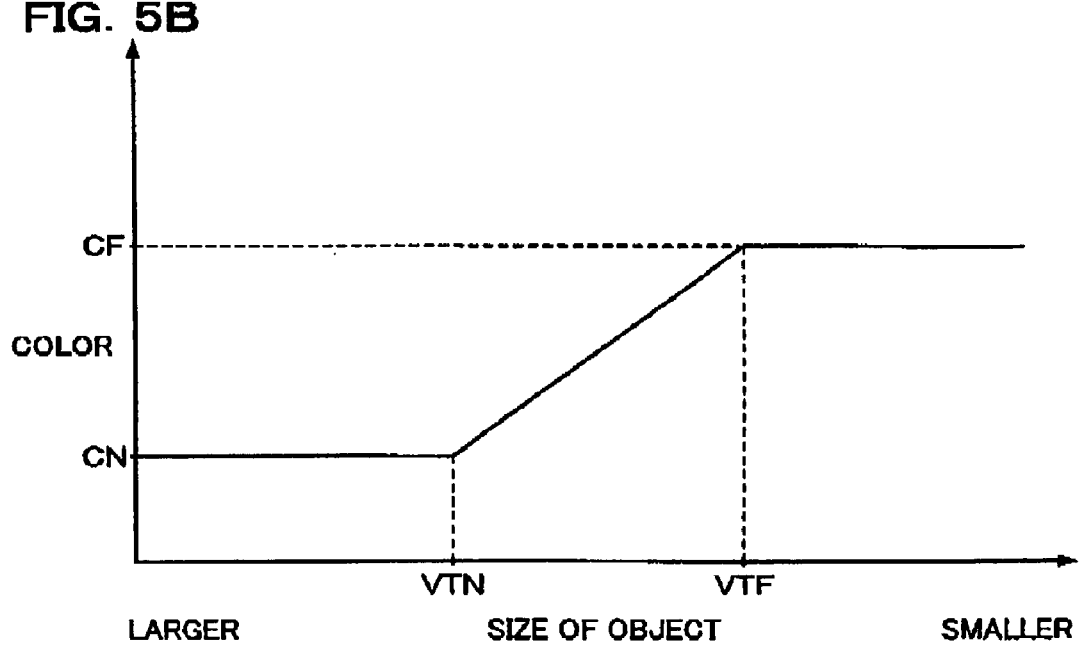
FIG. 5B shows the characteristic of a function between the size of the perspectively transformed object and the color of the edge line.

In FIG. 5B, the nearer-range color CN of the edge line begins to change gradually into the farther-range color CF when the size of the object becomes smaller than the threshold VTN.

When the size of the object becomes smaller than the threshold VTF, the color of the edge line is set to CF. Thus. the edge line of the object is very thinned as shown by B3 in FIG. 4.

By changing the color of the edge line depending on the distance between the object and the viewpoint or the size of the perspectively transformed object in the aforementioned manner, the problem described in connection with FIG. 3 can be overcome.

2.3 Process of Changing the Translucency of the Edge Line

When the translucency of the edge line is to be changed, the image of the edge line is made more transparent as the distance between the object and the viewpoint increases or as the size of the perspectively transformed object decreases. For example, the image of the object may be translucent-synthesized (or alpha blending) with the image of the edge line of the object using a translucency (which is equivalent to transparency or opacity) determined by the distance between the object and the viewpoint or the size of the perspectively transformed object.

More particularly, as shown by C1 and C2 in FIG. 6, the edge line EDL is made more transparent by changing the translucency of the edge line EDL of the object OB as the distance between the object and the viewpoint increases (or as the size of the perspectively transformed object decreases). If the distance between the object and the viewpoint sufficiently increases (or the size of the perspectively transformed object sufficiently decreases), the image of the edge line EDL substantially disappears, as shown by C3.

As will be apparent from the comparison between A2 of FIG. 3 and C2 of FIG. 6, this can overcome such a problem that the thickness of the edge line EDL is unnecessarily conspicuous. As will also be apparent from the comparison between A3 of FIG. 3 and C3 of FIG. 6, such a problem that the object OB will be looked as if it is filled with the color of the edge line EDL can also be overcome. If it is assumed, for example, that the color of the object OB is red while the color of the edge line EDL is black, the color of the object OB is represented by its inherent red color without being filled with the black color, thereby providing a more natural image, even though the distance between the object and the viewpoint sufficiently increases.

The technique of controlling the translucency of the edge line depending on the distance between the object and the viewpoint or the size of the object may be any of various techniques.

Figure 7A:
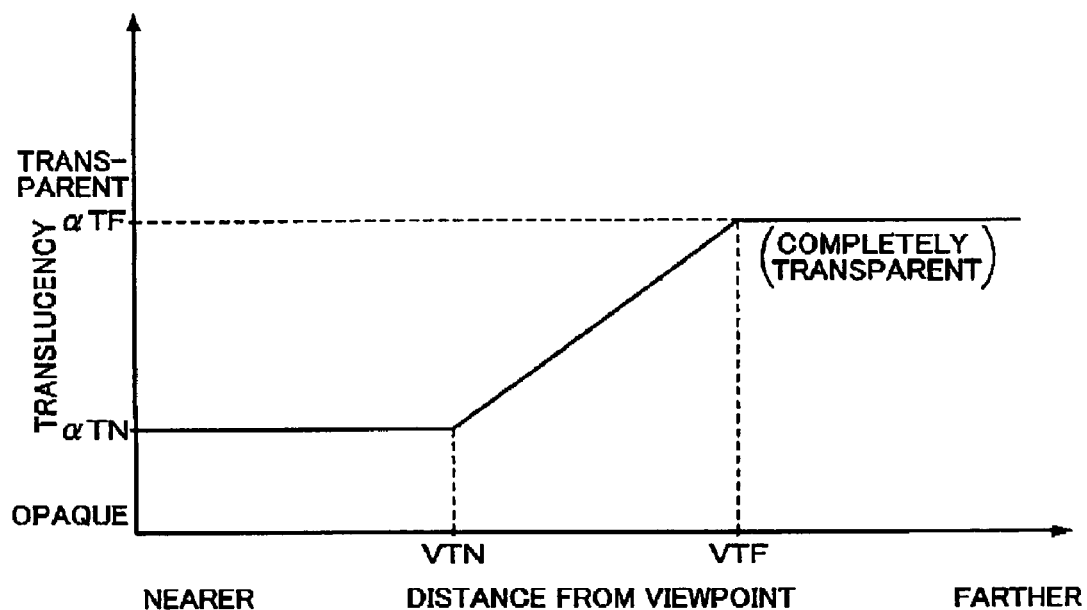

For example, if the distance between the object and the viewpoint is larger than the threshold value VTN as shown in FIG. 7A, the translucency $\alpha T$ begins to change starting from its nearer-range translucency $\alpha TN$. Thus, the edge line of the object begins to be transparent. As a result, the edge line will gradually be inconspicuous.

When the distance between the object and the viewpoint is larger than the threshold value VTF, the translucency αT is set to the farther-range translucency αTF. Thus, the edge line of the object is made completely transparent (or disappears) as shown by C3 in FIG. 6. As a result, such a situation that the object is filled with the color of the edge line can be avoided.

Figure 7B:
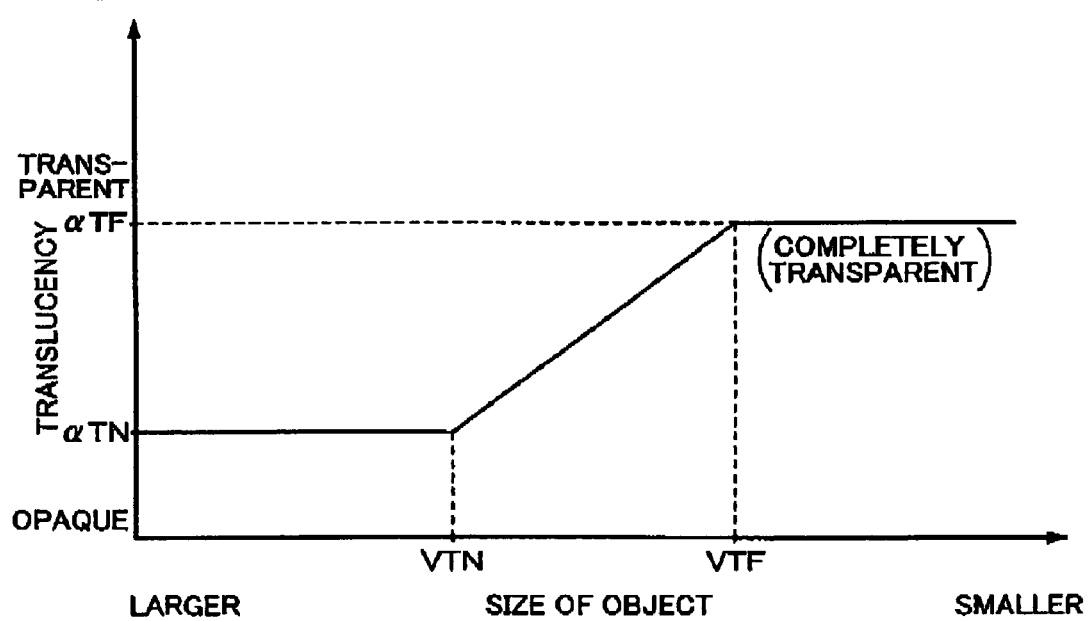
FIG. 7B shows the characteristic of a function between the size of the perspectively transformed object and the translucency of the edge line.

FIG. 7B shows that as the size of the object is smaller than the threshold value VTN, the translucency αT begins to change starting from its nearer-range translucency αTN. Thus, the edge line of the object begins to be transparent.

When the size of the object is smaller than the threshold value VTF, the translucency αT is set to the farther-range translucency αTF. At this time, the edge line of the object will be completely transparent (or disappears) as shown by C3 in FIG. 6.

By changing the translucency of the edge line depending on the distance between the object and the viewpoint or the size of the perspectively transformed object in the aforementioned manner, the problem described in connection with FIG. 3 can effectively be overcome.

Although it is particularly desirable from the viewpoint of processing load reduction that the distance from the viewpoint described in connection with FIGS. 5A and 7A is the depth distance (or z-value) of the object (or its representative point), the present invention is not limited to such an aspect. For example, it may be the linear distance between the viewpoint and the object. Alternatively, the distance from the viewpoint may be any of various other parameters which can provide the similar effect as in the depth distance or linear distance.

Although it is desirable from the viewpoint of processing load reduction that the size of the object described in connection with FIGS. 5B and 7B is represented by the total number of pixels (the number of longitudinal pixels×the number of transverse pixels) in the object, the present invention is not limited to such an aspect. For example, the size of the object may be represented by either of the number of longitudinal pixels or the number of transverse pixels. Alternatively, the size of the object may be represented by any of various other parameters which can provide the similar effect as in the number of pixels.

2.4 Setting of the Color and Translucency

When the object OB moves in the three-dimensional game, the viewpoint VP (or virtual camera) frequently follows the object OB while maintaining a substantially constant distant ZVB between the object OB and the viewpoint VP, as shown in FIG. 8A.

In such situation, if the color or the translucency of the edge line is frequently variable depending on the distance between the object and the viewpoint or the size of the object as shown in FIGS. 4 and 6, an image looked to be unnatural for a player will be generated.

To overcome such a problem, this embodiment maintains the color or translucency of the edge line of the object OB substantially constant if the distance between the object OB and the viewpoint VP is substantially equal to a distance ZVB held when the viewpoint VP follows the object OB (which will be referred to "the follow mode"). Alternatively, the color or translucency of the edge line of the object OB is maintained substantially constant if the size of the perspectively transformed object OB is equal to that of the object in the follow mode (or the size of the object in the distance ZVB). More particularly, the threshold value VTN has been set at a distance larger than the distance ZVB (or a value smaller than the size of the object OB in the follow mode). As will be apparent from the functional characteristics of FIGS. 5A, 5E, 7A and 7B, thus, the color or translucency of the edge line will not change in the follow mode. This can overcome the aforementioned problem that an unnatural image will be generated in the follow mode.

If there occurs any event releasing the follow mode and when the distance between VP and OB becomes larger than the threshold value VTN (or the size of the object decreases), the color or translucency of the edge line will change depending on the distance between the object OB and the viewpoint VP or the size of the object OB as shown in FIGS. 4 and 6. This can overcome such a problem that the occurrence of the aforementioned event increase the distance between the viewpoint and the object to made the relative thickness of the edge line unnecessarily conspicuous.

When the upper threshold value VTF (or a given threshold value) is set as shown in FIGS. 5A, 5B, 7A and 7B, the following advantages can be provided.

If the edge line EDL is not colored by the second or thinner color or if the edge line EDL is not completely transparentized when the size of the object OB decreases as shown by A3 of FIG. 3, there will be generated an unnatural image in which the object OB is looked as if it is filled with the color of the edge line EDL.

The threshold value VTF has been set such value that the color of the edge line EDL is the second or thinner color or the edge line EDL is completely transparentized when the size of the object OB is as shown by A3 of FIG. 3. Thus, when the size of the object OB is as shown by A3 of FIG. 3, the edge line EDL becomes inconspicuous as shown by B3 of FIG. 4 or C3 of FIG. 6. This can prevent such a problem that such an unnatural image as shown by A3 of FIG. 3 will be generated.

By changing the color or translucency of the edge line between the threshold values VTN and VTF, there can be overcome such a problem that the player can know when the color or translucency of the edge line changes.

2.5 Advantages and Problems

The technique of controlling the color of the edge line shown in FIGS. 4 to 5B does not require the translucence processing between the image of the edge line and the image of the object, unlike the technique of controlling the translucency of the edge line shown in FIGS. 6 to 7B. Thus, the first-mentioned technique is advantageous in that it is not required to manage the order of drawing in the edge line or to perform the Z-sort process between the object in question and another object.

On the other hand, the technique of controlling the color of the edge line in FIGS. 4 to 5B raises the following problem.

If the color of the object OB is monotone (e.g., only red), no problem occurs. However, the color of the object OB is rarely monotone, and the object OB on which the texture has been mapped is generally two or more colors.

In such a case, the technique of controlling the color of the edge line to make the thickness of the edge line EDL inconspicuous may not provide a remarkable advantage.

Figure 9A:
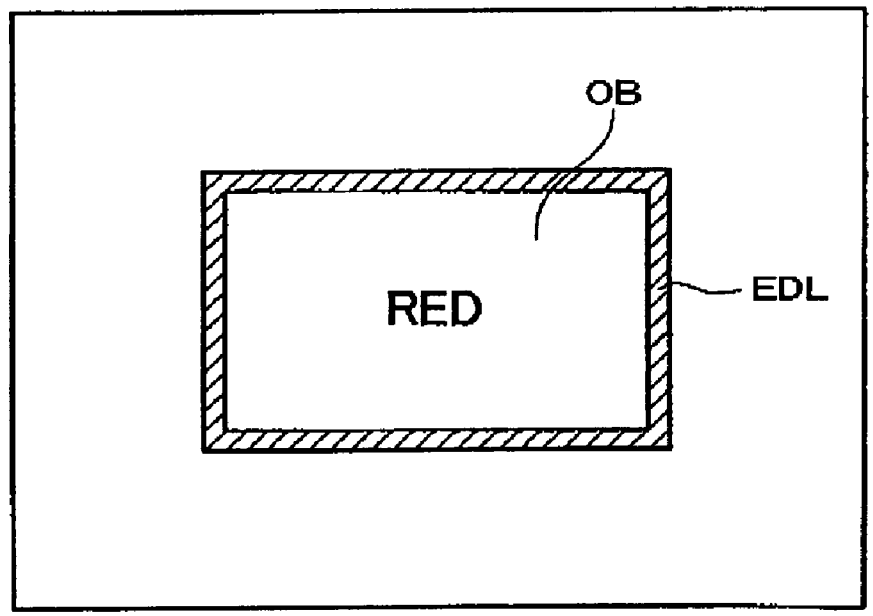
FIGS. 9A and 9B illustrate a problem raised in a technique of controlling the color of the edge line.

In the case of FIG. 9A, the thickness of the edge line will not be conspicuous if the color of the edge line EDL is changed, for example, to thin red as the distance between the object and the viewpoint increases and even though the size of the object OB significantly decreases.

Figure 9B:
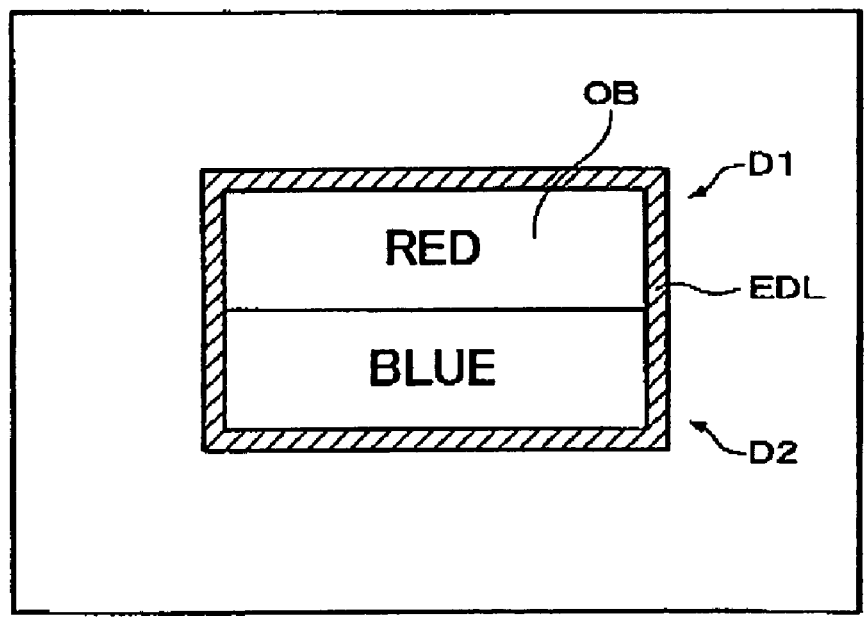

In the case of FIG. 9B, the thickness of the edge line EDL will be inconspicuous at its part D1 if the color of the edge line EDL is changed to the thinner red as the distance between the object and the viewpoint increases. However, the thickness of the edge line EDL will be left conspicuous since the difference between the blue and red colors is conspicuous at another part D2 of the edge line.

On the contrary, the technique of controlling the translucency of the edge line shown in FIGS. 6 to 7B can make the thickness of the edge line EDL inconspicuous as the distance is between the object and the viewpoint increases and even if the object OB is colored with two or more colors as shown in FIG. 9B. In other words, the color of the edge line at the part D1 gradually becomes the red color that is inherent in the part D1 while the color of the edge line at the part D2 gradually becomes the red color that is inherent in the part D2.

When the object OB is colored by two or more colors, the technique of controlling the translucency of the edge line is advantageous over the technique of controlling the color of the edge line.

However, the technique of controlling the translucency of the edge line is disadvantageous in that it requires a process of controlling the order of drawing in the edge line. Particularly, if the edge line EDL is to be drawn in the outside area of the edge line EDL of the object OB as shown in FIG. 10A, the Z-sorting process is required between the edge line EDL and another object OB2 (or background).

Figure 11A:
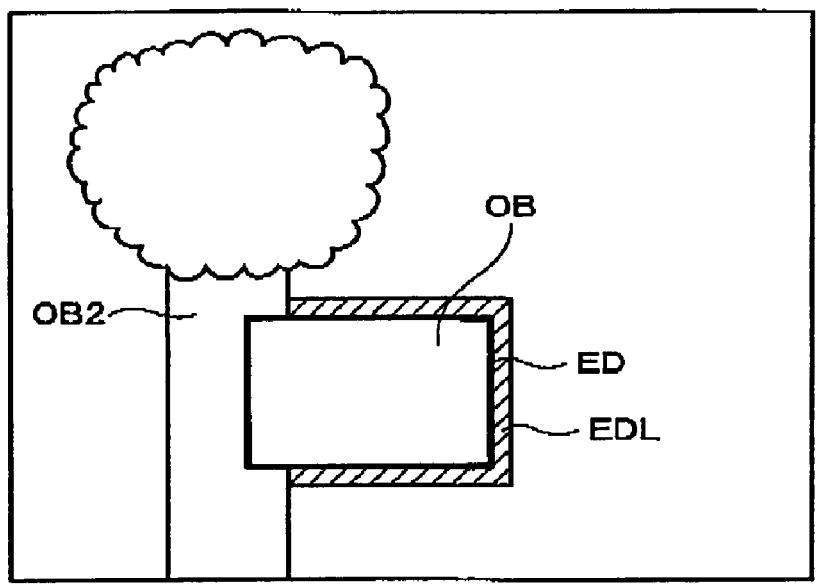
FIGS. 11A and 11B illustrate a problem raised if an edge line is to be drawn along the outside area of edge of the object.

If the Z-sorting process (or hidden-surface removal) is not properly performed in such a case, a problem will be raised in that the edge line EDL is hidden by the object OB2, as shown in FIG. 11A.

Figure 11B:
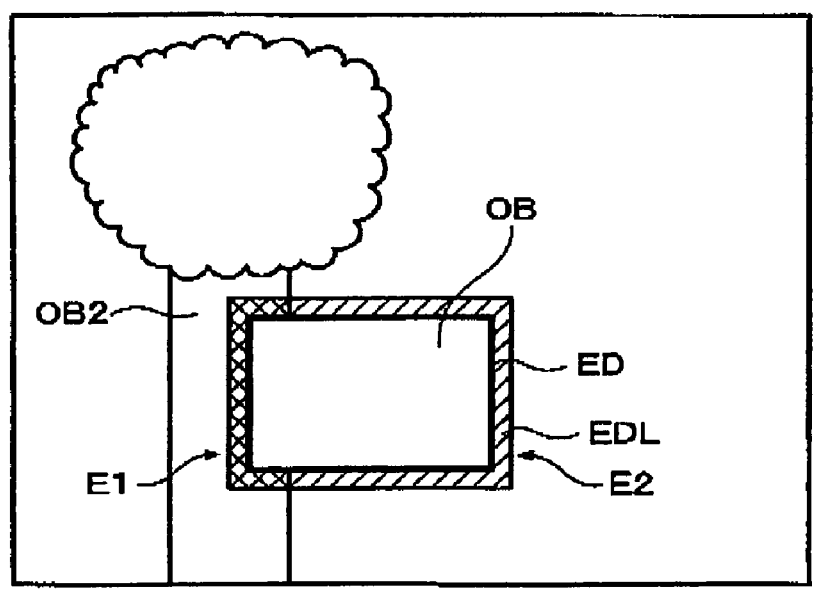
Figure 12:
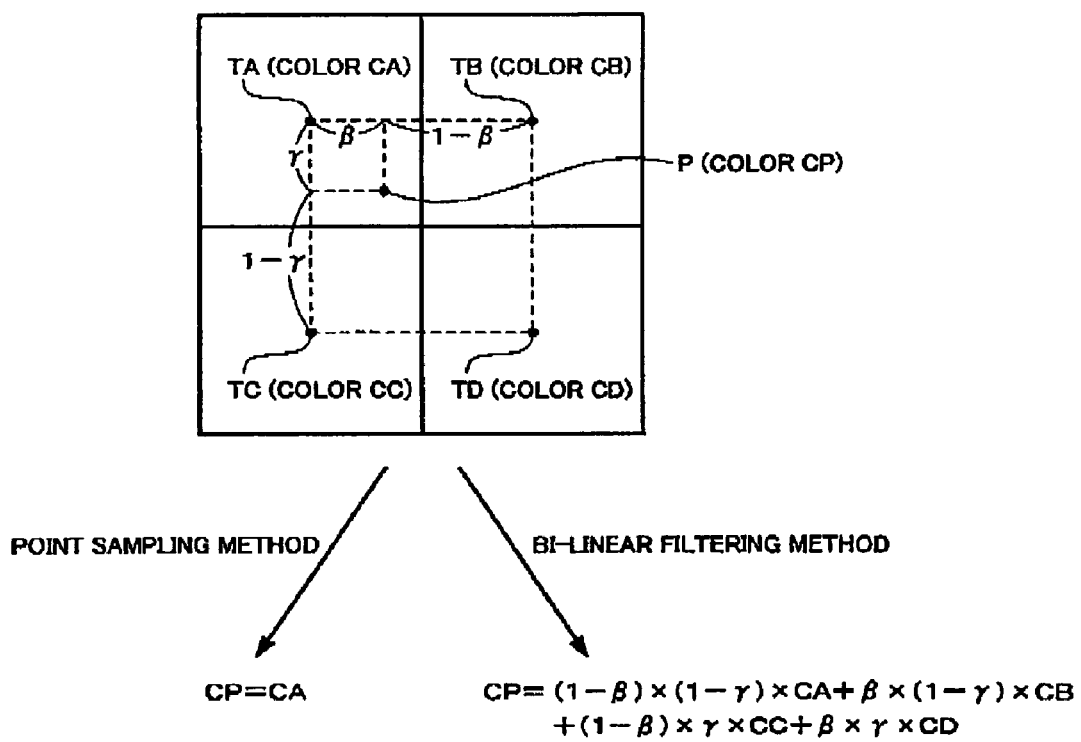
FIG. 12 illustrates the bi-linear filtering type texture mapping.

Even if the Z-sorting process is properly performed, the parts of the edge line EDL shown by E1 and E2 in FIG. 11B will be different in color from each other. This will provide an unnatural image.

Figure 10A:
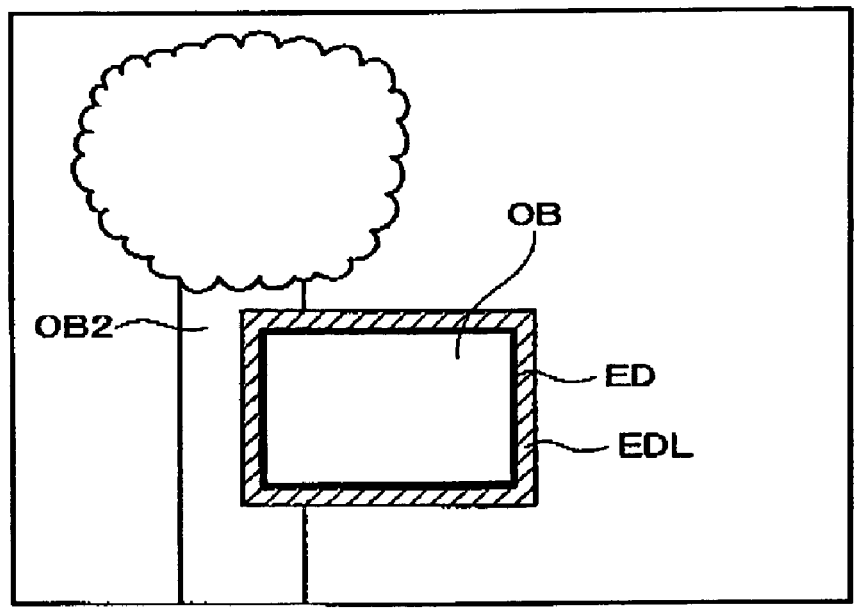
FIGS. 10A and 10B illustrate a technique of drawing edge lines along the outside and inside areas of the edge of an object.
Figure 10B:
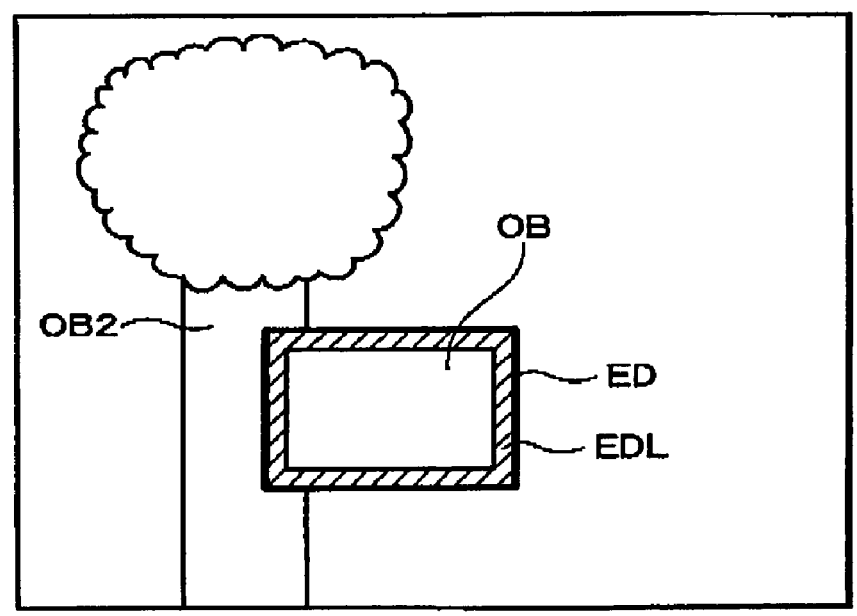

The technique of controlling the translucency of the edge line is not suitable for the case where the edge line EDL is to be drawn in the outside area of the edge ED as shown in FIG. 10A, but optimum for the case where the edge line EDL is to be drawn in the inside area as shown in FIG. 10B. If the edge line is to be drawn in the inside area of the edge, such problems as shown in FIGS. 11A and 11B will not occur only by drawing the object first and then drawing the edge line. This is because the object and edge line will properly be translucent-synthesized.

Reversely speaking, the technique of controlling the color of the edge line described in connection with FIGS. 4 to 5B is advantageous if the edge line EDL is to be drawn in the outside area of the edge ED of the object OB. The technique of controlling the color of the edge line has such problems as described in connection with FIGS. 9A and 9B, but is advantageous in that it does not require to consider the order of drawing in the edge line and thus less possible to create such problems as shown in FIGS. 11A and 11B.

2.6 Drawing of the Edge Line Using the Bi-Linear Filtering Type Texture Mapping

This embodiment draws the edge line effectively using the bi-linear filtering (in a broad sense, texel interpolation) type texture mapping.

The texture mapping may create a positional difference between the pixel and texel.

In such a case, the color CP (which is, in a broad sense, image information) of a pixel (or sampling point) P in the point sampling method is equal to the color CA of a texel TA which is nearest to the pixel P. on the other hand, the color CP of the pixel P in the bi-linear filtering method is equal to a color obtained by interpolating the colors CA, CB, CC and CD of texels TA, TB, TC and TD which surround the pixel P.

More particularly, a coordinate ratio in the X-axis direction. $\beta:1-\beta(0\leq\beta\leq1)$, and a coordinate ratio in the Y-axis direction, $\gamma:1-\gamma(0\leq\gamma\leq1)$, are determined based on the coordinates of TA to TD and P.

In this case, the color CP of the pixel P (output color in the bi-linear filtering method) will be represented by the following formula:

$$CP=(1-\beta)\times(1-\gamma)\times CA+\beta\times(1-\gamma)\times CB+(1-\beta)\times\gamma\times CC+\beta\times\gamma\times CD \qquad (1)$$

This embodiment draws the edge line utilizing the bi-linear filtering method in which the color is automatically interpolated.

More particularly, as shown in FIG. 13A, a mapping image is generated in which an object color is set in the inside area of the edge ED of the object OB while an edge line color is set in the outside area of the edge ED. This mapping image is set as a texture, as shown by F1 in FIG. 14. This texture is mapped on a virtual polygon (which is, in a broad sense, a virtual object) in the bi-linear filtering method, as shown by F2 in FIG. 14. At this time, texture coordinates given to the vertexes of the virtual polygon are shifted (or deviated or moved), for example, by (0.5, 0.5), in the lower-right direction.

Thus, the color of each of the pixels in the mapping image will automatically infiltrates into the surrounding pixels through the interpolation in the bi-linear filtering method. Therefore, the object color will be mixed with the edge line color in the vicinity of the edge of the object OB to draw the edge line EDL along the edge of the object OB, as shown in FIG. 13B.

According to the technique of this embodiment, the image of the edge line can be generated through the two-dimensional processing on the drawing region. Therefore, this embodiment does not require any three-dimensional processing such as a process of determining an angle included between the sight-line vector and the normal line. This can reduce the processing load on CPU.

According to the technique of this embodiment, the drawing procedure onto the drawing region only requires at least one drawing process for the virtual polygon. This reduces the number of drawing processes necessary to generate the image of the edge line, thereby significantly reducing the processing load on the drawing processor.

It is now assumed that the vertexes VVX1, VVX2, VVX3 and VVX4 of a virtual polygon respectively have coordinates, (X, Y)=(X0, Y0), (X0, Y1), (X1, Y1) and (X1, Y0), respectively. If texture coordinates (U, V) given to the respective vertexes VVX1, VVX2, VVX3 and VVX4 of the virtual polygon are respectively set to (X0, Y0), (X0, Y1), (X1, Y1) and (X1, Y0), the position of each of the pixels will coincide with the position of the corresponding texel. Therefore, the color of each pixel will not infiltrate into the surrounding pixels.

On the contrary, if the texture coordinates (U, V) given to the respective vertexes VVX1, VVX2, VVX3 and VVX4 of the virtual polygon are respectively set to (X0+0.5. Y0+0.5). (X0+0.5, Y1+0.5), (X1+0.5, Y1+0.5) and (X1+0.5, Y0 +0.5), the position of each pixel will be deviated from the position of the corresponding texel. Therefore, the color of each pixel will infiltrate into the surrounding pixels through the bi-linear filtering type interpolation.

Figure 15:
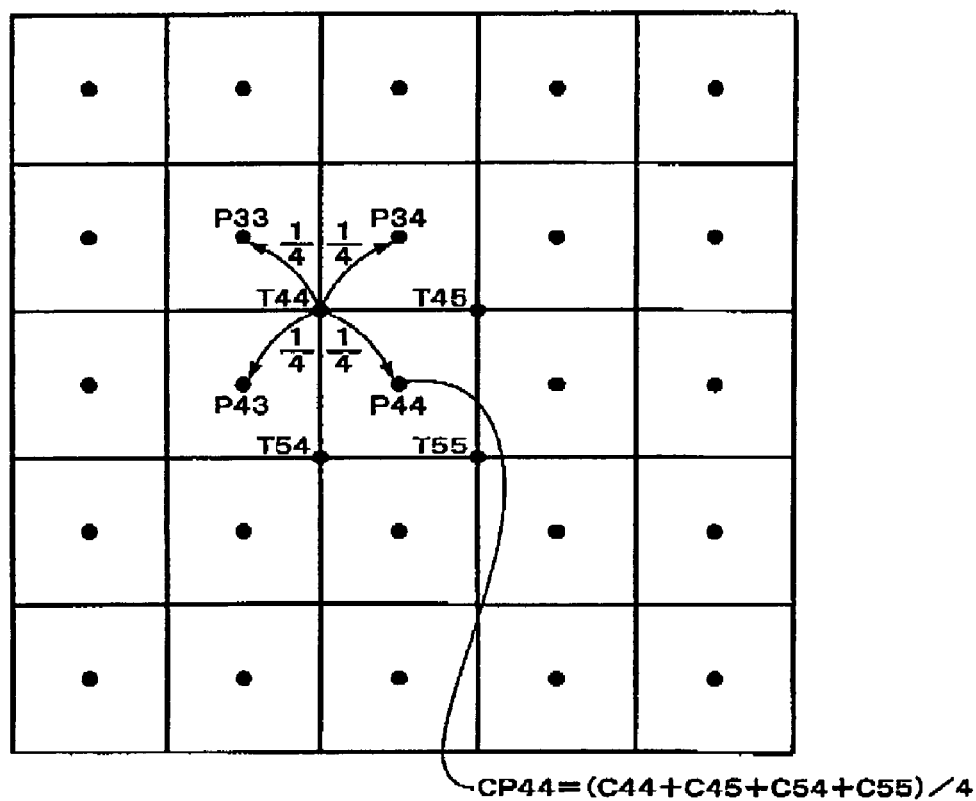
FIG. 15 illustrates the principle of a phenomenon in which the color of each pixel exudes into the surrounding region through the bi-linear filtering type interpolation.

More particularly, if the bi-linear filtering type texture mapping is carried out after the texture coordinates are shifted by 0.5 pixels (texels) in the lower-right direction, $\beta=\gamma=\frac{1}{2}$ in the above formula (1), If the colors of the texels T44, T45, T54 and T55 are respectively C44, C45, C54 and C55 in FIG. 15, therefore, the color CP44 of the pixel P44 is represented by the following formula:

$$CP44=(C44+C45+C54+C55)/4 \qquad (2)$$

If the bi-linear filtering type texture mapping is carried out while shifting the texture coordinates in the lower-right direction, the color C44 of the texel T44, that is, the original color of the pixel P44 will infiltrate into the pixels P33, P34, P43 and P44 by ¼, as shown in FIG. 15. Thus, such an image of the edge line EDL as shown in FIG. 13B can be generated to include the mixture of the edge line and object colors.

2.7 Generation of the Virtual Polygon

Figure 14:
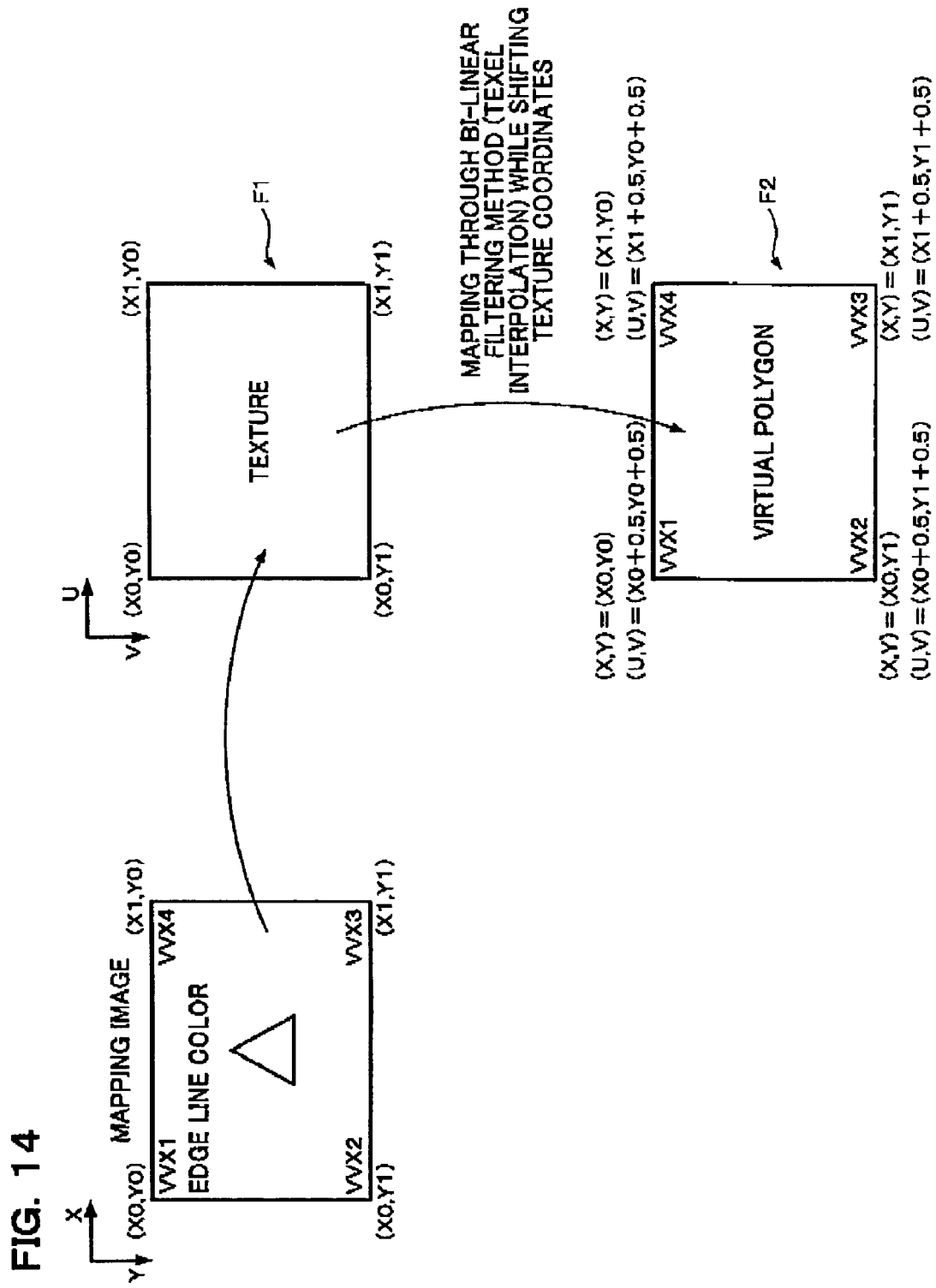
FIG. 14 illustrates a technique of generating the image of an edge line by effectively using the bi-linear filtering type texture mapping.

The virtual polygon to be mapped with the mapping image in FIG. 14 may take any of various forms.

If the virtual polygon is one having its size equal to the screen size, the bi-linear filtering type interpolation will be applied to the whole screen.

However, it has been found that when the virtual polygon having the screen size is used, a problem was raised in that the edge line cannot effectively be drawn.

In the three-dimensional game, the player's viewpoint is moved to an arbitrary position depending on the operational input from the player. The object representing the character or the like is also moved to an arbitrary position. Thus, the distance between the player's viewpoint and the object also varies. The size of the perspectively transformed object (or the screen area occupied by the object) will also vary depending on the distance between the viewpoint and the object.

If the distance between the viewpoint and the object OB is nearer as shown in FIG. 16A, the size of the perspectively transformed object OB increases (or the screen area occupied by the object increases).

On the other hand, if the distance between the viewpoint and the object OB is farther as shown in FIG. 16B, the size of the perspectively transformed object OB decreases (or the screen area occupied by the object decreases).

If the screen area occupied by the object OB is larger as shown in FIG. 16A, the processing will not be inefficient even though the virtual polygon to be mapped with the mapping image has its size equal to the screen size.

If the screen area occupied by the object OB is smaller as shown in FIG. 16B, however, a useless drawing process will be carried out when the polygon of the screen size is used. This unnecessarily increases the processing load.

To avoid such a problem, this embodiment generates a virtual polygon VPL of FIGS. 16A and 16B which encloses the image of the perspectively transformed object OB and which has its size variable depending on the size of the perspectively transformed object OB. The mapping image (see FIG. 13A) is then mapped on this virtual polygon VPL.

If the distance between the viewpoint and the object OB varies to change the screen area occupied by the object OB, the size of the virtual polygon VPL correspondingly varies. For example, as the distance between the viewpoint and the object OB increases, the size of the virtual polygon VPL decreases. Thus, the drawing process can effectively be carried out to optimize the load on the drawing process.

If the object is configured by object parts, a virtual polygon may be generated for each of the object parts. If part of the object (e.g., eye or mouth) is only to be processed, such a virtual polygon as enclosing part of the perspectively transformed object may be generated.

The technique of generating the virtual polygon may take any of various techniques.

The first technique generates the virtual polygon VPL based on the coordinates of the vertexes VX1 to VX6 (which are, in a broad sense, definition points including the control points of free-form surfaces) in the perspectively transformed object, as shown in FIGS. 17A and 17B.

More particularly, the virtual polygon VPL will be generated by determining the vertexes VVX1 (XMIN, YMIN), VVX2 (XMIN, YMAX), VVX3 (XMAX, YMAX) and VVX4 (XMAX. YMIN) of the virtual polygon VPL, based on the minimum values XMIN, YMIN and maximum values XMAX, YMAX of the X- and Y-coordinates in the vertexes of the object OB.

Since the first technique can optimally reduce the size of the virtual polygon VPL depending on the size of the perspectively transformed object OB, it is advantageous in that the load on drawing the virtual polygon VPL is reduced. On the other hand, it is disadvantageous in that if the vertexes in the object OB is much more, the load on determining the minimum and maximum X- and Y-coordinates in the respective vertexes increases.

Figure 18A:
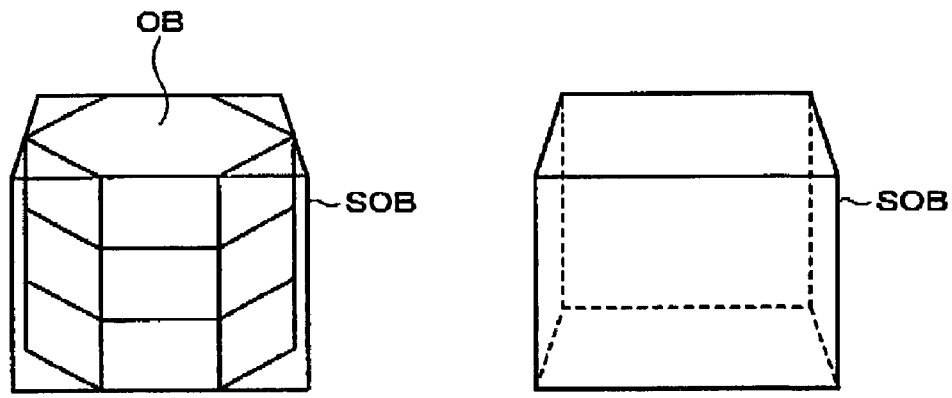
FIGS. 18A and 18B illustrate a technique of generating a virtual polygon based on the coordinates of vertexes in a perspectively transformed simplified object.

The second technique uses a simplified object SOB (bounding box or bounding volume) which encloses the object OB. as shown in FIG. 18A. This simplified object SOB is used to perform hit checking or the like for the object OB. This embodiment effectively uses this simplified object SOB to generate the virtual polygon VPL based on the coordinates of the vertexes (which are, in a broad sense, definition points) in a perspectively transformed simplified object SOB.

Figure 18B:
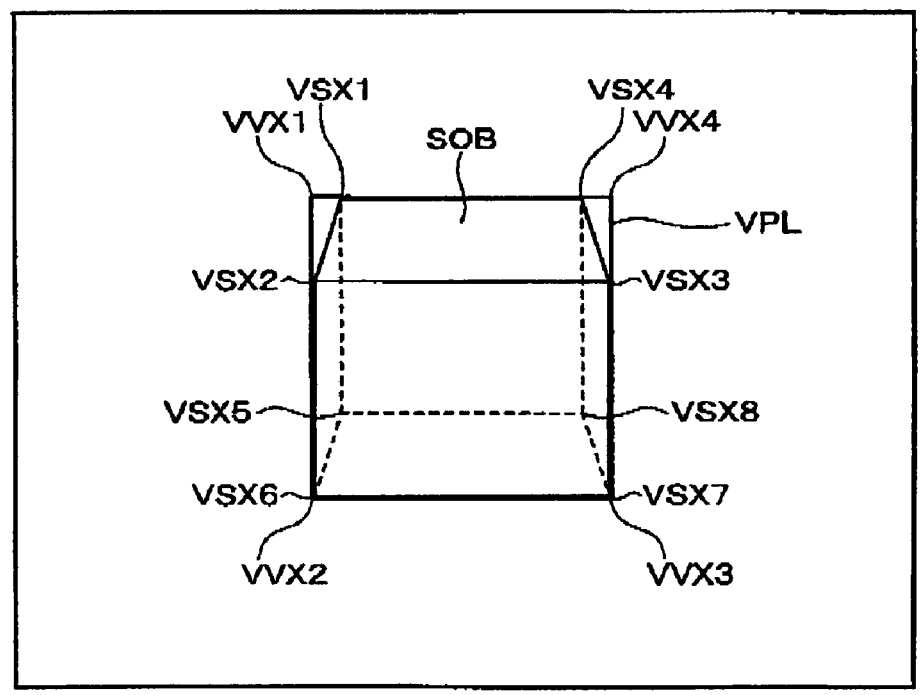

More particularly, the virtual polygon VPL is generated by determining the vertexes VVX1 to VVX4 of the virtual polygon VPL based on the minimum and maximum X- and Y-coordinates of the vertexes VSX1 to VSX8 in the perspectively transformed simplified object SOB, as shown in FIG. 18B.

The second technique has an advantage in that since it uses the simplified object SOB having its vertexes less than those of the object OB, the minimum and maximum X- and Y-coordinates of the vertexes can be determined with reduced load. On the other hand, the second technique must generate the virtual polygon VPL having its size larger than that of the first technique. The second technique is thus disadvantageous in that the load on drawing the virtual polygon VPL increases in comparison with the first technique.

The size of the virtual polygon VPL may be slightly larger in the up/down and right/left directions than that of the virtual polygon VPL shown in FIGS. 17A, 17B and 18B (e.g., by one pixel). Particularly, if the edge line is to be drawn in the outside area of the edge of the object, the technique of scaling the size of the virtual polygon in such a manner is effective.

The technique of changing the size of the virtual polygon VPL depending on the size of the perspectively transformed object is not limited to the aforementioned first and second techniques. For example, the size of the virtual polygon VPL may suitably be changed depending on the distance between the viewpoint and the object.

If the translucency of the edge line is to be changed depending on the size of the perspectively transformed object as described in connection with FIGS. 4, 5B, 6 and 7B, the translucency of the edge line may be changed by determining and using the size (or number of pixels) of the virtual polygon (virtual object) which is generated through the technique described in connection with FIGS. 16A to 18B.

2.8 Image of Edge Line

The technique of generating the image of the edge line of the object will be described below.

This embodiment generates the image of the edge line using the bi-linear filtering type texture mapping processing described in the above item 2.6.

2.8.1 Generation of Mapping Image

More particularly, the pre-procedure first initializes a work buffer (effect buffer) with the image information (RL, GL, BL, αL) of the edge line. Namely, the color of each pixel is set to the color of the edge line (RL, GL, BL) while the alpha value is set at αL (=0).

Next, an object OB to which the edge line is to be added is drawn in the work buffer. At this time, the alpha value in each of the vertexes of the object OB has been set at αJ (>0). For simplicity, it is assumed herein that the color of the object OB is a single color (RJ, GJ, BJ).

Figure 19:
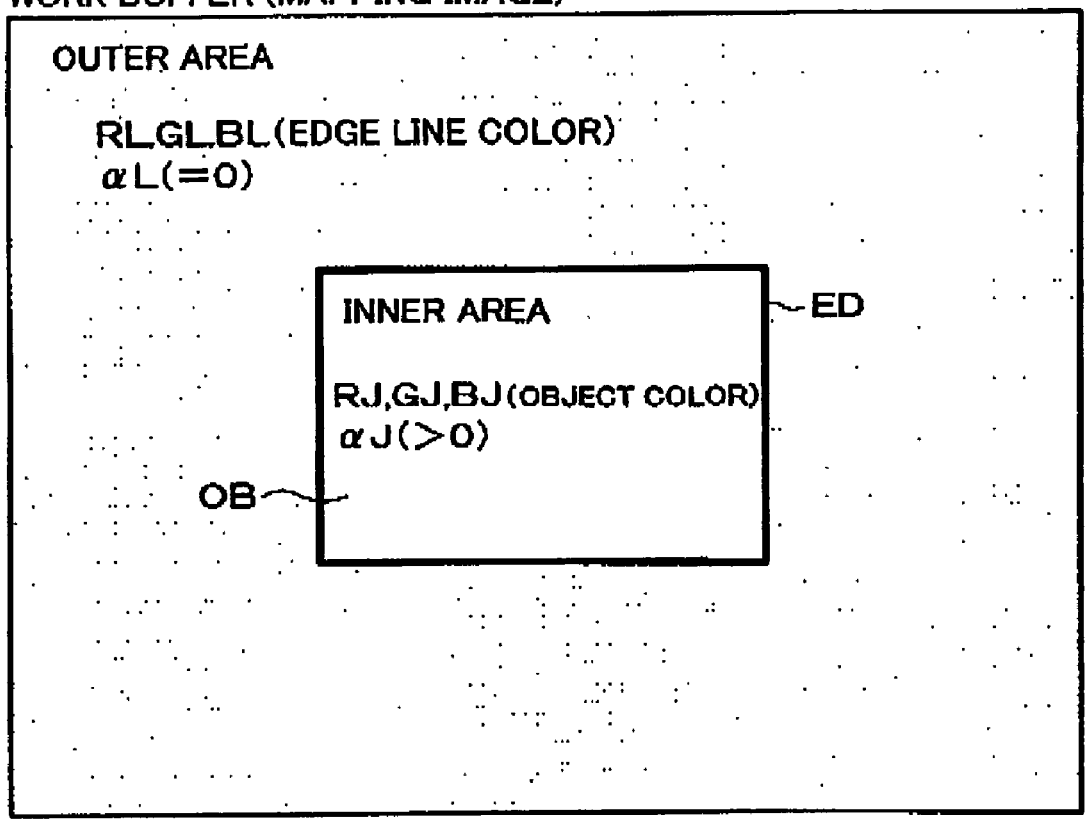
FIG. 19 shows a mapping image generated on a work buffer.

In such a situation, such an image as shown in FIG. 19 (mapping image) will be drawn in the work buffer.

In other words, the inside area of the edge ED of the object OB is set to the color of the same object OB while the outside area of the edge ED is set to the color of the edge line (RL, GL, BL). The alpha value in the inside area is set at αJ (>0) while the alpha value in the outside area is set at αL (=0).

The setting of alpha value shown in FIG. 19 is shown only for illustration, but it is essential that the alpha value in the outside area is necessarily different from that of the inside area.

2.8.2 Bi-linear Filtering Type Texture Mapping

The mapping image on the work buffer shown in FIG. 19 is then drawn on a frame buffer at the same position.

Figure 20:
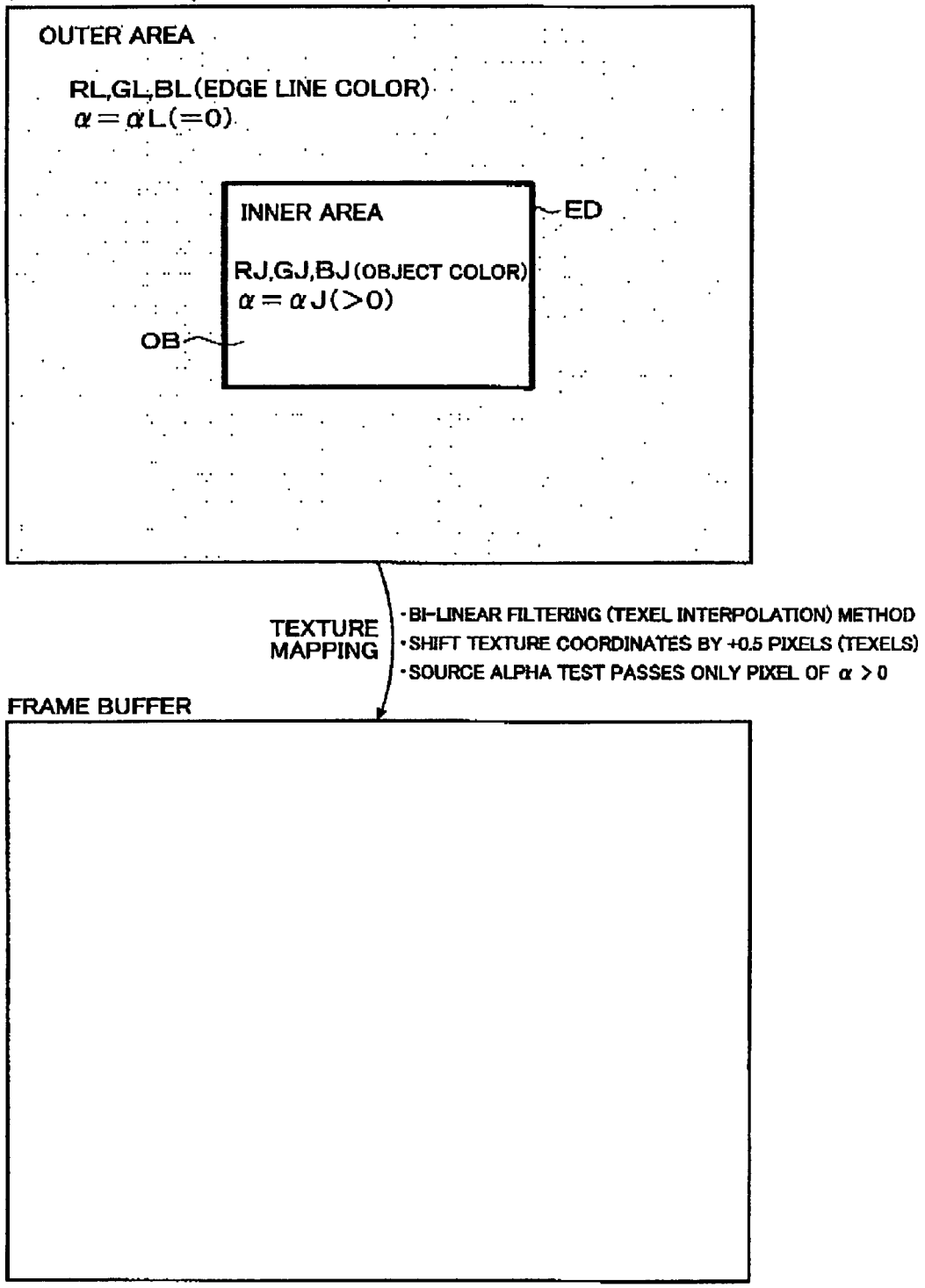
FIG. 20 illustrates a technique of drawing a mapping image on a frame buffer by mapping it on a virtual polygon through the bi-linear filtering process while shifting the texture coordinates.

More particularly, a virtual polygon (which is, in a broad sense, a virtual object) is drawn in the frame buffer while mapping the mapping image on the work buffer onto the virtual polygon, as shown in FIG. 20.

In this case, there is generated a virtual polygon (effect region) which encloses the object and which has its size variable depending on the size of the perspectively transformed object. The mapping image on the work buffer is mapped onto this virtual polygon.

On performing this texture mapping:

(1) The hi-linear filter (texel interpolation) is selected;

(2) The texture coordinates are shifted (or deviated), for example, by +0.5 pixels (texels), as described in connection with FIG. 14; and (3) In the source alpha (α) test (or alpha test for the mapping image which is a writing source), only a pixel having α>0 (a pixel, α of which is not equal to zero) is passed.

Figure 21:
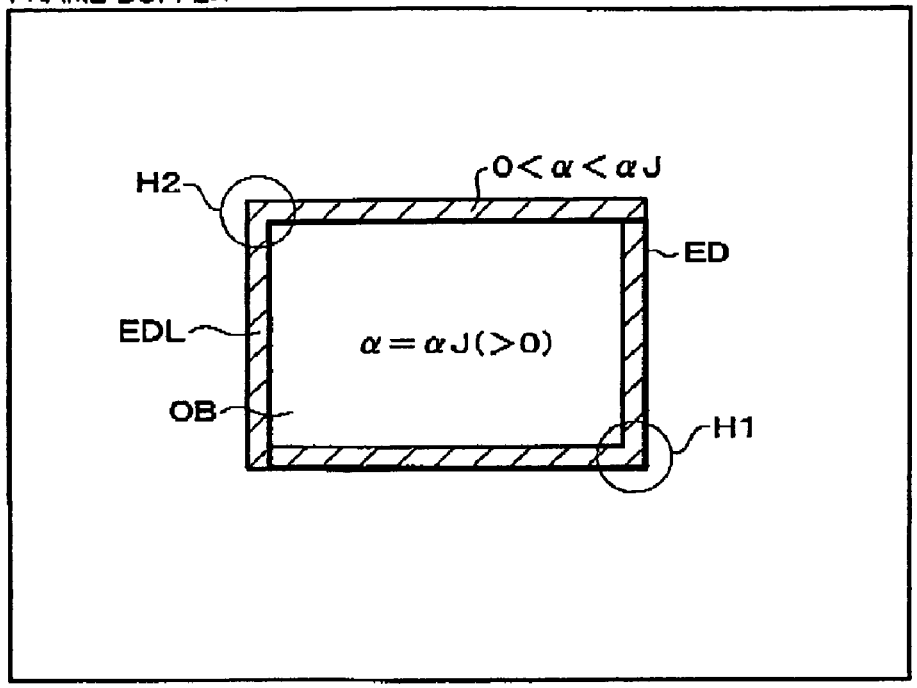
FIG. 21 shows an image generated on the frame buffer through the technique of FIG. 20.

Thus, such an image as shown in FIG. 21 is generated in which the edge line EDL is added to the object OB.

By selecting the bi-linear filter and shifting the texture coordinates, the interpolation will be carried out for the color and alpha value (A-value) which are set to each of the pixels in the mapping image on the work buffer.

Figure 22:
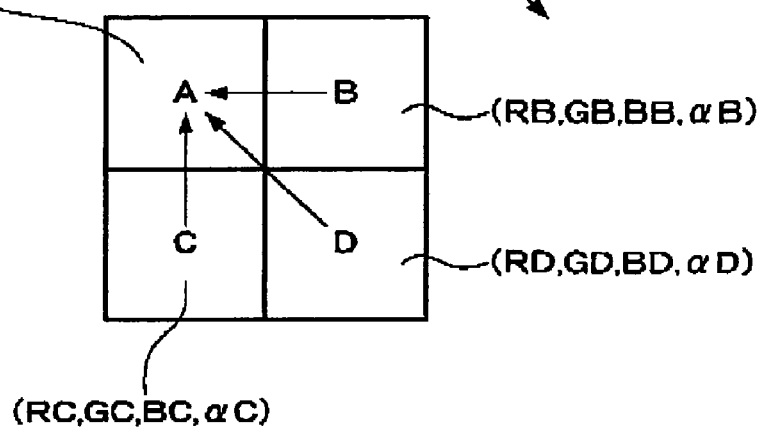
FIG. 22 illustrates a technique of interpolating the RGBs and alpha (α) values of pixels through the bi-linear filtering process.

If it is now assumed that the texture coordinates (U, V) is shifted by +0.5 pixels (texels) and when the position of the drawn pixel is at (X, Y), the colors and alpha values at the positions of tour pixels (X, Y), (X+1, Y), (X, Y+1) and (X+1, Y+1) will be referred to on texture sampling. As a result, the color and alpha value of the finally drawn texel will be equal to the respective averages of the colors and alpha values of the above four pixels. For example, if the texture coordinates are shifted in the lower-right direction as shown in FIG. 22, the RGBs and alpha values of the pixels B, C and D will infiltrate into a pixel A by ¼. This may be represented by the following formula:

$$R = (RA + RB + RC + RD)/4, \quad (3)$$

$$G = (GA + GB + GC + GD)/4,$$

$$B = (BA + BB + BC + BD)/4, \text{ and}$$

$$\alpha = (\alpha A + \alpha B + \alpha C + \alpha D)/4$$

In the above formula, R. G, B and a are respectively the colors and alpha value obtained through the interpolation (or the colors and alpha value of the interpolated pixel A). Furthermore, (RA, GA, BA, αA), (RB, GB, BB, αB), (RC, GC, BC, αC) and (RD, GD, BD, αD) are the colors and alpha values of the pixels A, B, C and D before interpolated, respectively.

Figure 23A:
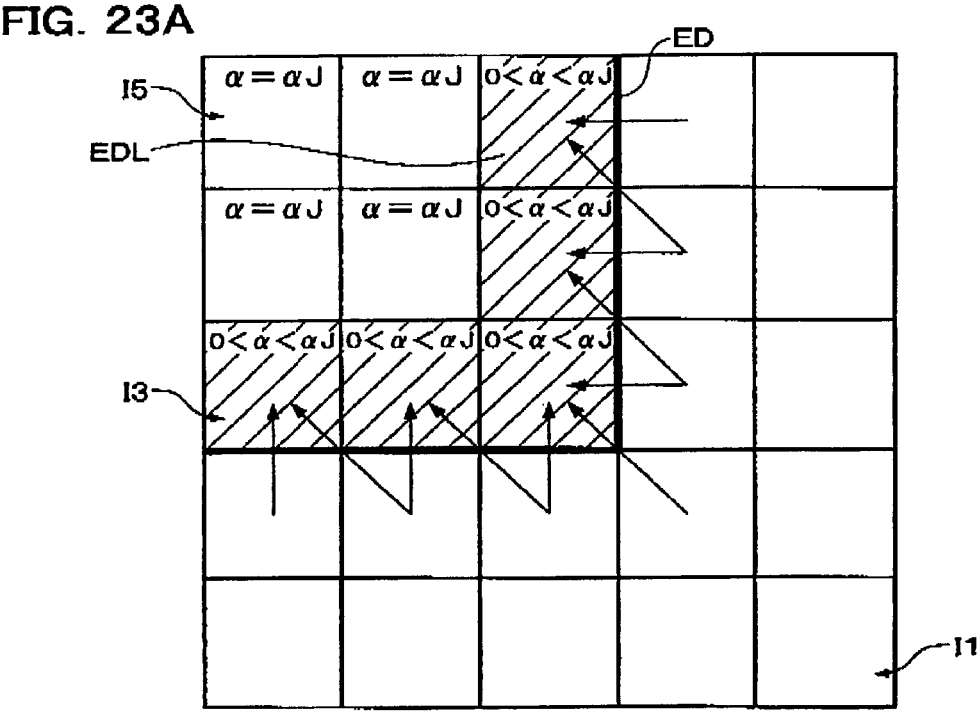
FIGS. 23A and 23B illustrate a technique of generating the image of an edge line of an object.

As will be apparent from the foregoing, the RGBs and alpha values of the pixels B, C and D will infiltrate into the pixel A by ¼ by shifting the texture coordinates by 0.5 pixels in the lower-right direction. As a result, at a portion shown by H1 in FIG. 21, the color of the object OB (RJ, GJ, BJ) will be blended with the color of the edge line (RL, GL, BL) in the inside area of the edge ED to generate the image of the edge line EDL in the inside area of the edge ED, as shown in FIG. 23A.

The color of this edge line (RL, CL, BL,) is the color set to the outside area of the edge ED in the work buffer as shown in FIG. 19.

Figure 23B:
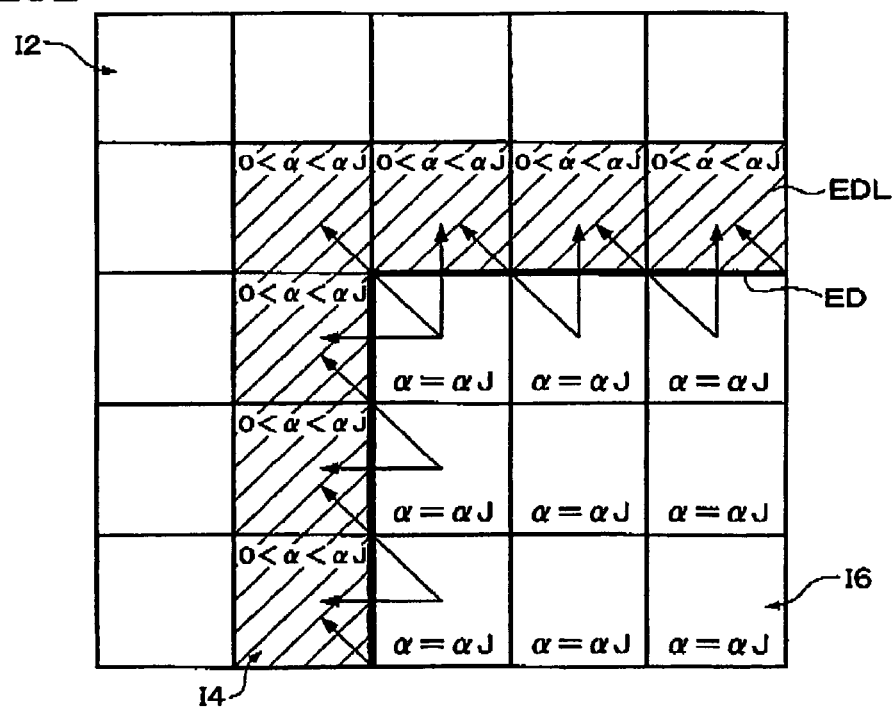

On the other hand, at another portion shown by H2 in FIG. 21, the color of the object OB (RJ, GJ, BJ) will be blended with the color of the edge line (RL, GL, BL) in the outside area of the edge ED to generate the image of the edge line EDL in the outside area of the edge ED, as shown in FIG. 23B, In such a manner, the edge line EDL will be drawn along the edge ED of the object OB, as shown in FIG. 21.

In this embodiment, the alpha value will also be subjected to the bi-linear filtering type interpolation in addition to the Color. The alpha value set to the edge line EDL will thus be obtained by blending αJ of the object OB with αL in the edge line.

The above procedure will further be described in detail.

(I) Pixel Surrounded by Pixels to be Referred to, All of Which are Colored with the Edge Line Color In pixels as shown by I1 and I2 in FIGS. 23A and 23B, all the RGBs and alpha values of the surrounding pixels to be referred to are (RL, GL, BL, αL). In the aforementioned formula (3), therefore, (RA, GA, BA, αA)=(RB, GB, BB, αB)=(RC, GC, BC, αC)=(RD, GD, BD, αD)=(RL, GL, BL, αL). Thus, the RGB and alpha value after interpolated becomes (R, G, B, α)=(RL, GL, BL, αL).

Since α=αL=0 at this time (see FIG. 19), the source alpha (α) test does not pass such pixels. Therefore, these pixels are inhibited to be drawn.

(II) Pixel to be Referred to in Respect with the Pixels of Both the Edge Line and Object Colors Pixels as shown by I3 and I4 in FIGS. 23A and 23B are surrounded by pixels (texels) of (RL, GL, BL, αL) and pixels (texels) of (RJ, GJ, BJ, αJ). In such a case, if it is assumed that the number of pixels of (RJ, GJ, BJ, αJ) is K, (R, G, B, α) after interpolation through the above formula (3) are represented by the following formula:

$$R = \{RJ \times K + RL \times (4-K)\}/4,$$ (4)

$$G = \{GJ \times K + GL \times (4-K)\}/4,$$

$$B = \{BJ \times K + BL \times (4-K)\}/4, \text{ and}$$

$$\alpha = \{\alpha J \times K + \alpha L \times (4-K)\}/4$$

As will be apparent, the color of the interpolated pixel will be colored with a color obtained by mixing the color (RJ, GJ, BJ, αJ) of the object OB with the color (RL, GL, BL, αL) of the edge line.

Since $\alpha J > 0.1 \leq K \leq 3$ and $\alpha L = 0$, $0 < \alpha < \alpha J$. Therefore, the source alpha test passes these pixels which will in turn be necessarily drawn.

(III) Pixel Surrounded by Pixels to be Referred to, All of Which are Colored with the Object Color In pixels as shown by I5 and I6 in FIGS. 23A and 23B, all the RGBs and alpha values of the surrounding pixels to be referred to are (RJ, GJ, BJ, αJ). In the aforementioned formula (3), therefore, (RA, CA, BA, αA)=(RB, GB, BB, αB)=(RC, GC, BC, αC)=(RD, GD, BD, αD)=(RJ, GJ, BJ, αJ). Thus, the RGB and alpha value after interpolated becomes (R, G, B, α)=(RJ, GJ, BJ, αJ).

Since $\alpha = \alpha J > 0$ at this time (see FIG. 19), the source alpha test passes such pixels. Therefore, these pixels are drawn to be colored with the object color.

In such a manner, such an image as shown in FIG. 21 can be drawn in the frame buffer.

In FIG. 21, the edge line EDL is also drawn in the outside area of the edge ED of the object OB. In this case, it is therefore desirable to take the technique of controlling the color of the edge line depending on the distance between the object and the viewpoint or the size of the perspectively transformed object, as shown in FIGS. 4 to 5B described above.

However, the technique of FIG. 21 will apply the bi-linear filtering type interpolation not only to the portion around the edge ED of the object OB, but also the whole object OB. Thus, the defocused image of the whole object OB will be generated. To overcome such a problem, this embodiment takes the following technique.

2.8.3 Drawing the Object into the Frame Buffer

As in the above item 2.8.2, the mapping image in the work buffer shown in FIG. 19 is drawn in the frame buffer at the same position. More particularly, a virtual polygon is drawn in the frame buffer while mapping the mapping image on the work buffer onto the virtual polygon.

In this case, as described in connection with FIGS. 16A to 18B, the virtual polygon (effect region) is generated so that it encloses the object and that it has its size variable depending on the size of the perspectively transformed object.

The source alpha test is carried out with the destination alpha test so that the image of the edge line EDL drawn in FIG. 21 will not be erased by any overwriting.

Namely, as shown in FIG. 24, (1) The texture coordinates are not shifted;

(2) The source alpha test (or alpha test for the mapping image which is a writing source) passes only a pixel having α>0; and (3) The destination alpha test (or alpha test for the mapping image which is a written destination) passes only a pixel having α=αJ.

Under the above condition (1), the mapping image on the work buffer is drawn in the frame buffer without being interpolated.

Under the above condition (2), any pixel set to the edge line color among the pixels in the mapping image (image in the work buffer) is inhibited to be drawn.

Under the above condition (3), any overwriting is inhibited relative to the pixel region of $0 < \alpha < \alpha J$ in which the image of the edge line has been drawn in FIG. 21. In other words, the focused image of the object OD on the work buffer is drawn on only a region left by removing the region of the edge line EDL (more particularly, right and bottom edge line portions) of the object OB from the inside area of the edge ED of the object OB. Thus, the problem relating to the defocused image of the whole object OB can be overcome.

One of the features of this embodiment is to use different alpha values in the inside and outside areas of the edge ED of the object OB (FIG. 19) and to interpolate not only the color, but also the alpha value, the interpolated alpha value being then used to perform various determinations. More particularly, the interpolated alpha value is used to discriminate the region ($0 < \alpha < \alpha J$) of the edge line EDL of the object OB or to discriminate the other region left by removing the region of the edge line EDL from the inside area of the edge ED. Thus, the edge line EDL of the object OB can be generated with reduced processing load.

2.9 Drawing the Edge Line into the Inside Area

The technique of drawing the edge line in the inside area of the edge of the object.

2.9.1 Generation of the Mapping Image

Such a mapping image as shown in FIG. 19 is first generated in the same technique as in the aforementioned item 2.8.1.

2.9.2 Generation of Alpha (Mask) Plane

Next, only the alpha (mask) plane in the mapping image on the work buffer shown in FIG. 19 is drawn in the frame buffer.

Figure 25:
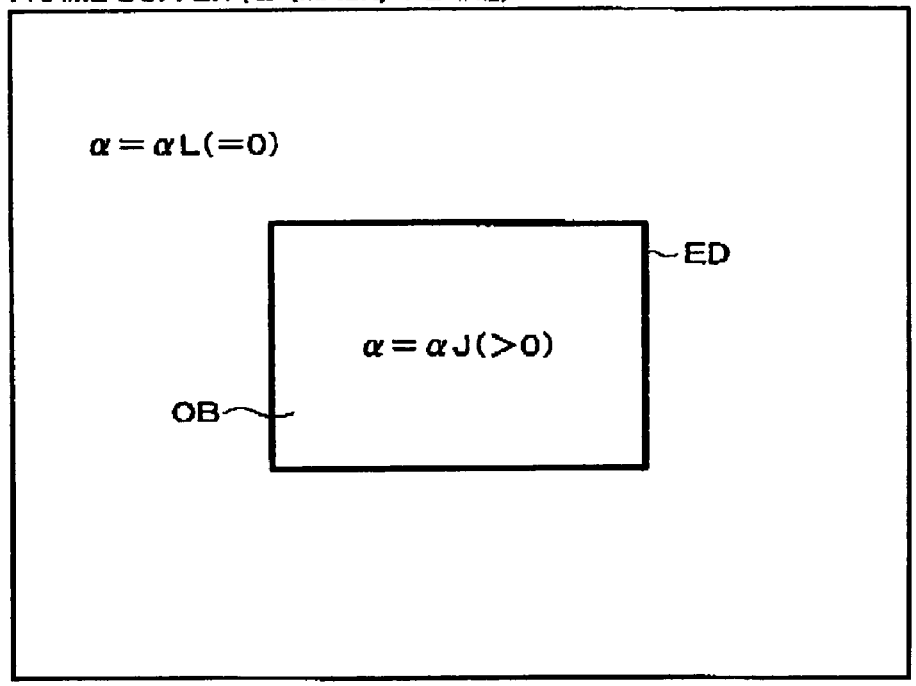
FIG. 25 shows an alpha plane generated on the frame buffer.

More particularly, the virtual polygon is drawn in the frame buffer while mapping the mapping image on the work buffer onto the virtual polygon to draw only the alpha (α) plane of the mapping image into the frame buffer, Thus, the alpha (mask) plane which is set at $\alpha = \alpha J (>0)$ in the inside area of the edge ED of the object OB and at $\alpha = \alpha L (=0)$ in the outside area will be generated on the frame buffer, as shown in FIG. 25.

2.9.3 Drawing the Image of the Object

Next, the image of the object OB is drawn in the frame buffer. When the image of the object OB has previously been drawn in the frame buffer, the image of the object can be translucent-synthesized (or alpha blended) with the image of the edge line.

More particularly, the virtual polygon is drawn in the frame buffer while mapping the mapping image on the work buffer onto the virtual polygon.

On this texture mapping, (1) The alpha plane drawn in FIG. 25 is masked for not destroying it, and (2) The source alpha test passes only a pixel having $\alpha = \alpha J$.

Figure 26:
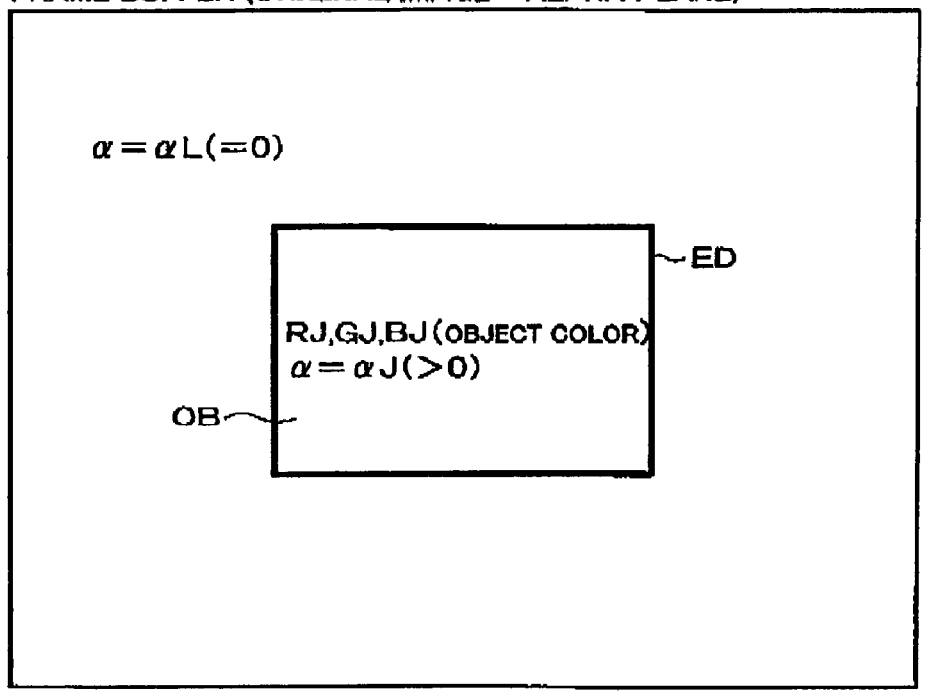
FIG. 26 shows an original object image and alpha plane generated on the frame buffer.

As shown in FIG. 26, thus, the frame buffer will include the image of the object OB (original image) and the alpha plane generated in FIG. 25.

2.9.4 Bi-Linear Filtering Type Texture Mapping

Next, the mapping image on the work buffer shown in FIG. 19 is drawn in the frame buffer at the same position.

More particularly, the virtual polygon is drawn in the frame buffer while mapping the mapping image on the work buffer onto the virtual polygon, as shown in FIG. 27.

On performing this texture mapping:

(1) The bi-linear filter (texel interpolation) is selected;

(2) The texture coordinates are shifted (or deviated), for example, by +0.5 pixels (texels), as described in connection with FIG. 14;

(3) In the source alpha test, only a pixel having $\alpha<\alpha J$ is passed; and (4) In the destination alpha test, only a pixel having $\alpha=\alpha J$ is passed.

Figure 28:
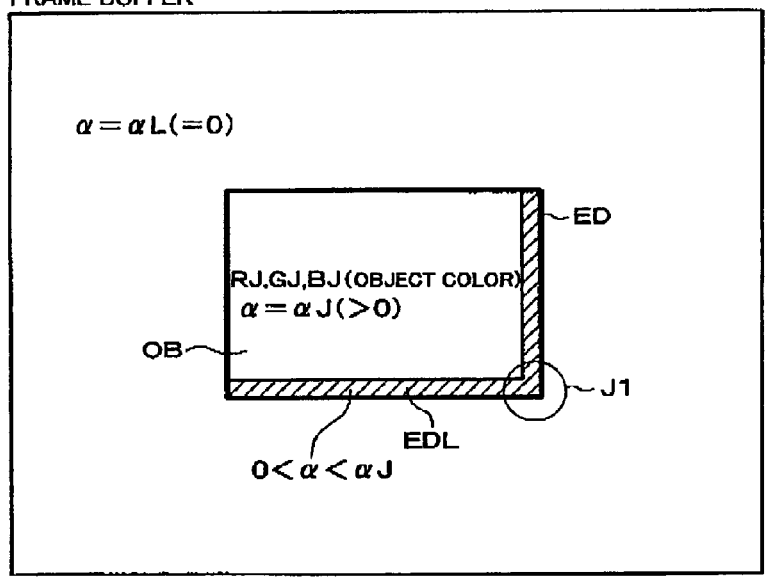
FIG. 28 shows an image generated on the frame buffer through the technique of FIG. 27.

Thus, such an image as shown in FIG. 28 is generated in which the edge line EDL is added to the right and bottom edges in the inside area of the object OB.

In other words, at a portion shown by J1 in FIG. 28, the color of the object OB (RJ, GJ, BJ) is blended with the color of the edge line (RL, GL, BL) in the inside area of the edge ED. thus, the image of the edge line EDL will be generated in the inside area of the edge ED.

In addition to the color, this embodiment also processes the alpha value set to the edge line EDL through the bi-linear filtering type interpolation. Therefore, the alpha value set to the edge line EDL is also one obtained by blending $\alpha J$ of the object OB with $\alpha L$ of the edge line.

This procedure will further be described in detail. (I) Pixel surrounded by pixels to be referred to, all of which are colored with the edge line color In such a pixel as shown by K1 in FIG. 29, the RGBs and alpha values after interpolated are (R, G, B, $\alpha$)=(RL, GL, BL, $\alpha L$).

Figure 29:
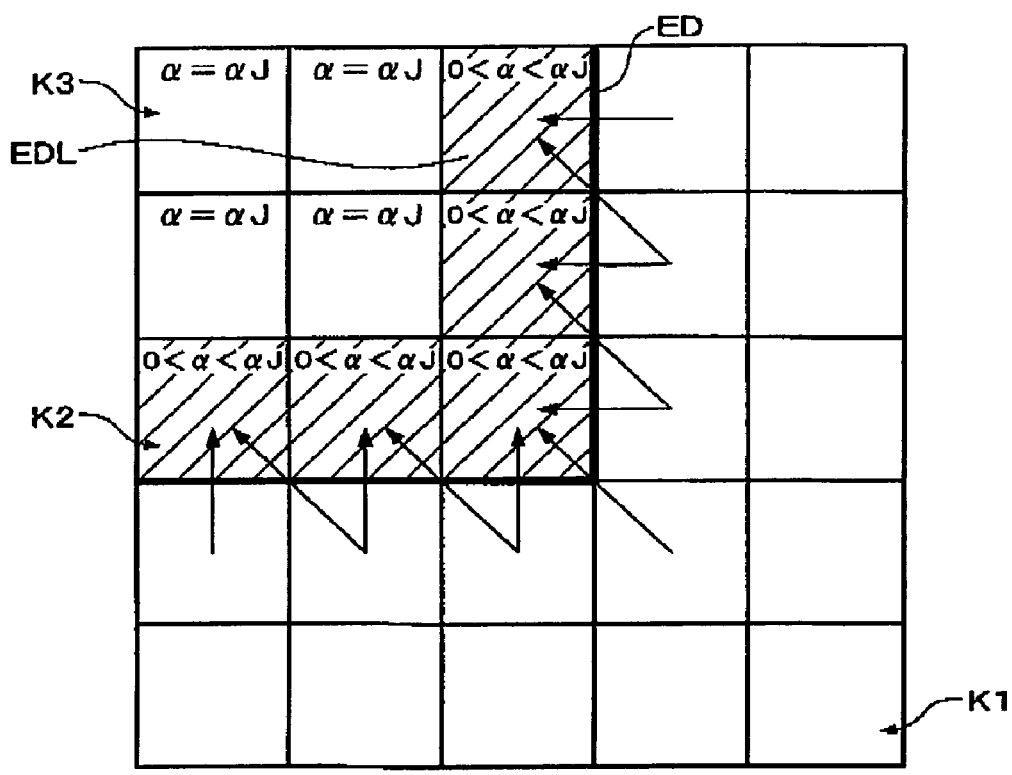
FIG. 29 illustrates a technique of generating the image of an edge line of an object.

Since $\alpha=\alpha L=0$ in set at this time (see FIG. 19), the source alpha test that passes pixels of $\alpha<\alpha J$ is passed. However, the destination alpha test passing only the pixels of $\alpha=\alpha J$ does not pass any pixel in a region other than the area in which the image of the object OB has been drawn. As a result, such an pixel as shown by K1 in FIG. 29 is inhibited to be drawn.

(II) In a Pixel to be Referred to in Respect with the Pixels of Both the Edge Line and Object Colors.

In such a pixel as shown by K2 in FIG. 29, the interpolated (R, G, Band a) are similar to those of the formula (4) described in connection with the above item 2.8.2. In other words, the color of the interpolated pixel is one obtained by mixing the color of the object OB (RJ, GJ, BLJ, $\alpha J$) with the color of the edge line=(RL, GL, BL, $\alpha L$).

Since $\alpha J>0$, $1 \leq K \leq 3$ and $\alpha L=0$, $0<\alpha<\alpha J$. Therefore, the source alpha test that passes pixels of $\alpha<\alpha J$ is passed, which will in turn be drawn in the frame buffer.

By the destination alpha test for passing only the pixel of $\alpha=\alpha J$, only the portions of the edge line image within the inside area of the object (or the right and bottom edges of the edge line in FIG. 28) will be drawn in the frame buffer.

(III) Pixel Surrounded by Pixels to be Referred to are Colored with the Object Color In such a pixel as shown by K3 in FIG. 29, the interpolated RGBs and alpha values are (R, G, B, $\alpha$)=(RJ, GJ, BJ, $\alpha J$).

Since $\alpha=\alpha J$ is set at this time (see FIG. 19), the source alpha test that passes a pixel of $\alpha<\alpha J$ is not passed. Therefore, these pixels are inhibited to be drawn.

In such a manner, such an image as shown in FIG. 28 can be drawn in the frame buffer.

2.9.5 Drawing the Left and Top Edges of the Edge Line

Next, the mapping image on the work buffer shown in FIG. 19 is mapped on the virtual object while shifting the texture coordinates in a direction opposite to that of the aforementioned item 2.9.4. The virtual object is then drawn in the frame buffer.

Figure 30:
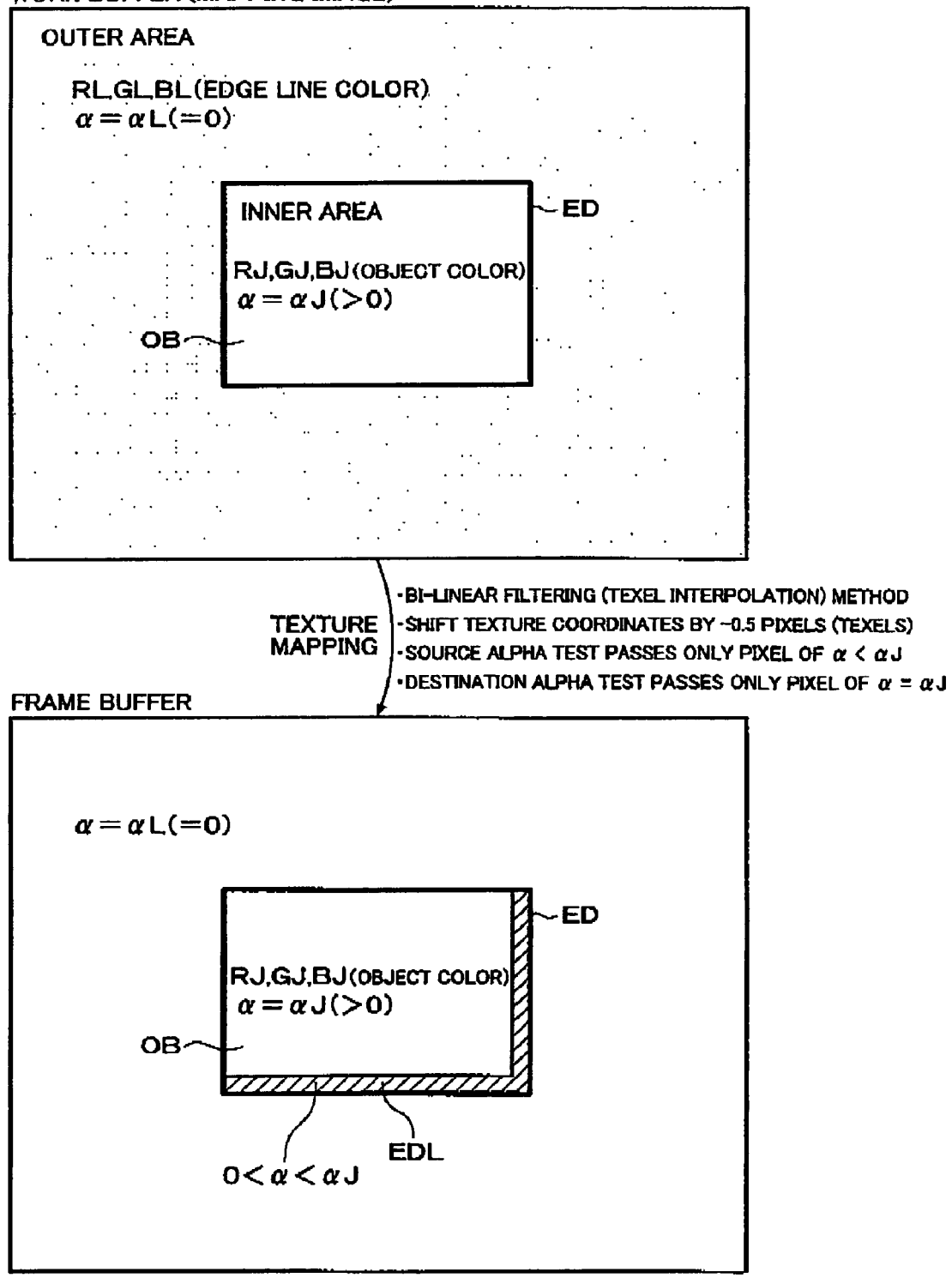
FIG. 30 illustrates a technique of drawing a mapping image on the frame buffer by mapping it on a virtual polygon through the bi-linear filtering process while shifting the texture coordinates by −0.5 pixels.

More particularly, as shown in FIG. 30, (1) The bi-linear filtering method is selected;

(2) The texture coordinates (U, V) are shifted (or deviated) by (−0.5, −0.5) reversely as in the aforementioned item 2.9.4;

(3) The source alpha test passes only a pixel of $\alpha<\alpha J$; and (4) The destination alpha test passes only a pixel of $\alpha=\alpha J$.

Thus, the edge line EDL is also added to the left and top edges in the inside area of the object OB. Thus, the image including the edge line EDL drawn in the inside area of the edge ED of the object OB will be drawn.

3. Procedure of This Embodiment

The details of a procedure according to this embodiment will be described in connection with flowcharts shown in FIGS. 32 to 39.

Figure 32:
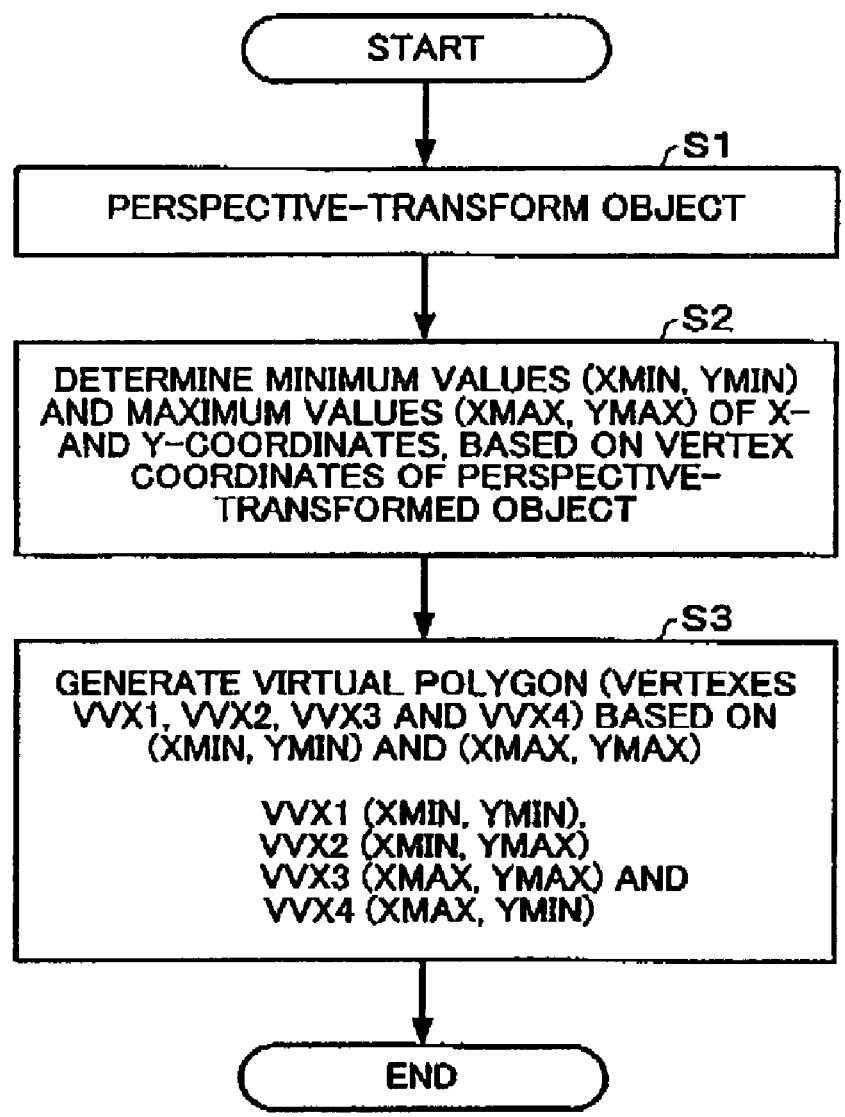
FIG. 32 is a flowchart illustrating the details of the process according to this embodiment.

FIG. 32 shows a flowchart illustrating the process of generating a virtual polygon onto which a mapping image is to be mapped.

First of all, the geometry-processing is carried out relative to an object to perspective-transform (or affine-transformed) it into the screen (step S1.

Next, the minimum and maximum values XMN. YMIN and XMAX, YMAX in the X- and Y-coordinates of the object vertexes are determined based on the vertex coordinates of the perspectively transformed object (step S2).

Next, based on the determined (XMIN, YMIN) and (XMAX, YMAX), a virtual polygon enclosing the image of the object OB is generated as described in connection with FIGS. 17A and 17B (step S3). At this time, the vertexes VVX1 to VVX4 of the virtual polygon are as follows:

VVX1 (XMIN, YMIN),

VVX2 (XMIN, YMAX),

VVX3 (XMAX, YMAX), and

VVX4 (XMAX, YMIN).

The size of the virtual polygon (image effect region) may slightly be enlarged in the up/down and right/left directions. More particularly, if it is assumed that the minimum values of the X- and Y-coordinates are XMIN, YMIN and that the maximum values thereof are XMAX, YMAX, each of the minimum values XMIN, YMIN is subtracted by one pixel to determine XMIN'=XMIN−1, YMIN'=YMIN−1. At the same time, each of the maximum values XMAX, YMAX is added by one pixel to determine XMAX'=XMAX+1, YMAX'=YMAX+1. These determined minimum and maximum values (XMIN', YMIN') and (XMAX', YMAX') are used to determine the vertexes VVX1 to VVX4 of the virtual polygon.

Figure 33:
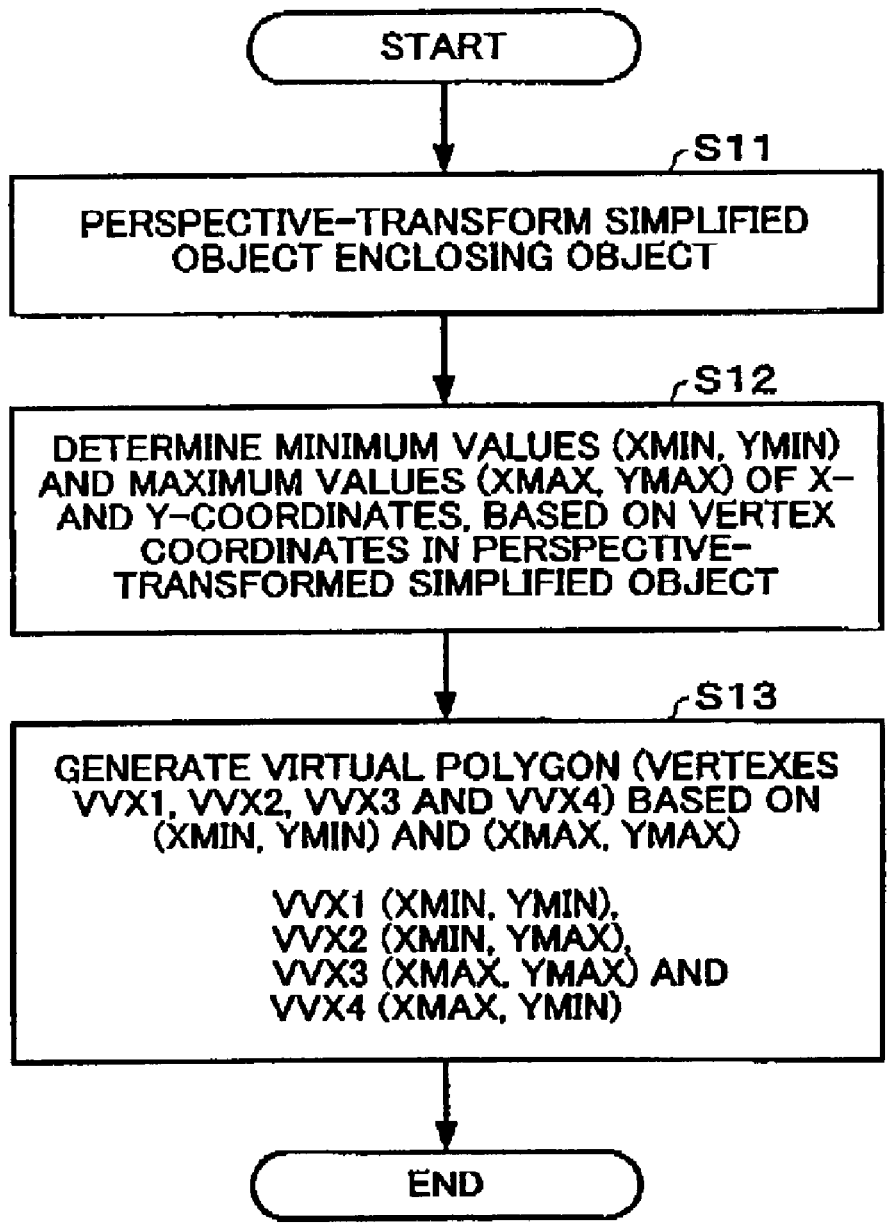
FIG. 33 is a flowchart illustrating the details of the process according to this embodiment.

FIG. 33 shows a flowchart illustrating the process of generating the virtual polygon using the simplified object of the object as described in connection with FIGS. 18A and 18B.

FIG. 33 is different from FIG. 32 in that the perspective-transformation is performed relative to the simplified object at step S11 and that the values (XMIN, YMIN) and (XMAX, YMAX) are determined based on the coordinates of the vertexes in the perspectively transformed simplified object at step S12. The other steps are similar to those of FIG. 32.

Figure 34:
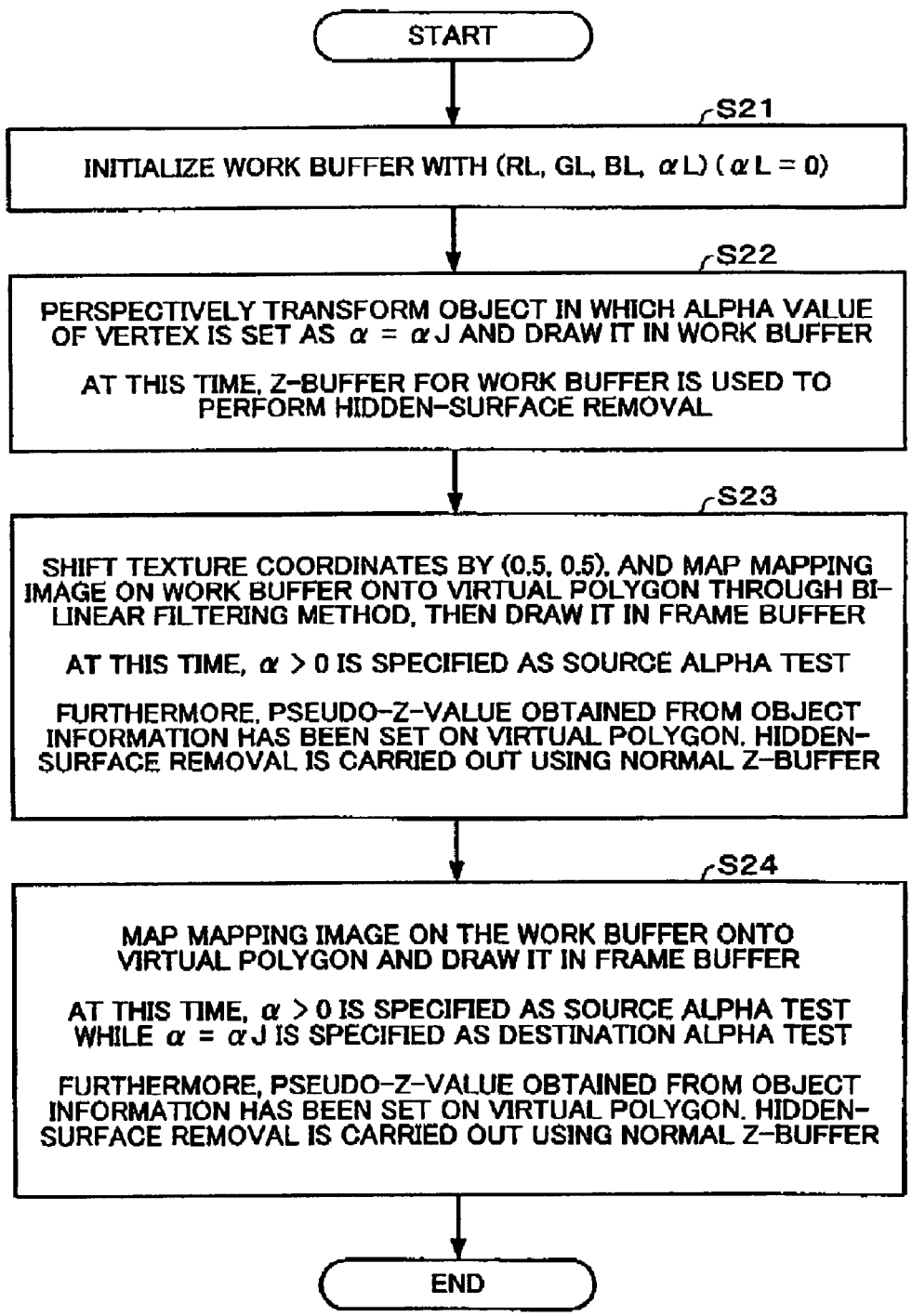
FIG. 34 is a flowchart illustrating the details of the process according to this embodiment.

FIG. 34 shows a flowchart illustrating the process of adding the edge line to the object.

First of all, the work buffer is initialized with the image of the edge line (RL, GL, BL, αL) as described in connection with FIG. 19 (step S21).

Next, the object having its vertex alpha value set to α=αJ(>0) is subjected to the perspective-transformation and drawn in the work buffer (step S22). At this time, the hidden-surface removal will be performed using the Z-buffer for the work buffer.

Next, the virtual polygon is drawn in the frame buffer while mapping the mapping image on the work buffer onto the virtual polygon in the bi-linear filtering method while shifting the texture coordinates (step S23). At this time, α>0 is specified as the source alpha test. A pseudo-Z-value obtained from the information of the object (e.g. vertex coordinates, representative point coordinates and the like) has been set on the virtual polygon and the hidden-surface removal is preformed using the normal Z buffer.

Next, the virtual polygon is drawn in the frame buffer while mapping the mapping image on the work buffer onto the virtual polygon (step S24). At this time. α>0 is specified as the source alpha test while α=αJ is specified as the destination alpha test. A pseudo-Z-value obtained from the information of the object has been set on the virtual polygon and the hidden-surface removal is preformed using the normal Z buffer.

Thus, the image of the object added by the edge line (or image having its emphasized edge line) can be provided.

Figure 35:
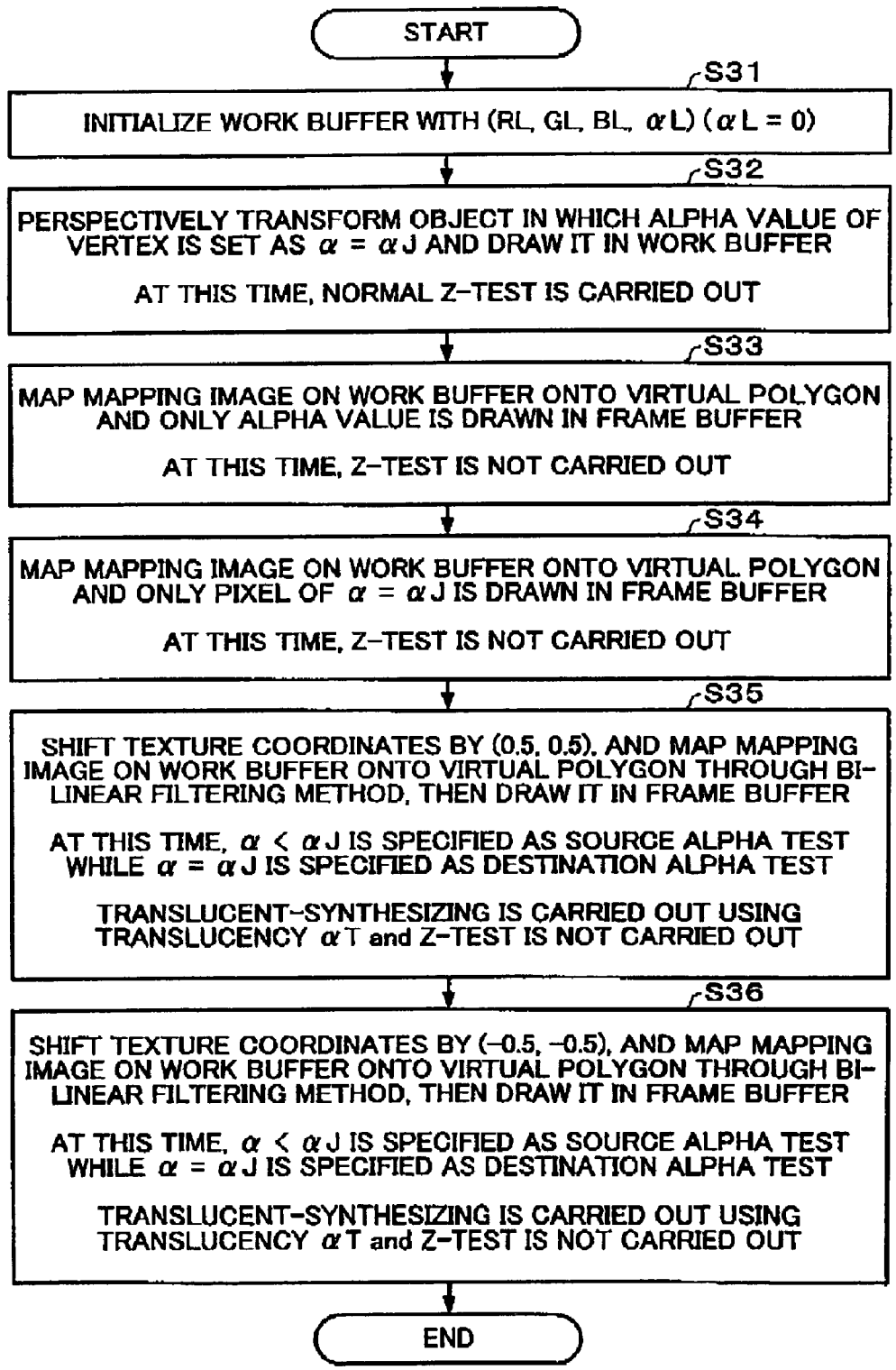
FIG. 35 is a flowchart illustrating the details of the process according to this embodiment.

FIG. 35 shows a flowchart illustrating the process of adding the edge line to the inside area of the object.

First of all, the work buffer is initialized with the image of the edge line (RL, GL, BL, αL) as described in connection with FIG. 19 (step S31).

Next, the object having its vertex alpha value set to α =αJ (>0) is subjected to the perspective-transformation and drawn in the work buffer (step S32). At this time, the hidden-surface removal will be performed by the Z-test using the normal Z-buffer. Thus, the Z-value of the object in the position in which the edge line is drawn can be set as the Z-value of the edge line.

Next, as described in connection with FIG. 25, the mapping image on the work buffer is mapped onto the virtual polygon and only the alpha value is drawn in the frame buffer (step S33).

Next, as described in connection with FIG. 26, the mapping image on the work buffer is mapped onto the virtual polygon and only the pixel of α=αJ is drawn in the frame buffer (step S34). Thus, the original image of the object can be drawn in the frame buffer.

Next, as described in connection with FIG. 27, the virtual polygon is drawn in the frame buffer while mapping the mapping image on the work buffer onto the virtual polygon through the bi-linear filtering method while shifting the texture coordinates (U, V) by (0.5, 0.5) (step S35). At this time, α<αJ is specified as the source alpha test while α=αJ is specified as the destination alpha test. Furthermore, the image of the object is translucent-synthesized with the image of the edge line using the translucency αT which has been set at a given register.

Next, as described in connection with FIG. 30, the virtual polygon is drawn in the frame buffer while mapping the mapping image on the work buffer onto the virtual polygon through the bi-linear filtering method while shifting the texture coordinates (U, V) by (−0.5, −0.5) (step S36). At this time, α<αJ is specified as the source alpha test while α=αJ is specified as the destination alpha test. Furthermore, the image of the object is translucent-synthesized with the image of the edge line using the translucency αT which has been set at a given register.

The steps S33 to S36 in FIG. 35 will not perform the Z-test.

Figure 31:
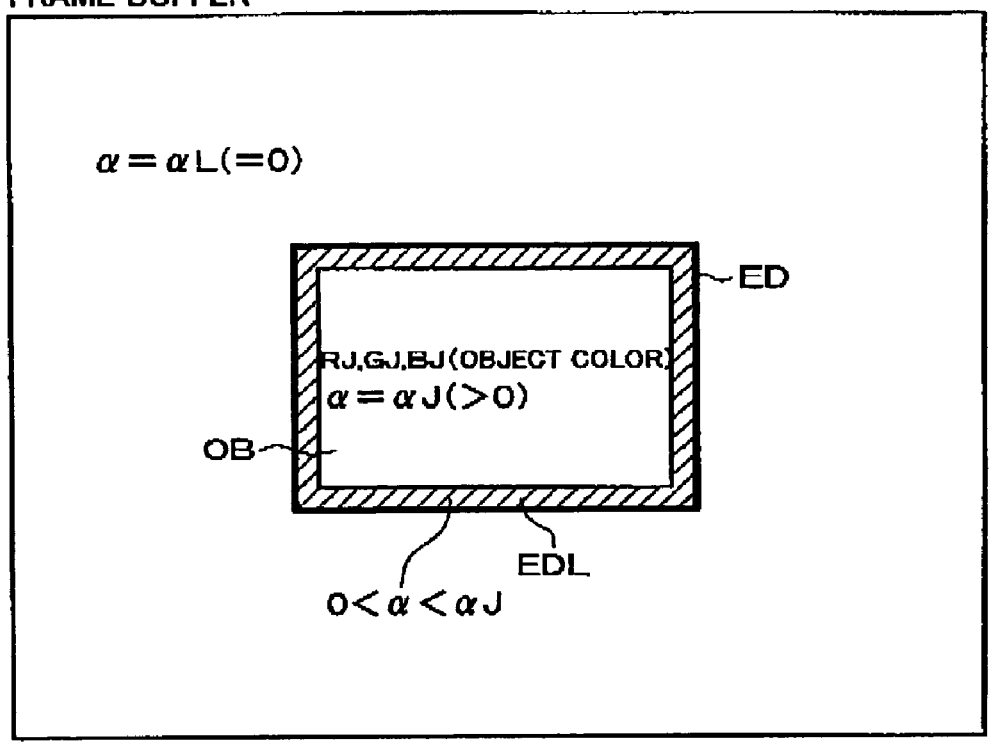
FIG. 31 shows a final image generated on the frame buffer through the technique of FIG. 30.

In such a manner, there can be provided such an image as shown in FIG. 31 in which the edge line is drawn in the inside area of the object.

Figure 36:
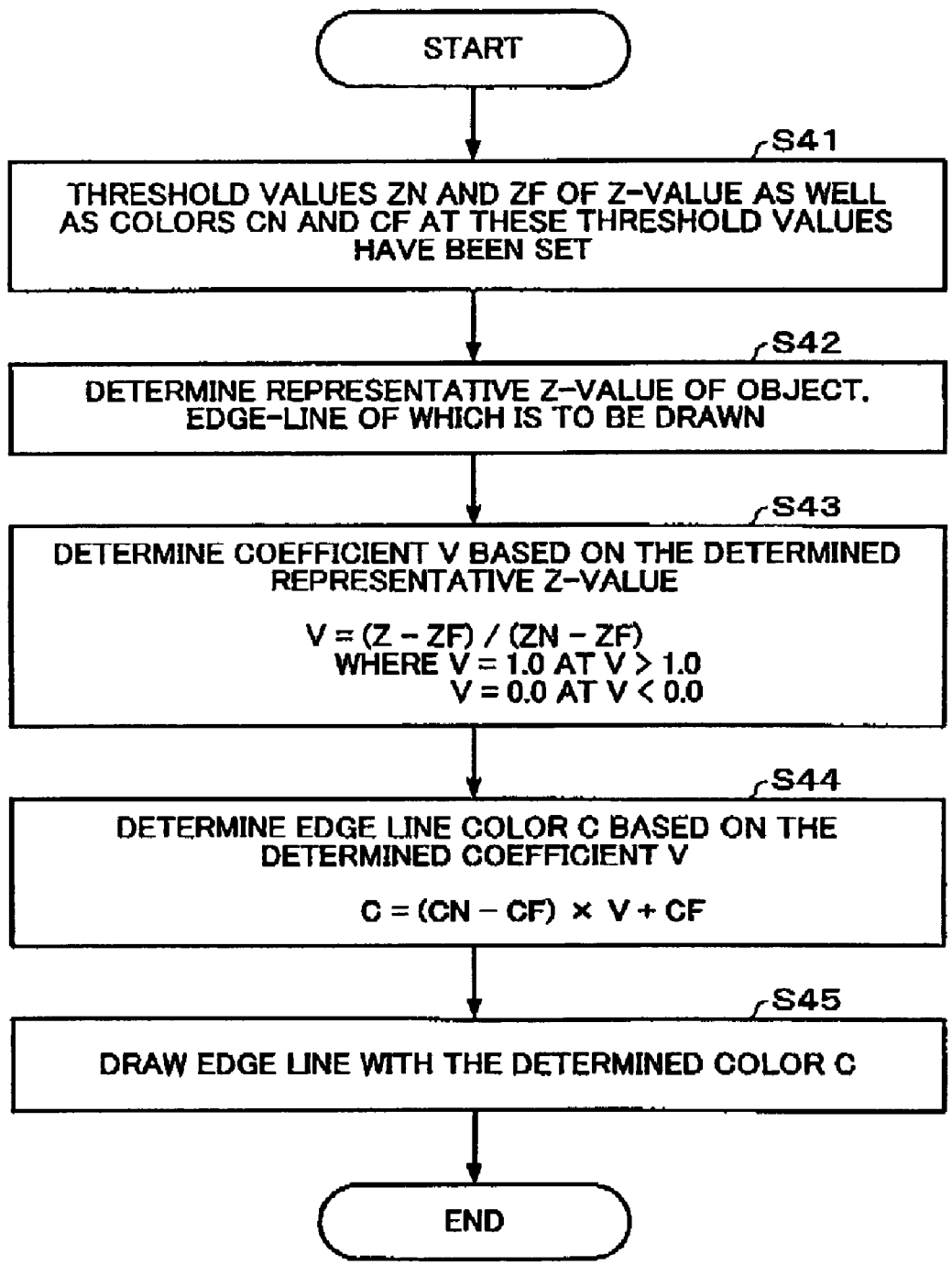
FIG. 36 is a flowchart illustrating the details of the process according to this embodiment.

FIG. 36 shows a flowchart illustrating the process of changing the color of the edge line depending on the distance (z-value). The Z-value increases as it approaches the viewpoint.

First of all, the threshold values ZN, ZF of the Z-value (which correspond to VTN, VTF in FIG. 5A) as well as the colors CN, CF of those threshold values have previously been set (step S41).

Next, the representative Z-value of the object, the edge line of which is to be drawn (Z-value at the representative point) is determined (step S42).

Next, the determined representative Z-value is used to determine a coefficient V for determining the color as shown by the following formula (step S43).

$$V=(Z-ZF)/(ZN-ZF)$$

In the above formula, however, V=1.0 when V>1.0. V= 0.0 when V<0.0.

Next, the determined coefficient V is used to determine the color C of the edge line as shown by the following formula (step S44).

$$C=(CN-CF) \times V+CF$$

Next, the determined color C is used to drawn the edge line (step S45).

Figure 37:
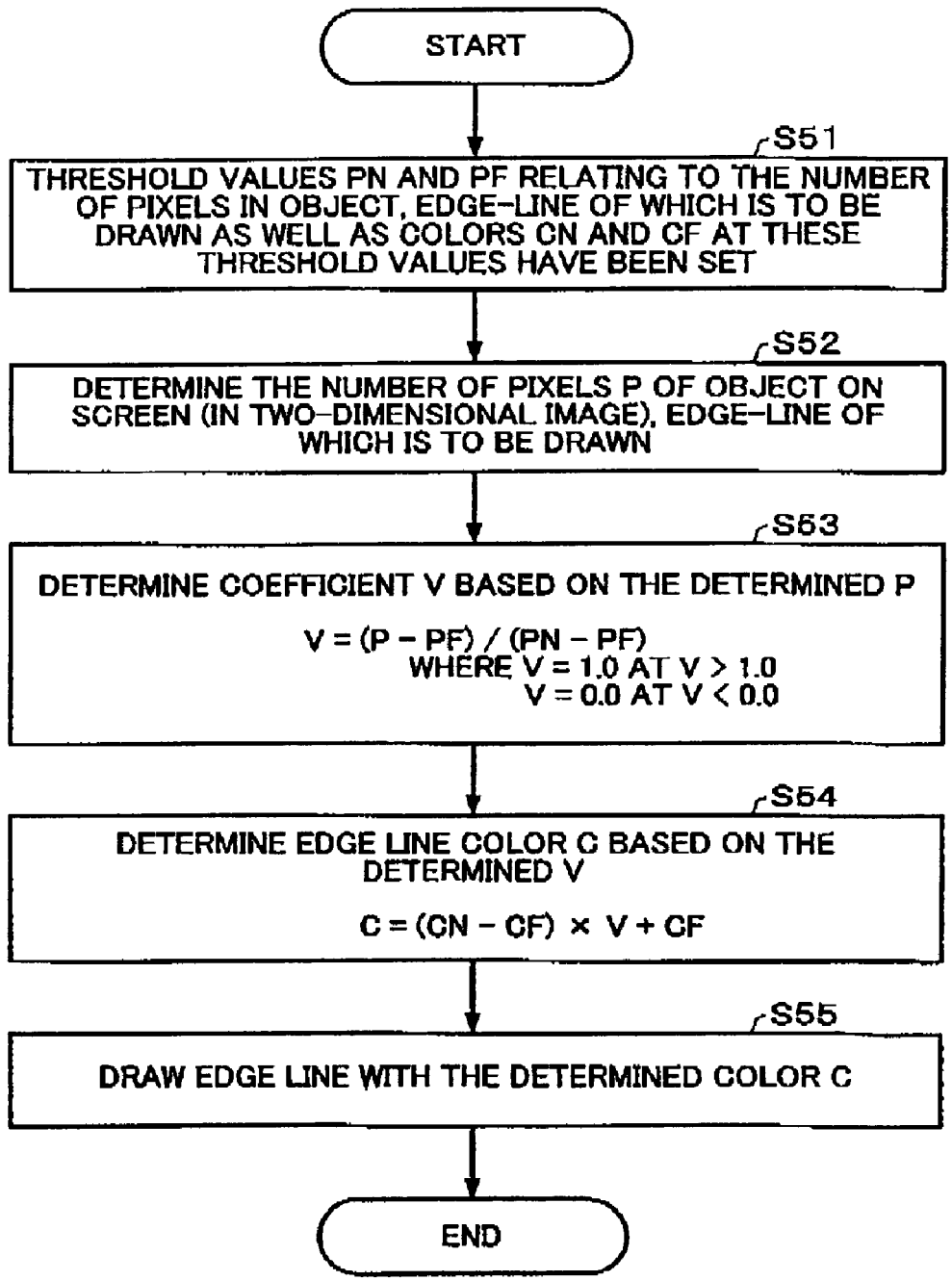
FIG. 37 is a flowchart illustrating the details of the process according to this embodiment.

FIG. 37 shows a flowchart illustrating the process of changing the color of the edge line depending on the size of the object (number of pixels).

First of all, the threshold values PN, PF in the size of the object, the edge-line of which is to be drawn (which correspond to VTN, VTF in FIG. 5B) as well as the colors CN, CF corresponding to these threshold values have previously been set (step S51).

Next, the number of pixels P (the number of longitudinal pixels×the number of transverse pixels) of the object (in two-dimensional image), the edge line of which is to be drawn on the screen, is determined (step S52).

Next, the determined number of pixels P is used to determine the coefficient V for determining the color as shown by the following formula (step S53).

$$V=(P-PF)/(PN-PF)$$

In the above formula, however, V=1.0 when V>1.0. V=0.0 when V<0.0.

Next, the determined coefficient V is used to determine the color C of the edge line (step S54). The determined color C is then used to drawn the edge line (step S55).

Figure 38:
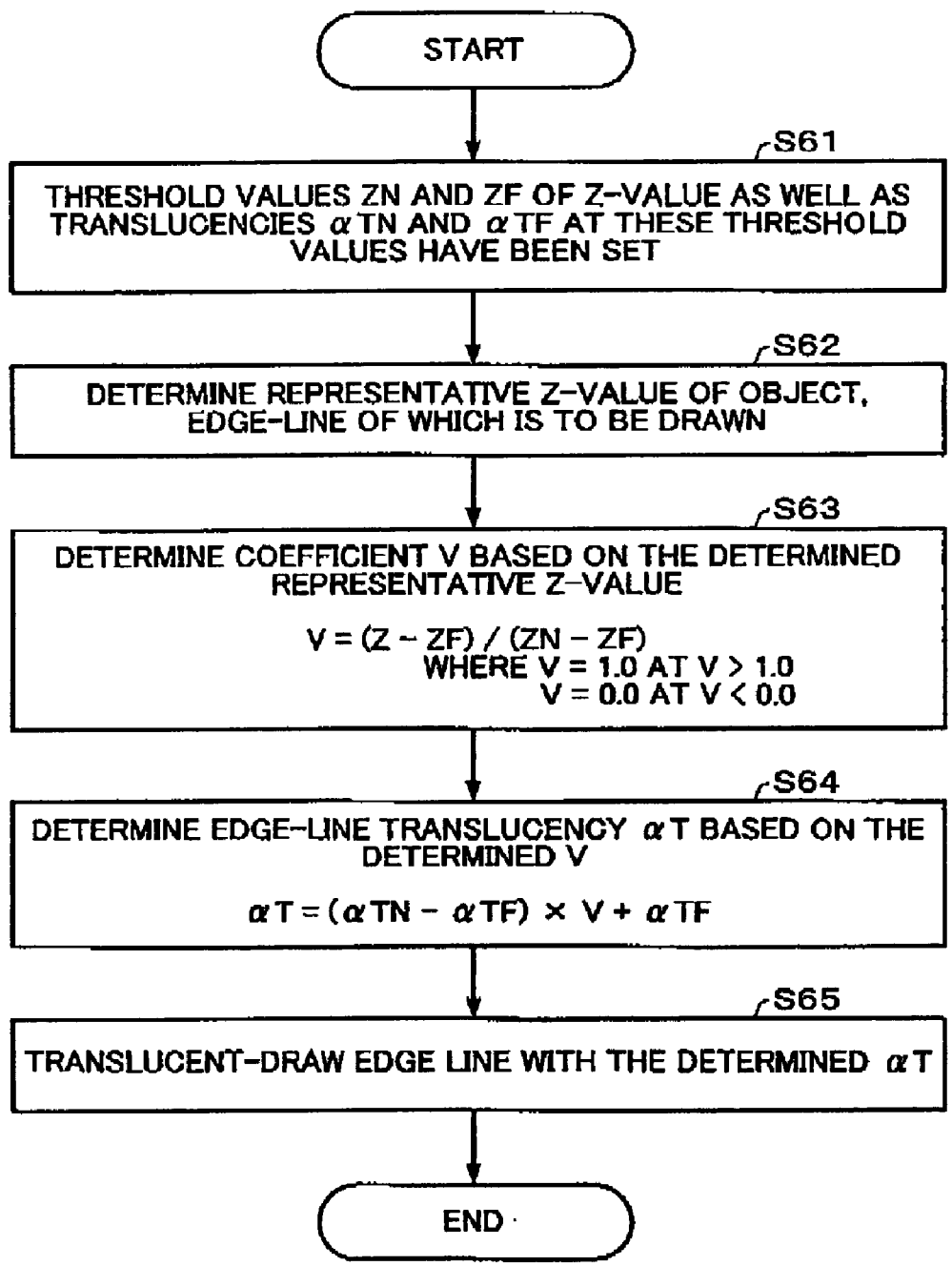
FIG. 38 is a flowchart illustrating the details of the process according to this embodiment.

FIG. 38 shows a flowchart illustrating the process of changing the translucency of the edge line depending on the distance (Z-value). FIG. 38 is different from FIG. 36 only in the following points.

In place of the colors CN, CF, the translucencies αTN, αTF have been set at step S61.

At step S64, the coefficient V is used to determine the translucency αT of the edge line as shown by the following formula.

$$\alpha T=(\alpha TN-\alpha TF) \times V+\alpha TF$$

At step S65, the determined value αT is used to translucent-draw the edge line.

Figure 39:
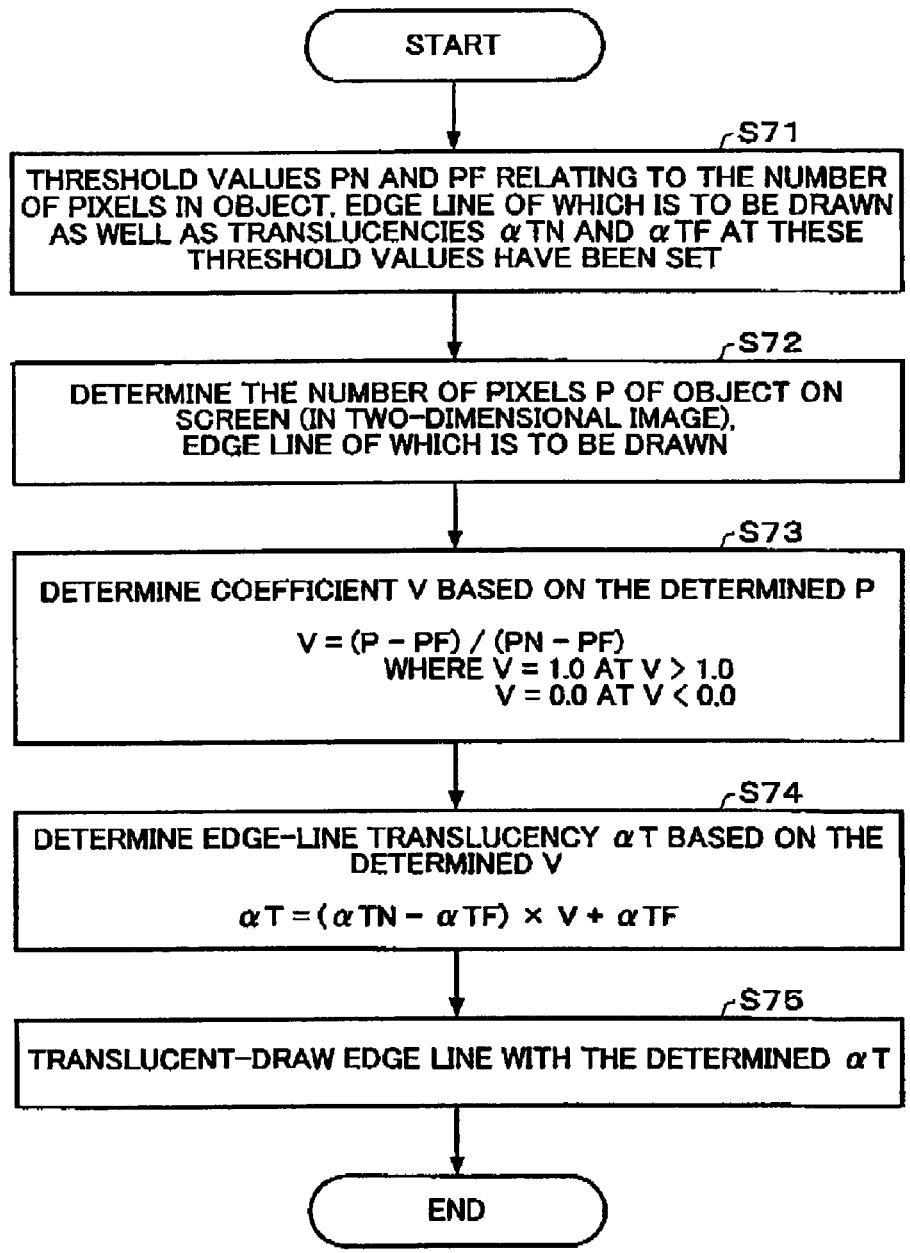
FIG. 39 is a flowchart illustrating the details of the process according to this embodiment.

FIG. 39 shows a flowchart illustrating the process of changing the translucency of the edge line depending on the size of the object (number of pixels). FIG. 39 is different from FIG. 37 only in the following points.

At step S71, the translucencies αTN, αTF have been set in place of the colors CN, CF.

At step S74, the coefficient V is used to determine the translucency αT of the edge line as shown by the following formula.

$$\alpha T = (\alpha TN - \alpha TF) \times V + \alpha TF$$

At step S75, the determined value αT is used to translucent-draw the edge line.

4. Hardware Configuration

Figure 40:
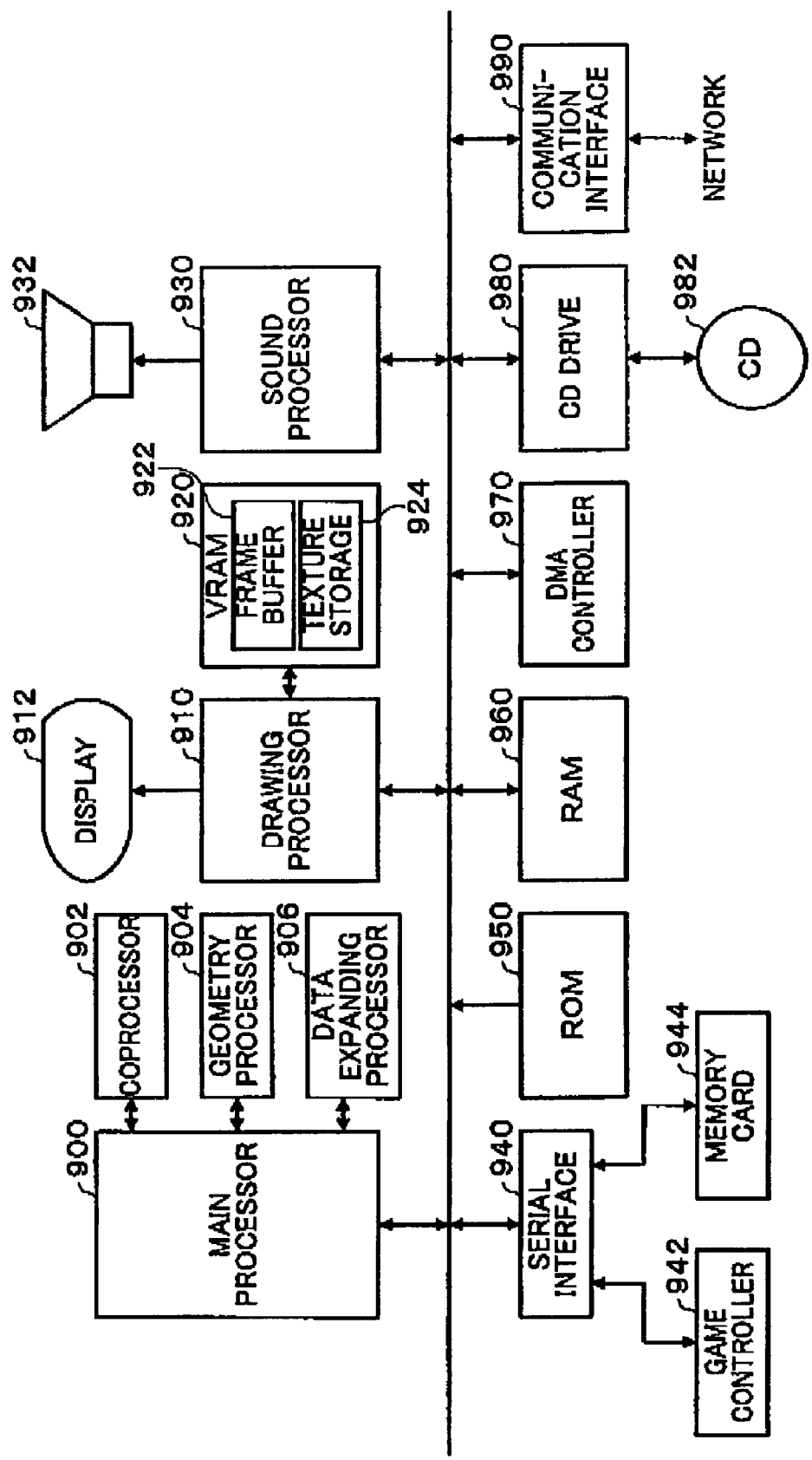
FIG. 40 shows a hardware structure by which this embodiment can be realized.

A hardware arrangement which can realize this embodiment is shown in FIG. 40.

A main processor 900 operates to execute various processings such as game processing, image processing, sound processing and other processings according to a program stored in a CD (information storage medium) 982, a program transferred through a communication interface 990 or a program stored in a RON (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation image maybe displayed. The image and sound data to be decoded may be stored in the storage devices including ROM 950 and CD 982 or may externally be transferred through the communication interface 990.

A drawing processor 910 is to draw or render an object constructed by primitive surfaces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMS, sound effects and voices. The generated game sounds are outputted from a speaker 932.

The operational data from a game controller 942, saved data from a memory card 944 and personal data may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMs, VRAMS, ROMs or the like).

CD drive 980 drives a CD 982 (information storage medium) in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other game system.

All the means of the present invention may be executed only through hardware or only through a program which has been stored in an information storage medium or which is distributed through the communication interface. Alternatively, they may be executed both through the hardware and program.

If all the means of the present invention are executed both through the hardware and program, the information storage medium will have stored a program (and data) for executing the means of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 41A:
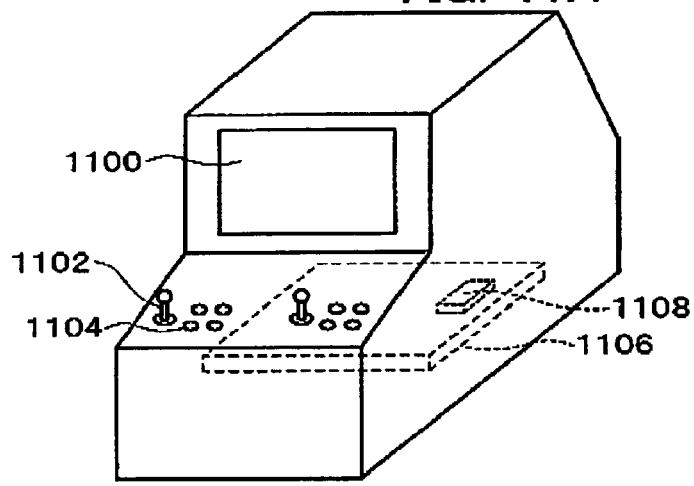
FIGS. 41A, 41B and 41C show various system forms to which this embodiment can be applied.

FIG. 41A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. Information (program or data) for executing all the means of the present invention has been stored in a memory 1108 on the system board 1106, which is an information storage medium. Such information will be referred to "stored information" later.

Figure 41B:
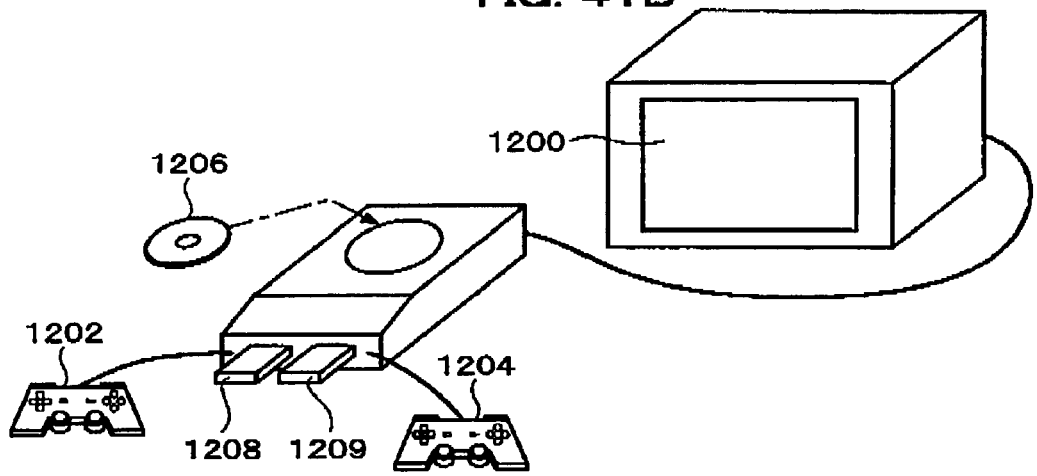

FIG. 41B shows a home game apparatus to which this embodiment is applied. A player enjoys a game by manipulating game controllers 1202 and 1204 while viewing a game picture displayed on a display 1200. In such a case, the aforementioned stored information pieces have been stored in CD 1206 or memory cards 1208, 1209 which are detachable information storage media in the game system body.

Figure 41C:
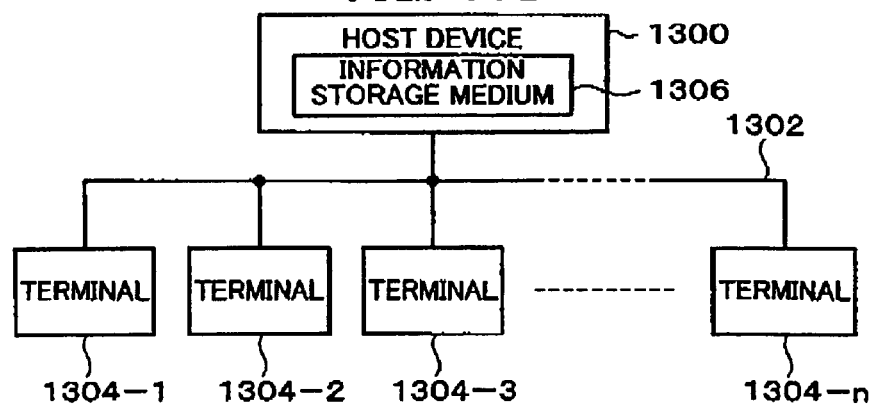

FIG. 41C shows an example in which this embodiment is applied to a game system which includes a host device 1300 and terminals 1304-1 to 1304-n connected to the host device 1300 through a network (which is a small-scale network such as LAN or a global network such as INTERNET) 1302. In such a case, the above stored information pieces have been stored in an information storage medium 1306 such as a magnetic disk device, magnetic tape device, memory or the like which can be controlled by the host device 1300, for example. If each of the terminals 1304-1 to 1304-n are designed to generate game images and game sounds in a stand-alone manner, the host device 1300 delivers the game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 41C, the means of the present invention may be decentralized into the host device (or server) and terminals. The above information pieces for realizing the respective means of the present invention may be distributed and stored into the information storage media of the host device (or server) and terminals.

Each of the terminals connected to the network may be either of domestic or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

For example, the invention relating to one of the dependent claims may not contain part of the structural requirements in any claim to which the one dependent claim belongs. The primary part of the invention defined by one of the independent claim may be belong to any other independent claim.

It is particularly desirable that the parameter for changing the edge line image of the object is the distance between the object and the viewpoint or the size of the perspectively transformed object. However, any other parameter equivalent to these parameters falls within the scope of the invention.

This embodiment has been described mainly with respect to the case where the image of the edge line is changed depending on the distance between the object and the viewpoint or the size of the perspectively transformed object for avoiding such a problem that the edge line image of the object is made unnecessarily conspicuous.

On the contrary, however, the image of the edge line may be changed depending on the distance between the object and the viewpoint or the size of the perspectively transformed object for making the edge line image of the object conspicuous. For example, within a certain range of distance, the edge line may be made more opaque as the distance between the object and the viewpoint increases (or the size of the perspectively transformed object decreases). Alternatively, the color of the edge line may gradually become a color different from CF (second color) as described, as the distance between the object and the viewpoint increases (or the size of the perspectively transformed object decreases).

The technique of drawing the edge line of the object is particularly desirable to use the texel interpolation type texture mapping process, but the present invention is not limited to such a technique. For example, the edge line of the object may be drawn through such a technique as shown in FIGS. 42A to 42P.

This technique first draws an edge line image 420 (or an image filled with the color of the edge line) on a region 410 in which the original image is to be drawn on a drawing region 400 (frame buffer or the like) at a position deviated upward by several pixels, as shown in FIGS. 42A and 42B, similarly, the edge line image 420 is drawn on the above region 410 at positions deviated by several pixels in the downward, rightward and leftward directions, as shown in FIGS. 42C, 42D and 42E. Finally, the original image 430 is drawn in the same region 410 as shown in FIG. 42F.

Since this technique can draws the edge line only through the two-dimensional processing, the processing load on the drawing processor increases, but the processing load on CPU for performing the three-dimensional processing can be reduced.

The function characteristics between the distance between the object and the viewpoint or the size of the perspectively transformed object and the color or translucency of the edge line may be in any of various modified forms. For example, the function characteristic may be a curve characteristic using a multi-dimensional function, rather than the linear characteristic as shown in FIGS. 5A, 5B, 7A and 7B. Namely, the multi-dimensional function may interpolate between (VTN, CN) and (VTF, CF) or between (VTN, $\alpha$TN) and (VTF, $\alpha$TF), rather than the linear interpolation.

Figure 43A:
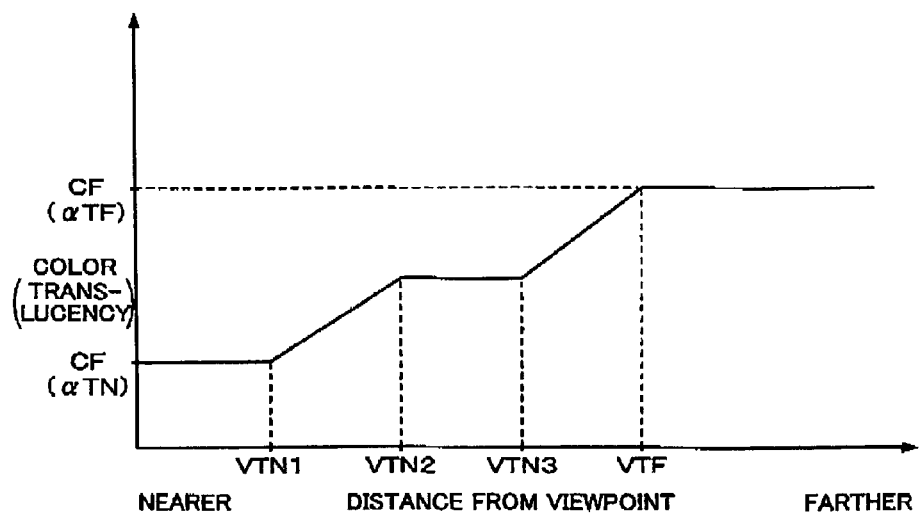
FIGS. 43A and 43B shows another characteristic of a function between the distance between the object and the viewpoint, the size of the perspectively transformed object and the color and translucency of the edge line.
Figure 43B:
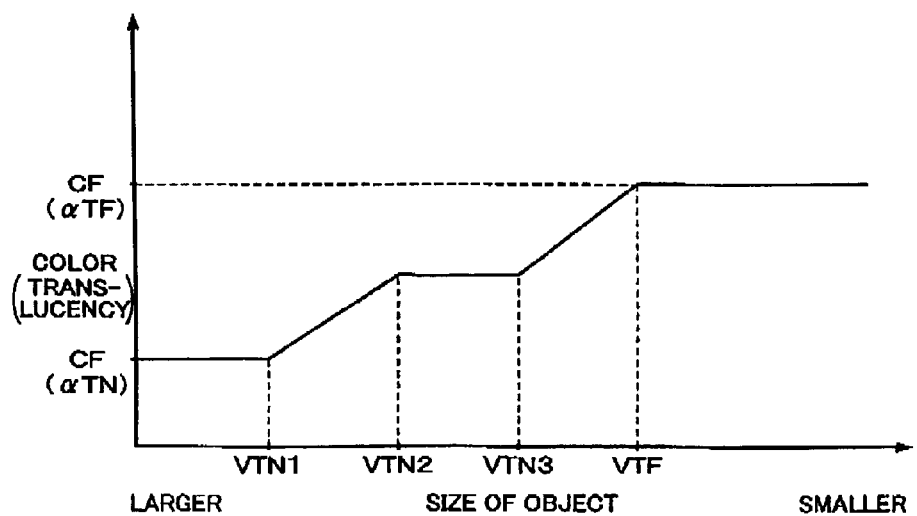

The number of threshold values may be four or more, as shown in FIGS. 43A and 43B. The number of threshold values is arbitrary. Alternatively, no threshold value may be provided. If the distance between the object and the viewpoint or the size of the perspectively transformed object is within the range of VTN2 to VTN3 in such a case as shown in FIGS. 34A and 34B, the color or translucency of the edge line may be maintained substantially constant as described in connection with FIG. 8A.

The object for generating the image of the edge line is not necessarily displayed. The display of only the image of the edge line without displaying the object also falls within the scope of the invention. In such a case, any three-dimensional image such as a character drawn only by the edge line can be generated. This can provide a unique picture effect which would not be known in the art.

The bi-linear filtering type texture mapping processing is particularly desirable as the texel interpolation type texture mapping process, but the present invention is not limited to such a process.

It is particularly desirable to use the technique of generating the virtual polygon as described in connection with FIGS. 16A to 18D. However, the present invention is not limited to such a technique, but may be carried out in any of various other forms.

It is particularly desirable that the determination of the edge line region in the object is carried out based on the texel-interpolated alpha value. However, the present invention is not limited to such a determination, but may be carried out in any of various other forms.

The present invention may be applied to any of various games such as fighting games, shooting games, robot combat games, sports games, competitive games, roll-playing games, music playing games, dancing games and so on.

Furthermore, the present invention can be applied to various game systems (image generating systems) such as arcade game systems, home game systems, large-scaled multi-player attraction systems, simulators, multimedia terminals, image generating systems, game image generating system boards and so on.

The invention claimed is:

1. A game system which performs image generation, comprising:
    a drawing section which generates an image as viewed from a given viewpoint within an object space, and which draws an image of an edge line of an object, the edge line having constant thickness; and
    an edge line image changing section which changes a parameter of the image of the edge line of the object depending on a distance from the viewpoint, the parameter being a parameter other than the thickness of the edge line or a length of the edge line.

2. The game system according to claim 1, wherein as the distance from the viewpoint increases, the edge line image changing section changes a color of the edge line of the object gradually to a given second color.

3. The game system according to claim 2, wherein when the distance from the viewpoint is substantially equal to a distance when the viewpoint follows the object while maintaining a substantially constant distance from the object, the color of the edge line of the object is maintained substantially constant.

4. The game system according to claim 2, wherein the color of the edge line of the object is set to the second color when the distance from the viewpoint becomes larger than a given threshold value.

5. The game system according to claim 1, wherein as the distance from the viewpoint increases, the edge line image changing section changes the image of the edge line of the object to become gradually more transparent.

6. The game system according to claim 5, wherein when the distance from the viewpoint is substantially equal to a distance when the viewpoint follows the object while maintaining a substantially constant distance from the object, a translucency of the edge line of the object is maintained substantially constant.

7. The game system according to claim 5, wherein the image of the edge line of the object substantially disappears when the distance from the viewpoint becomes larger than a given threshold value.

8. The game system according to claim 2, wherein the drawing section draws the image of the edge line of the object in an outside area of edge of the object.

9. The game system according to claim 5, wherein the drawing section draws the image of the edge line of the object in an inside area of edge of the object.

10. A game system which performs image generation, comprising:
    a drawing section which generates an image as viewed from a given viewpoint within an object space, and which draws an image of an edge line of an object, the edge line having a constant thickness; and
    an edge line image changing section which changes a parameter of the image of the edge line of the object depending on a size of the object that has been perspectively transformed, the parameter being a parameter other than the thickness of the edge line or a length of the edge line.

11. The game system according to claim 10, wherein as the size of the perspectively transformed object decreases, the edge line image changing section changes a color of the edge line of the object gradually to a given second color.

12. The game system according to claim 11, wherein when the size of the perspectively transformed object is substantially equal to a size of the object when the viewpoint follows the object while maintaining a substantially constant distance from the object, the color of the edge line of the object is maintained substantially constant.

13. The game system according to claim 11, wherein the color of the edge line of the object is set to the second color when the size of the perspectively transformed object becomes smaller than a given threshold value.

14. The game system according to claim 10, wherein as the size of the perspectively transformed object decreases, the edge line image changing section changes the image of the edge line of the object to become gradually more transparent.

15. The game system according to claim 14, wherein when the size of the perspectively transformed object is substantially equal to a size of the object when the viewpoint follows the object while maintaining a substantially constant distance from the object, a translucency of the edge line of the object is maintained substantially constant.

16. The game system according to claim 14, wherein the image of the edge line of the object substantially disappears when the size of the perspectively transformed object becomes smaller than a given threshold value.

17. The game system according to claim 11, wherein the drawing section draws the image of the edge line of the object in an outside area of edge of the object.

18. The game system according to claim 14, wherein the drawing section draws the image of the edge line of the object in an inside area of edge of the object.

19. A computer-usable program embodied on an information storage medium or in a earner wave, the program comprising a processing routine for causing a computer to realize:
    a drawing routine which generates an image as viewed from a given viewpoint within an object space, and which draws an image of an edge line of an object, the edge line having a constant thickness; and
    an edge line image changing routine which changes a parameter of the image of the edge line of the object depending on a distance from the viewpoint, the parameter being a parameter other than the thickness of the edge line or a length of the edge line.

20. The program according to claim 19, wherein as the distance from the viewpoint increases, the edge line image changing routine changes a color of the edge line of the object gradually to a given second color.

21. The program according to claim 20, wherein when the distance from the viewpoint is substantially equal to a distance when the viewpoint follows the object while maintaining a substantially constant distance from the object, the color of the edge line of the object is maintained substantially constant.

22. The program according to claim 20, wherein the color of the edge line of the object is set to the second color when the distance from the viewpoint becomes larger than a given threshold value.

23. The program according to claim 19, wherein as the distance from the viewpoint increases, the edge line image changing routine changes the image of the edge line of the object to become gradually more transparent.

24. The program according to claim 23, wherein when the distance from the viewpoint is substantially equal to a distance when the viewpoint follows the object while maintaining a substantially constant distance from the object, a translucency of the edge line of the object is maintained substantially constant.

25. The program according to claim 23, wherein the image of the edge line of the object substantially disappears when the distance from the viewpoint becomes larger than a given threshold value.

26. The program according to claim 20, wherein the drawing routine draws the image of the edge line of the object in an outside area of edge of the object.

27. The program according to claim 23, wherein the drawing routine draws the image of the edge line of the object in an inside area of edge of the object.

28. A computer-usable program embodied on an information storage medium or in a carrier wave, the program comprising a processing routine for causing a computer to realize:
   a drawing routine which generates an image as viewed from a given viewpoint within an object space, and which draws an image of an edge line of an object, the edge line having a constant thickness; and
   an edge line image changing routine which changes a parameter of the image of the edge line of the object depending on a size of the object that has been perspectively transformed, the parameter being a parameter other than the thickness of the edge line or a length of the edge line.

29. The program according to claim 28, wherein as the size of the perspectively transformed object decreases, the edge line image changing routine changes a color of the edge line of the object gradually to a given second color.

30. The program according to claim 29, wherein when the size of the perspectively transformed object is substantially equal to a size of the object when the viewpoint follows the object while maintaining a substantially constant distance from the object, the color of the edge line of the object is maintained substantially constant.

31. The program according to claim 29, wherein the color of the edge line of the object is set to the second color when the size of the perspectively transformed object becomes smaller than a given threshold value.

32. The program according to claim 28, wherein as the size of the perspectively transformed object decreases, the edge line image changing routine changes the image of the edge line of the object to become gradually more transparent.

33. The program according to claim 32, wherein when the size of the perspectively transformed object is substantially equal to a size of the object when the viewpoint follows the object while maintaining a substantially constant distance from the object, a translucency of the edge line of the object is maintained substantially constant.

34. The program according to claim 32, wherein the image of the edge line of the object substantially disappears when the size of the perspectively transformed object becomes smaller than a given threshold value.

35. The program according to claim 29, wherein the drawing routine draws the image of the edge line of the object in an outside area of edge of the object.

36. The program according to claim 32, wherein the drawing routine draws the image of the edge line of the object in an inside area of edge of the object.

37. An image generating method to perform image generation, comprising:
   generating an image as viewed from a given viewpoint within an object space;
   drawing an image of an edge line of an object, the edge line having a constant thickness; and
   changing a parameter of the image of the edge line of the object depending on a distance from the viewpoint, the parameter being a parameter other than the thickness of the edge line or a length of the edge line.

38. The image generating method according to claim 37, wherein as the distance from the viewpoint increases, a color of the edge line of the object is gradually changed to a given second color.

39. The image generating method according to claim 38, wherein when the distance from the viewpoint is substantially equal to a distance when the viewpoint follows the object while maintaining a substantially constant distance from the object, the color of the edge line of the object is maintained substantially constant.

40. The image generating method according to claim 38, wherein the color of the edge line of the object is set to the second color when the distance from the viewpoint becomes larger than a given threshold value.

41. The image generating method according to claim 37, wherein as the distance from the viewpoint increases, the image of the edge line of the object is gradually changed to more transparent.

42. The image generating method according to claim 41, wherein when the distance from the viewpoint is substantially equal to a distance when the viewpoint follows the object while maintaining a substantially constant distance from the object, a translucency of the edge line of the object is maintained substantially constant.

43. The image generating method according to claim 41, wherein the image of the edge line of the object substantially disappears when the distance from the viewpoint becomes larger than a given threshold value.

44. The image generating method according to claim 38, wherein the image of the edge line of the object is drawn in an outside area of edge of the object.

45. The image generating method according to claim 41, wherein the image of the edge line of the object is drawn in an inside area of edge of the object.

46. An image generating method to perform image generation, comprising:
   generating an image as viewed from a given viewpoint within an object space;
   drawing an image of an edge line of an object, the edge line having a constant thickness;
   changing a parameter of the image of the edge line of the object depending on a size of the object that has been perspectively transformed, the parameter being a parameter other than the thickness of the edge line or a length of the edge line.

47. The image generating method according to claim 46, wherein as the size of the perspectively transformed object decreases, a color of the edge line of the object is gradually changed to a given second color.

48. The image generating method according to claim 47, wherein when the size of the perspectively transformed object is substantially equal to a size of the object when the viewpoint follows the object while maintaining a substantially constant distance from the object, the color of the edge line of the object is maintained substantially constant.

49. The image generating method according to claim 47, wherein the color of the edge line of the object is set to the second color when the size of the perspectively transformed object becomes smaller than a given threshold value.

50. The image generating method according to claim 46, wherein as the size of the perspectively transformed object decreases, the image of the edge line of the object is gradually changed to more transparent.

51. The image generating method according to claim 50, wherein when the size of the perspectively transformed object is substantially equal to a size of the object when the viewpoint follows the object while maintaining a substantially constant distance from the object, a translucency of the edge line of the object is maintained substantially constant.

52. The image generating method according to claim 50, wherein the image of the edge line of the object substantially disappears when the size of the perspectively transformed object becomes smaller than a given threshold value.

53. The image generating method according to claim 47, wherein the image of the edge line of the object is drawn in an outside area of edge of the object.

54. The image generating method according to claim 50, wherein the image of the edge line of the object is drawn in an inside area of edge of the object.

* * * * *